United States Patent
Karaoguz et al.

(10) Patent No.: US 8,687,042 B2
(45) Date of Patent: Apr. 1, 2014

(54) SET-TOP BOX CIRCUITRY SUPPORTING 2D AND 3D CONTENT REDUCTIONS TO ACCOMMODATE VIEWING ENVIRONMENT CONSTRAINTS

(75) Inventors: Jeyhan Karaoguz, Irvine, CA (US); James D. Bennett, Hroznetin (CZ); Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 531 days.

(21) Appl. No.: 12/982,062

(22) Filed: Dec. 30, 2010

(65) Prior Publication Data
US 2011/0169913 A1    Jul. 14, 2011

Related U.S. Application Data

(60) Provisional application No. 61/291,818, filed on Dec. 31, 2009, provisional application No. 61/303,119, filed on Feb. 10, 2010.

(51) Int. Cl.
*H04N 13/00* (2006.01)
*H04N 7/173* (2011.01)

(52) U.S. Cl.
USPC ............................................ 348/42; 725/131

(58) Field of Classification Search
USPC .......... 348/43, 46, 734, 42, 51, 54, 56, 14.08; 725/131, 14, 25, 153, 107
See application file for complete search history.

(56) References Cited

U.S. PATENT DOCUMENTS

| | | |
|---|---|---|
| 4,829,365 A | 5/1989 | Eichenlaub |
| 5,615,046 A | 3/1997 | Gilchrist |
| 5,855,425 A | 1/1999 | Hamagishi |
| 5,945,965 A | 8/1999 | Inoguchi et al. |
| 5,959,597 A | 9/1999 | Yamada et al. |
| 5,969,850 A | 10/1999 | Harrold et al. |
| 5,990,975 A | 11/1999 | Nan et al. |

(Continued)

FOREIGN PATENT DOCUMENTS

| | | |
|---|---|---|
| EP | 0833183 A1 | 4/1998 |
| EP | 1662808 A1 | 5/2006 |

(Continued)

OTHER PUBLICATIONS

"How browsers work", retrieved from <http://taligarsiel.com/Projects/howbrowserswork1.htm> on Oct. 21, 2010, 54 pages.

(Continued)

*Primary Examiner* — Behrooz Senfi
(74) *Attorney, Agent, or Firm* — Fiala & Weaver P.L.L.C.

(57) ABSTRACT

Set-top box circuitry and methods of operating the same are described that support the delivery of media content between one or more media content sources and a screen assembly of a display system. The set-top box circuitry is configured to process media content having display requirements that exceed constraints associated with a viewing environment that includes the screen assembly to produce processed media content having display requirements that do not exceed the constraints. The set-top box circuitry may also be configured to obtain substitute media content that replaces requested media content when the requested media content has display requirements exceeding constraints associated with a media content source, a communication path from the media content source, and/or the viewing environment.

26 Claims, 23 Drawing Sheets

(56) References Cited

U.S. PATENT DOCUMENTS

| | | |
|---|---|---|
| 6,023,277 A | 2/2000 | Osaka et al. |
| 6,049,424 A | 4/2000 | Hamagishi |
| 6,094,216 A | 7/2000 | Taniguchi et al. |
| 6,144,375 A | 11/2000 | Jain et al. |
| 6,188,442 B1 | 2/2001 | Narayanaswami |
| 6,697,687 B1 | 2/2004 | Kasahara et al. |
| 6,710,920 B1 | 3/2004 | Mashitani et al. |
| 6,909,555 B2 | 6/2005 | Wohlstadter |
| 7,030,903 B2 | 4/2006 | Sudo |
| 7,038,698 B1 | 5/2006 | Palm et al. |
| 7,123,213 B2 | 10/2006 | Yamazaki et al. |
| 7,190,518 B1 | 3/2007 | Kleinberger et al. |
| 7,359,105 B2 | 4/2008 | Jacobs et al. |
| 7,440,193 B2 | 10/2008 | Gunasekaran et al. |
| 7,511,774 B2 | 3/2009 | Lee et al. |
| 7,626,644 B2 | 12/2009 | Shestak et al. |
| 7,646,451 B2 | 1/2010 | Vogel et al. |
| 7,692,859 B2 | 4/2010 | Redert et al. |
| 7,885,079 B2 | 2/2011 | Chen et al. |
| 7,954,967 B2 | 6/2011 | Kashiwagi et al. |
| 7,997,783 B2 | 8/2011 | Song et al. |
| 8,040,952 B2 | 10/2011 | Park et al. |
| 8,049,710 B2 | 11/2011 | Shestak et al. |
| 8,139,024 B2 | 3/2012 | Daiku |
| 8,154,686 B2 | 4/2012 | Mather et al. |
| 8,154,799 B2 | 4/2012 | Kim et al. |
| 8,174,564 B2 | 5/2012 | Kim et al. |
| 8,209,396 B1 | 6/2012 | Raman et al. |
| 8,284,119 B2 | 10/2012 | Kim et al. |
| 8,310,527 B2 | 11/2012 | Ko et al. |
| 8,363,928 B1 | 1/2013 | Sharp |
| 8,368,745 B2 | 2/2013 | Nam et al. |
| 8,384,774 B2 | 2/2013 | Gallagher |
| 8,400,392 B2 | 3/2013 | Kimura et al. |
| 8,411,746 B2 | 4/2013 | Chen et al. |
| 8,441,430 B2 | 5/2013 | Lee |
| 8,466,869 B2 | 6/2013 | Kobayashi et al. |
| 8,587,736 B2 | 11/2013 | Kang |
| 2002/0010798 A1 | 1/2002 | Ben-Shaul et al. |
| 2002/0167862 A1 | 11/2002 | Tomasi et al. |
| 2002/0171666 A1 | 11/2002 | Endo et al. |
| 2003/0012425 A1 | 1/2003 | Suzuki et al. |
| 2003/0103165 A1 | 6/2003 | Bullinger et al. |
| 2003/0137506 A1 | 7/2003 | Efran et al. |
| 2003/0154261 A1 | 8/2003 | Doyle et al. |
| 2003/0223499 A1 | 12/2003 | Routhier et al. |
| 2004/0027452 A1 | 2/2004 | Yun et al. |
| 2004/0036763 A1 | 2/2004 | Swift et al. |
| 2004/0041747 A1 | 3/2004 | Uehara et al. |
| 2004/0109093 A1 | 6/2004 | Small-Stryker |
| 2004/0141237 A1 | 7/2004 | Wohlstadter |
| 2004/0164292 A1 | 8/2004 | Tung et al. |
| 2004/0239231 A1 | 12/2004 | Miyagawa et al. |
| 2004/0252187 A1 | 12/2004 | Alden |
| 2005/0073472 A1 | 4/2005 | Kim et al. |
| 2005/0128353 A1 | 6/2005 | Young et al. |
| 2005/0237487 A1 | 10/2005 | Chang |
| 2006/0050785 A1 | 3/2006 | Watanabe et al. |
| 2006/0109242 A1 | 5/2006 | Simpkins |
| 2006/0139448 A1 | 6/2006 | Ha et al. |
| 2006/0139490 A1 | 6/2006 | Fekkes et al. |
| 2006/0244918 A1 | 11/2006 | Cossairt et al. |
| 2006/0256136 A1 | 11/2006 | O'Donnell et al. |
| 2006/0256302 A1 | 11/2006 | Hsu |
| 2006/0271791 A1 | 11/2006 | Novack et al. |
| 2007/0002041 A1 | 1/2007 | Kim et al. |
| 2007/0008406 A1 | 1/2007 | Shestak et al. |
| 2007/0008620 A1 | 1/2007 | Shestak et al. |
| 2007/0052807 A1 | 3/2007 | Zhou et al. |
| 2007/0085814 A1 | 4/2007 | Ijzerman et al. |
| 2007/0096125 A1 | 5/2007 | Vogel et al. |
| 2007/0097103 A1 | 5/2007 | Yoshioka et al. |
| 2007/0139371 A1 | 6/2007 | Harsham et al. |
| 2007/0146267 A1 | 6/2007 | Jang et al. |
| 2007/0147827 A1 | 6/2007 | Sheynman et al. |
| 2007/0153916 A1 | 7/2007 | Demircin et al. |
| 2007/0162392 A1 | 7/2007 | McEnroe et al. |
| 2007/0258140 A1 | 11/2007 | Shestak et al. |
| 2007/0270218 A1 | 11/2007 | Yoshida et al. |
| 2007/0296874 A1 | 12/2007 | Yoshimoto et al. |
| 2008/0025390 A1 | 1/2008 | Shi et al. |
| 2008/0037120 A1 | 2/2008 | Koo et al. |
| 2008/0043644 A1 | 2/2008 | Barkley et al. |
| 2008/0068329 A1 | 3/2008 | Shestak et al. |
| 2008/0126557 A1 | 5/2008 | Motoyama et al. |
| 2008/0133122 A1 | 6/2008 | Mashitani et al. |
| 2008/0150853 A1 | 6/2008 | Peng et al. |
| 2008/0165176 A1 | 7/2008 | Archer et al. |
| 2008/0168129 A1 | 7/2008 | Robbin et al. |
| 2008/0184301 A1 | 7/2008 | Boylan et al. |
| 2008/0191964 A1 | 8/2008 | Spengler |
| 2008/0192112 A1 | 8/2008 | Hiramatsu et al. |
| 2008/0246757 A1 | 10/2008 | Ito |
| 2008/0259233 A1 | 10/2008 | Krijn et al. |
| 2008/0273242 A1 | 11/2008 | Woodgate et al. |
| 2008/0284844 A1 | 11/2008 | Woodgate et al. |
| 2008/0303832 A1 | 12/2008 | Kim et al. |
| 2009/0002178 A1 | 1/2009 | Guday et al. |
| 2009/0010264 A1 | 1/2009 | Zhang |
| 2009/0051759 A1 | 2/2009 | Adkins et al. |
| 2009/0052164 A1 | 2/2009 | Kashiwagi et al. |
| 2009/0058845 A1 | 3/2009 | Fukuda et al. |
| 2009/0102915 A1 | 4/2009 | Arsenich |
| 2009/0115783 A1 | 5/2009 | Eichenlaub |
| 2009/0115800 A1 | 5/2009 | Berretty et al. |
| 2009/0133051 A1 | 5/2009 | Hildreth |
| 2009/0138805 A1 | 5/2009 | Hildreth |
| 2009/0141182 A1 | 6/2009 | Miyashita et al. |
| 2009/0167639 A1 | 7/2009 | Casner et al. |
| 2009/0174700 A1 | 7/2009 | Daiku |
| 2009/0319625 A1 | 12/2009 | Kouhi |
| 2010/0066850 A1 | 3/2010 | Wilson et al. |
| 2010/0071015 A1 | 3/2010 | Tomioka et al. |
| 2010/0079374 A1 | 4/2010 | Cortenraad et al. |
| 2010/0097525 A1 | 4/2010 | Mino |
| 2010/0128112 A1 | 5/2010 | Marti et al. |
| 2010/0135640 A1 | 6/2010 | Zucker et al. |
| 2010/0208042 A1 | 8/2010 | Ikeda et al. |
| 2010/0225576 A1 | 9/2010 | Morad et al. |
| 2010/0231511 A1 | 9/2010 | Henty et al. |
| 2010/0238274 A1 | 9/2010 | Kim et al. |
| 2010/0238367 A1 | 9/2010 | Montgomery et al. |
| 2010/0245548 A1 | 9/2010 | Sasaki et al. |
| 2010/0272174 A1 | 10/2010 | Toma et al. |
| 2010/0306800 A1 | 12/2010 | Jung et al. |
| 2010/0309290 A1 | 12/2010 | Myers |
| 2011/0016004 A1 | 1/2011 | Loyall et al. |
| 2011/0043475 A1 | 2/2011 | Rigazio et al. |
| 2011/0050687 A1 | 3/2011 | Alyshev et al. |
| 2011/0063289 A1 | 3/2011 | Gantz |
| 2011/0090233 A1 | 4/2011 | Shahraray et al. |
| 2011/0090413 A1 | 4/2011 | Liou |
| 2011/0093882 A1 | 4/2011 | Candelore et al. |
| 2011/0109964 A1 | 5/2011 | Kim et al. |
| 2011/0113343 A1* | 5/2011 | Trauth ................. 715/738 |
| 2011/0149026 A1* | 6/2011 | Luthra ................. 348/43 |
| 2011/0157167 A1 | 6/2011 | Bennett et al. |
| 2011/0157168 A1 | 6/2011 | Bennett et al. |
| 2011/0157169 A1 | 6/2011 | Bennett et al. |
| 2011/0157170 A1 | 6/2011 | Bennett et al. |
| 2011/0157172 A1 | 6/2011 | Bennett et al. |
| 2011/0157257 A1 | 6/2011 | Bennett et al. |
| 2011/0157264 A1 | 6/2011 | Seshadri et al. |
| 2011/0157309 A1 | 6/2011 | Bennett et al. |
| 2011/0157315 A1 | 6/2011 | Bennett et al. |
| 2011/0157322 A1 | 6/2011 | Bennett et al. |
| 2011/0157326 A1 | 6/2011 | Karaoguz et al. |
| 2011/0157327 A1 | 6/2011 | Seshadri et al. |
| 2011/0157330 A1 | 6/2011 | Bennett et al. |
| 2011/0157336 A1 | 6/2011 | Bennett et al. |
| 2011/0157339 A1 | 6/2011 | Bennett et al. |
| 2011/0157471 A1 | 6/2011 | Seshadri et al. |
| 2011/0157696 A1 | 6/2011 | Bennett et al. |
| 2011/0157697 A1 | 6/2011 | Bennett et al. |

(56) References Cited

U.S. PATENT DOCUMENTS

| | | | |
|---|---|---|---|
| 2011/0159929 | A1 | 6/2011 | Karaoguz et al. |
| 2011/0161843 | A1 | 6/2011 | Bennett et al. |
| 2011/0164034 | A1 | 7/2011 | Bennett et al. |
| 2011/0164111 | A1 | 7/2011 | Karaoguz et al. |
| 2011/0164115 | A1 | 7/2011 | Bennett et al. |
| 2011/0164188 | A1 | 7/2011 | Karaoguz et al. |
| 2011/0169919 | A1 | 7/2011 | Karaoguz et al. |
| 2011/0169930 | A1 | 7/2011 | Bennett et al. |
| 2011/0199469 | A1 | 8/2011 | Gallagher |
| 2011/0234754 | A1 | 9/2011 | Newton et al. |
| 2011/0254698 | A1 | 10/2011 | Eberl et al. |
| 2011/0268177 | A1 | 11/2011 | Tian et al. |
| 2012/0016917 | A1 | 1/2012 | Priddle et al. |
| 2012/0081515 | A1* | 4/2012 | Jang .................. 348/43 |
| 2012/0235900 | A1 | 9/2012 | Border et al. |
| 2012/0308208 | A1* | 12/2012 | Karaoguz et al. ......... 386/249 |
| 2013/0127980 | A1 | 5/2013 | Haddick et al. |

FOREIGN PATENT DOCUMENTS

| | | |
|---|---|---|
| EP | 1816510 A1 | 8/2007 |
| EP | 1993294 A2 | 11/2008 |
| WO | 2005/045488 A1 | 5/2005 |
| WO | 2007/024118 A1 | 3/2007 |
| WO | 2009/098622 A2 | 8/2009 |

OTHER PUBLICATIONS

IEEE 100 The Authoritative Dictionary of IEEE Standards Terms Seventh Edition, entry for "engine", IEEE 100-2000, 2000, pp. 349-411.

IEEE 100 The Authoritative Dictionary of IEEE Standards Terms Seventh Edition, entry for "Web page", IEEE 100-2000, 2000, pp. 1269-1287.

Wikipedia entry on "Scripting language", available online at <http://en.wikipedia.org/wiki/Scripting_language>, retrieved on Aug. 16, 2012, 4 pages.

Shan et al., "Principles and Evaluation of Autostereoscopic Photogrammetric Measurement", Photogrammetric Engineering and Remote Sensing, Journal of the American Society for Photogrammetry and Remote Sensing, vol. 72, No. 4, Apr. 2006, pp. 365-372.

Peterka, Thomas, "Dynallax: Dynamic Parallax Barrier Autostereoscopic Display", Ph.D. Dissertation, University of Illinois at Chicago, 2007, 134 pages.

Yanagisawa et al., "A Focus Distance Controlled 3D TV", Proc. SPIE 3012, Stereoscopic Displays and Virtual Reality Systems IV, May 15, 1997, pp. 256-261.

EPO Communication received for European Patent Application No. 10016055.5, dated Apr. 5, 2013, 6 pages.

European search Report received for European Patent application No. 10016055.5, mailed on Apr. 12, 2011, 3 pages.

European Search Report received for European Patent application No. 10015984.7, mailed on May 3, 2011, 3 pages.

Yanaka, Kazuhisa "Stereoscopic Display Technique for Web3D Images", SIGGRAPH 2009, New Orleans, Louisiana, Aug. 3-7, 2009, 1 page.

Fono, et al., "EyeWindows: Evaluation of Eye-Controlled Zooming Windows for Focus Selection", Apr. 2-7, 2005, pp. 151-160.

Kumar, et al., "Eye Point: Practical Pointing and Selection Using Gaze and Keyboard", Apr. 28-May 3, 2007, 10 pages.

* cited by examiner

SET-TOP BOX CIRCUITRY SUPPORTING 2D AND 3D CONTENT REDUCTIONS TO ACCOMMODATE VIEWING ENVIRONMENT CONSTRAINTS

CROSS-REFERENCE TO RELATED APPLICATIONS

This application claims the benefit of U.S. Provisional Patent Application No. 61/291,818, filed on Dec. 31, 2009, and U.S. Provisional Patent Application No. 61/303,119, filed on Feb. 10, 2010. The entirety of each of these applications is incorporated by reference herein.

This application is also related to the following U.S. patent applications, each of which also claims the benefit of U.S. Provisional Patent Application Nos. 61/291,818 and 61/303,119 and each of which is incorporated by reference herein:

U.S. patent application Ser. No. 12/774,307, filed on May 5, 2010, and entitled "Display with Elastic Light Manipulator";

U.S. patent application Ser. No. 12/774,225, filed on May 5, 2010, and entitled "Controlling a Pixel Array to Support an Adaptable Light Manipulator";

U.S. patent application Ser. No. 12/845,409, filed on Jul. 28, 2010, and entitled "Display with Adaptable Parallax Barrier";

U.S. patent application Ser. No. 12/845,440, filed on Jul. 28, 2010, and entitled "Adaptable Parallax Barrier Supporting Mixed 2D and Stereoscopic 3D Display Regions";

U.S. patent application Ser. No. 12/845,461, filed on Jul. 28, 2010, and entitled "Display Supporting Multiple Simultaneous 3D Views";

U.S. patent application Ser. No. 12/982,020 filed on even date herewith and entitled "Backlighting Array Supporting Adaptable Parallax Barrier";

U.S. patent application Ser. No. 12/982,031, filed on even date herewith and entitled "Coordinated Driving of Adaptable Light Manipulator, Backlighting and Pixel Array in Support of Adaptable 2D and 3D Displays";

U.S. patent application Ser. No. 12/982,053, filed on even date herewith and entitled "Hierarchical Video Compression Supporting Selective Delivery of Two-Dimensional and Three-Dimensional Video Content"; and U.S. patent application Ser. No. 12/982,248, filed on even date herewith and entitled "Interpolation of Three-Dimensional Video Content."

BACKGROUND OF THE INVENTION

1. Field of the Invention

The present invention generally relates to circuitry, such as set-top box circuitry, that is used to receive media content from one or more media content sources and to convert it into a form suitable for delivery to and display by a particular display device.

2. Background Art

Recently, there has been a substantial increase in the types and amount of digital video content available to consumers and a concomitant increase in demand for such content. Today, consumers can purchase or otherwise obtain digital video content via a variety of distribution channels. For example, consumers can view digital video content transmitted via terrestrial broadcast, cable TV or satellite TV services, downloaded or streamed over a wired/wireless Internet Protocol (IP) network connection, or recorded on Digital Versatile Discs (DVDs) and Blu-ray™ discs.

A recent development in the area of digital video entertainment involves the production and distribution of digital video content for viewing in three dimensions (also referred to herein as "three-dimensional video content"). Such video content includes a left-eye view and a right-eye view that must be concurrently presented to a viewer. Various technologies may be used to ensure that the left-eye view is perceived only by the left eye of a viewer and the right-eye view is perceived only by the right eye of the viewer. Such technologies may be premised, for example, on the use of colored, polarizing or shuttering glasses, or on light manipulation via a parallax barrier or lenticular lens. The mind of the viewer combines the left-eye view and the right-eye view to perceive a series of three-dimensional images.

As noted above, a variety of different technologies are currently being used to present three-dimensional video content to viewers, each of which may require the content to be represented using different formats. Conventional televisions and display devices that are only capable of presenting images in two dimensions will not be able to consume such three-dimensional content since such televisions and display devices will not be able to handle the associated formats. Furthermore, televisions and displays that can support the viewing of one type of three-dimensional video content will not necessarily able to support the viewing of a different type of three-dimensional content.

BRIEF SUMMARY OF THE INVENTION

Set-top box circuitry and methods of operating the same are described herein that support the delivery of media content between one or more media content sources and a screen assembly of a display system. The set-top box circuitry is configured to process media content having display requirements that exceed constraints associated with a viewing environment that includes the screen assembly to produce processed media content having display requirements that do not exceed the constraints. The set-top box circuitry may also be configured to obtain substitute media content that replaces requested media content when the requested media content has display requirements exceeding constraints associated with a media content source, a communication path from the media content source, and/or the viewing environment. The set-top box circuitry and methods of operating the same are substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 19:
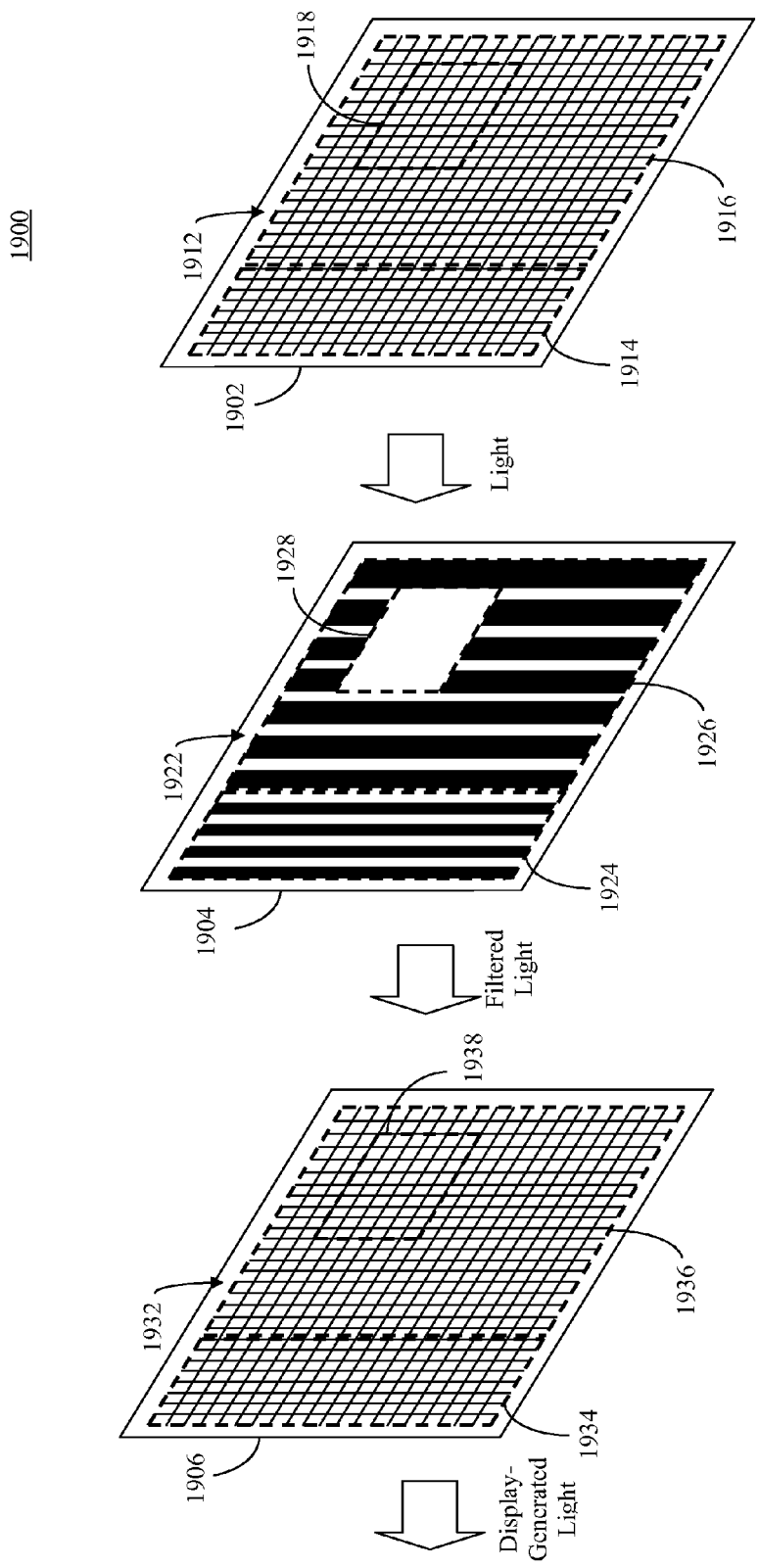

FIG. 19 provides an exploded view of a display system that utilizes a controllable backlight array to provide regional luminosity control in accordance with an embodiment.

Figure 20:
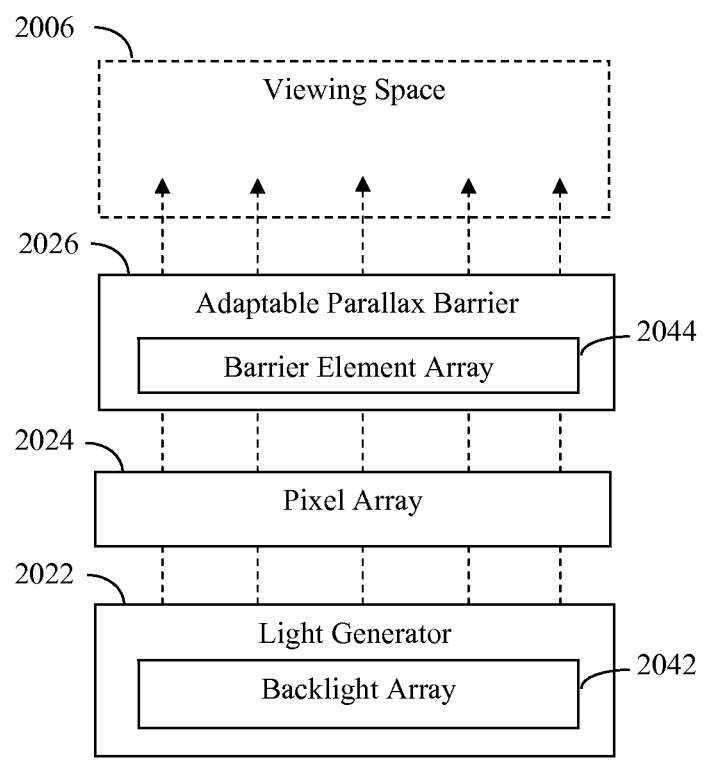

FIG. 20 is a block diagram of a display system that includes a pixel array disposed between a light generator and an adaptable parallax barrier in accordance with an embodiment.

Figure 21:
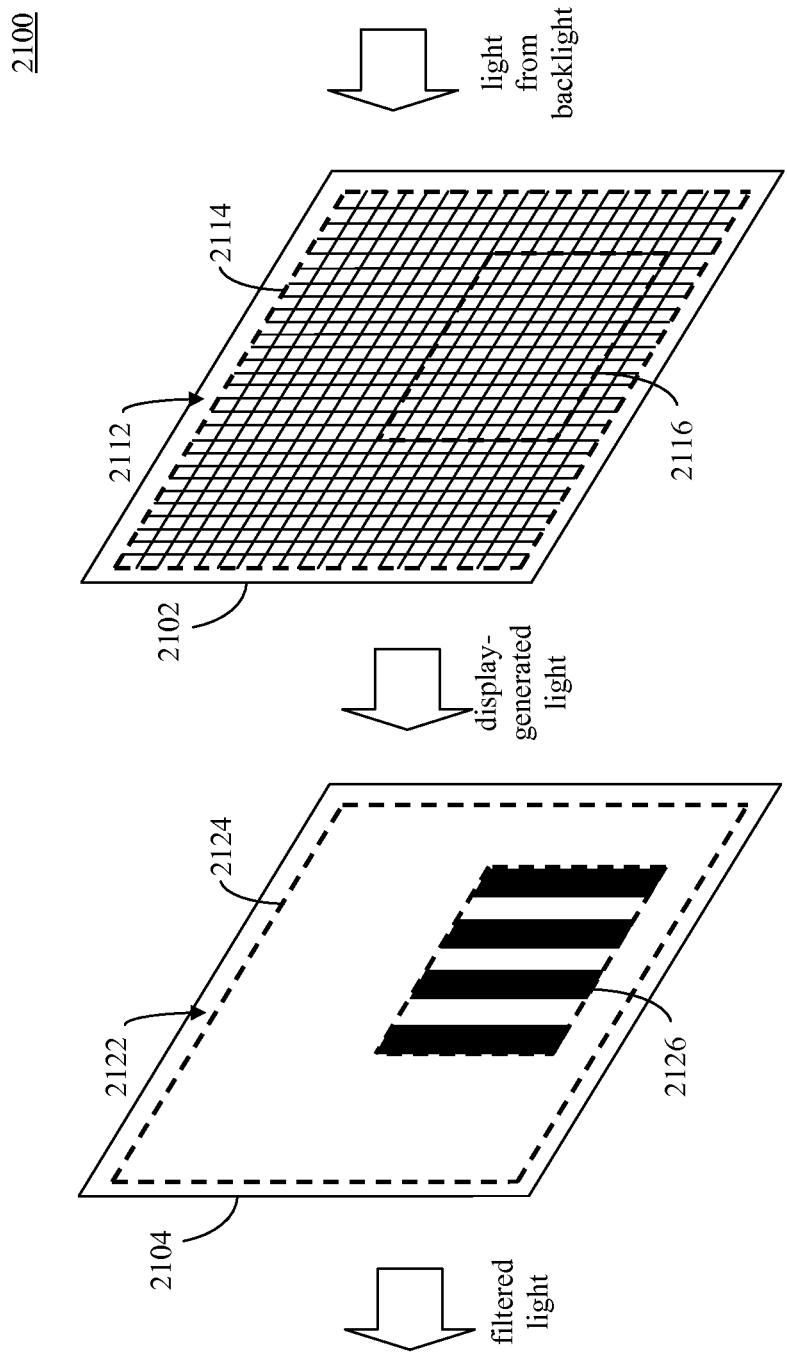

FIG. 21 provides an exploded view of a display system that implements a regional brightness control scheme based on pixel intensity in accordance with an embodiment.

Figure 22:
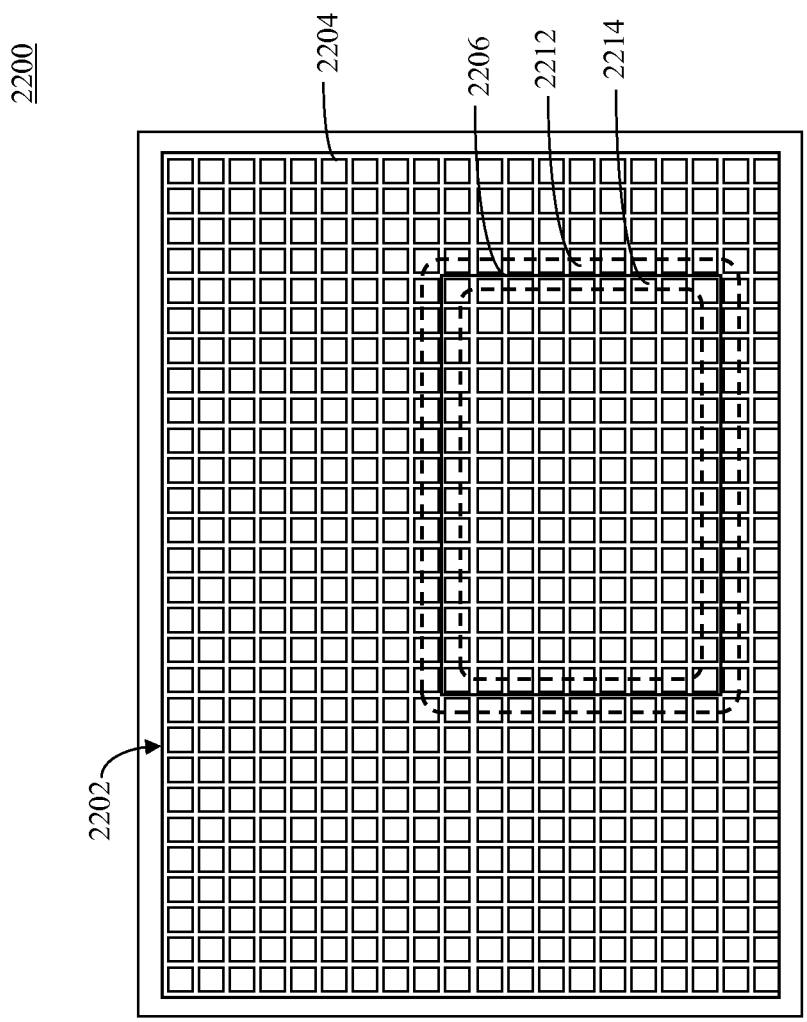

FIG. 22 illustrates a front perspective view of a display panel of a display system in accordance with an embodiment.

Figure 23:
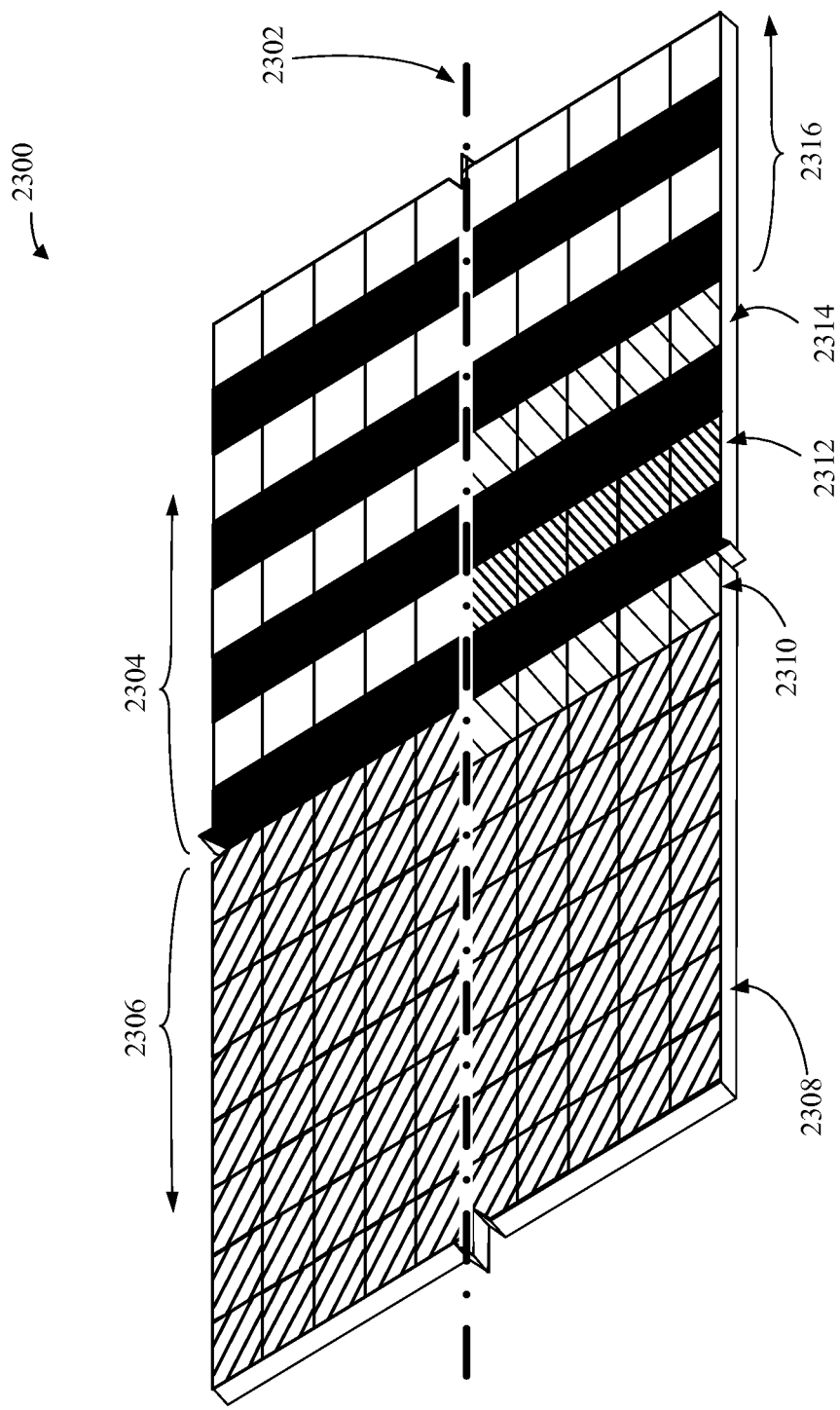

FIG. 23 illustrates two exemplary configurations of an adaptable light manipulator that includes a parallax barrier and a brightness regulation overlay in accordance with an embodiment.

Figure 24:
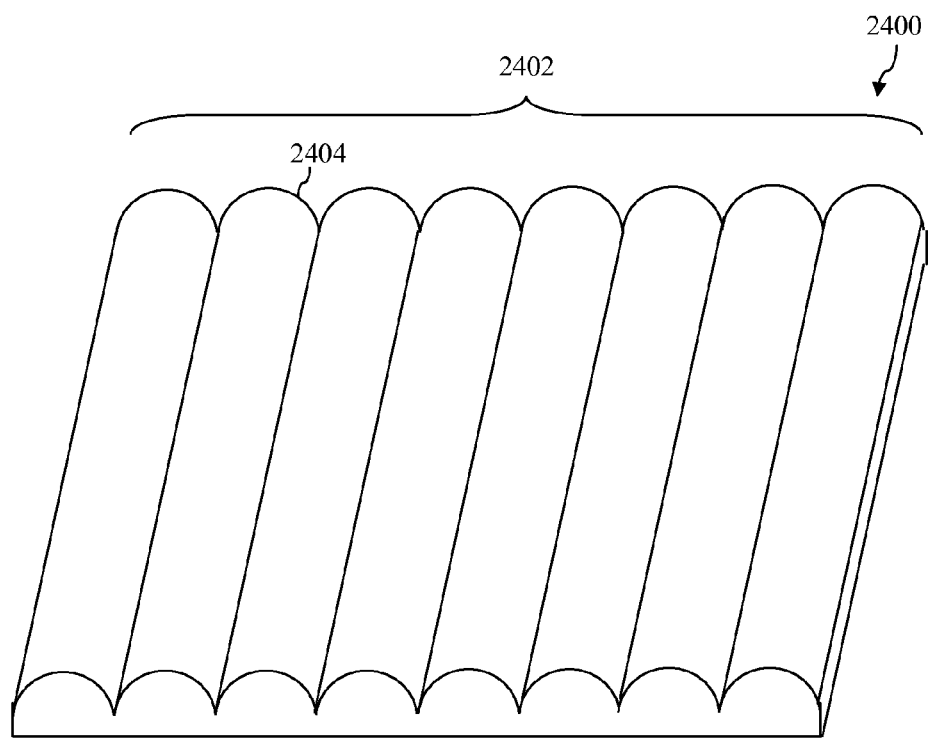

FIG. 24 shows a perspective view of an adaptable lenticular lens that may be used in a displays system in accordance with an embodiment.

Figure 25:
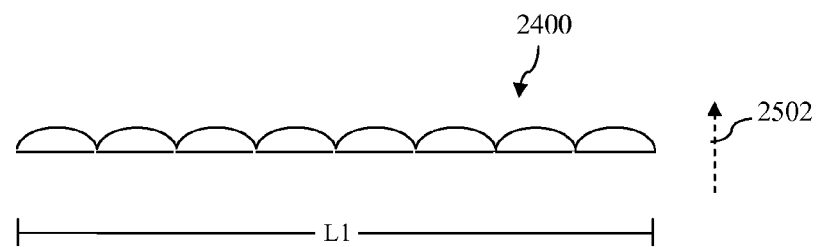

FIG. 25 shows a side view of the adaptable lenticular lens of FIG. 24.

Figure 26:
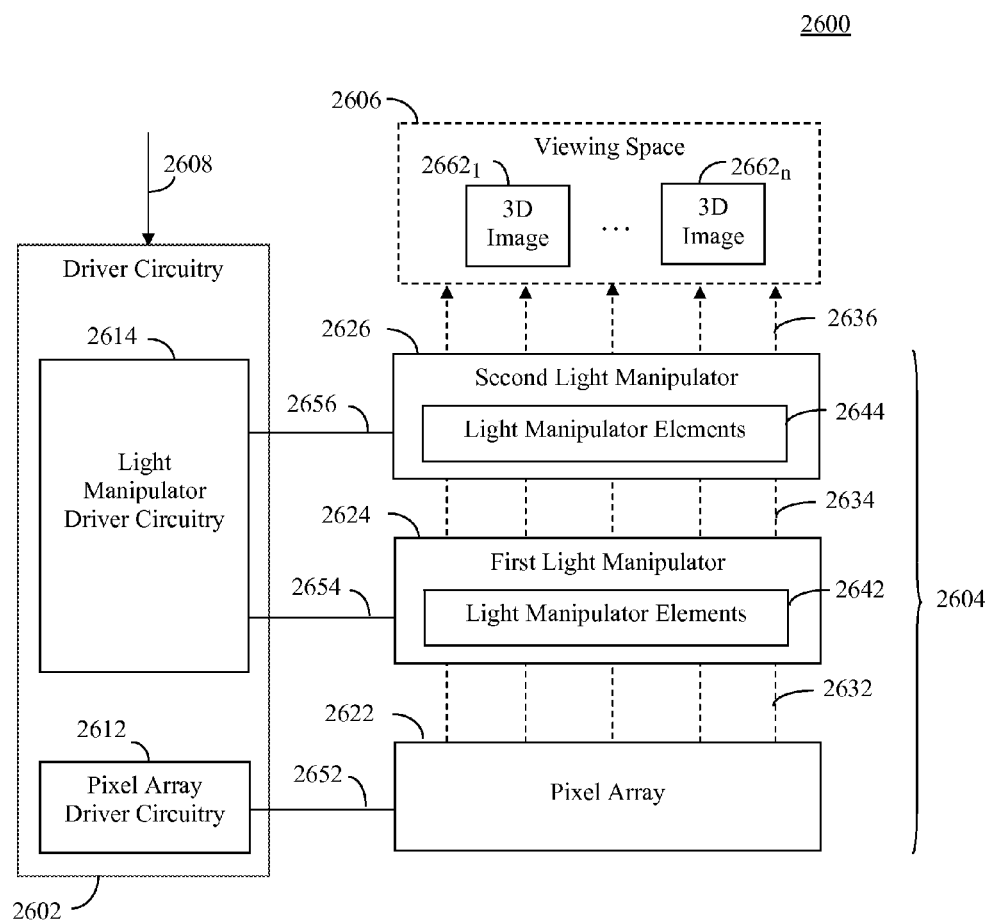

FIG. 26 is a block diagram of a display system that includes multiple light manipulator layers in accordance with an embodiment.

Figure 27:
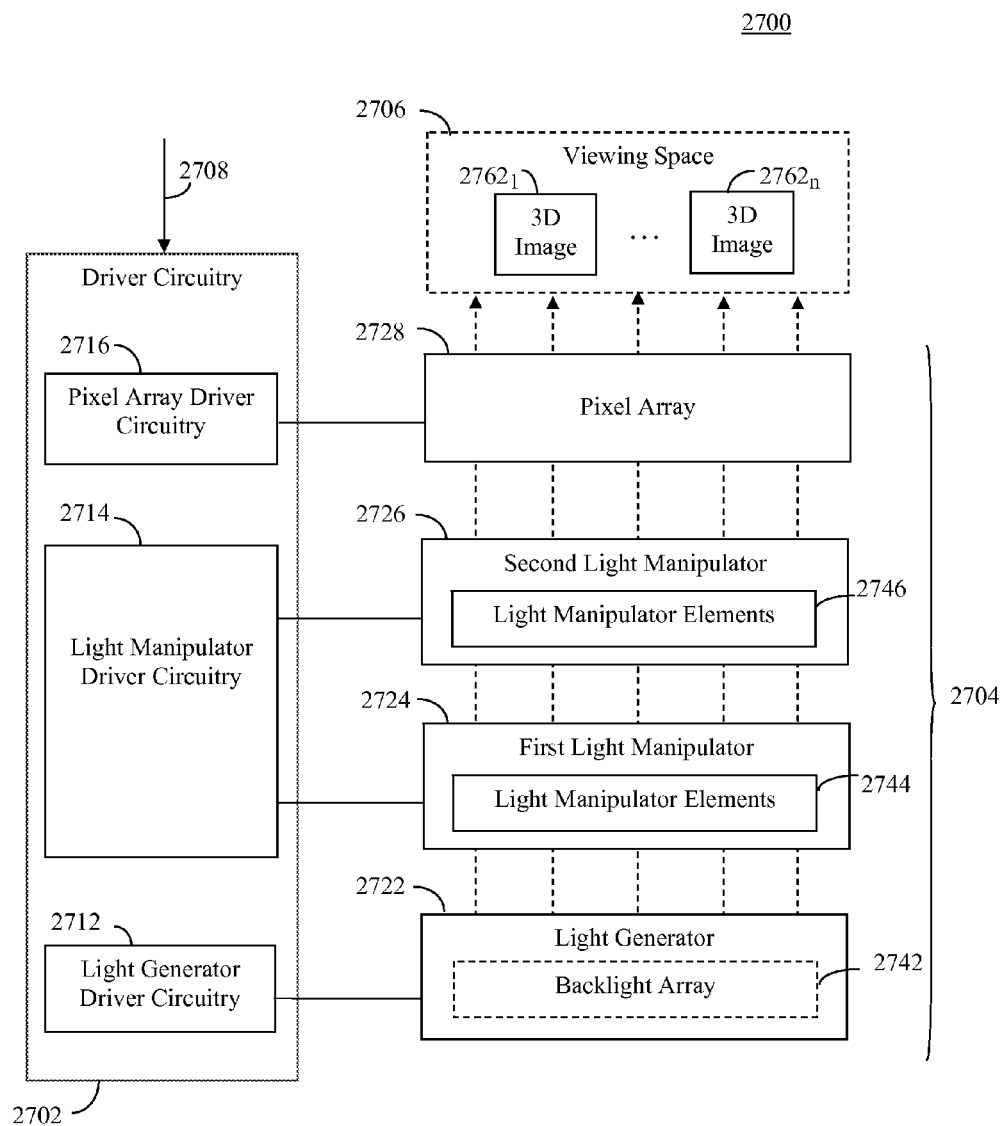

FIG. 27 is a block diagram of a display system that includes multiple light manipulator layers in accordance with an alternate embodiment.

Figure 28:
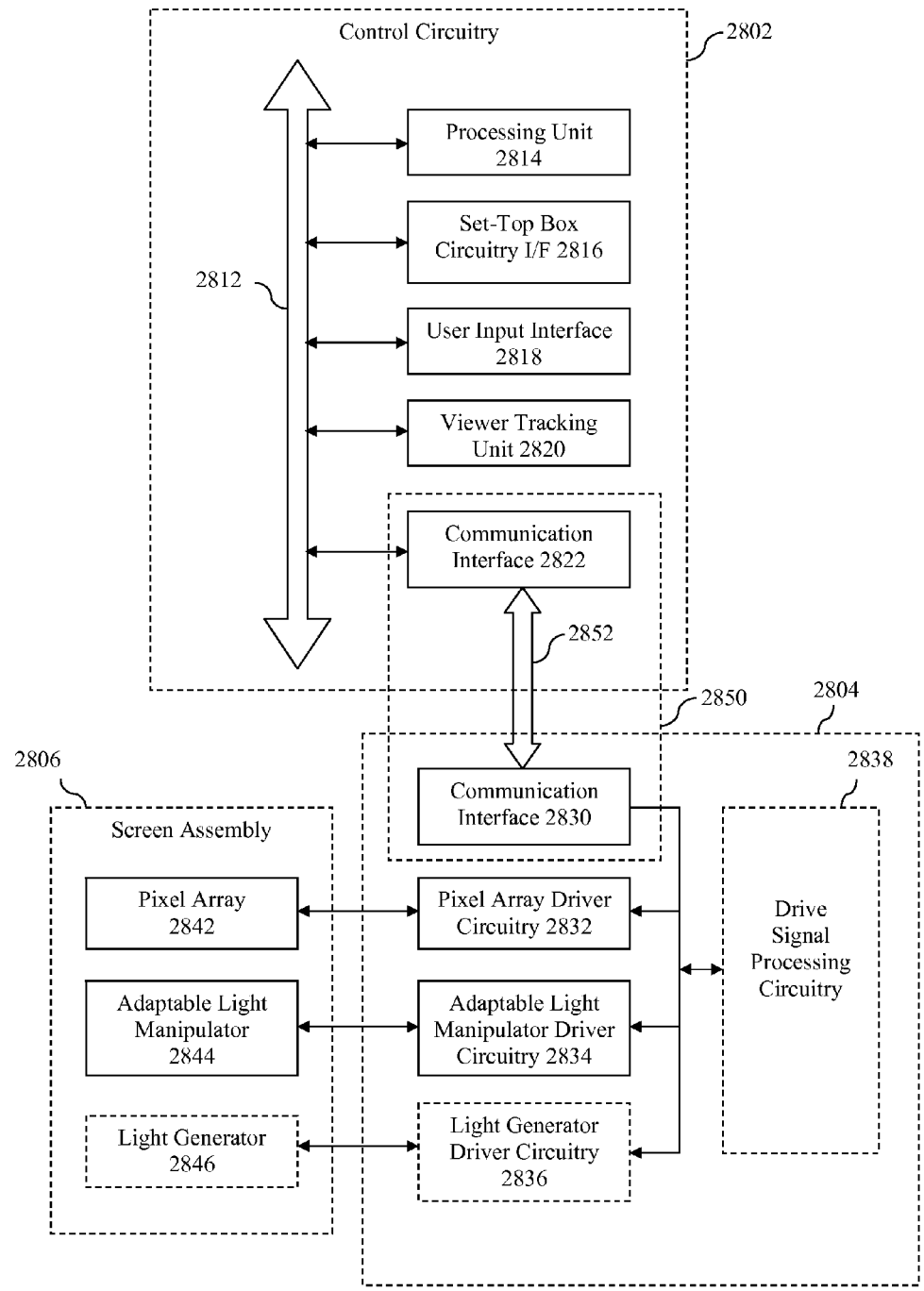

FIG. 28 is a block diagram of an example display system that may operate to receive and display media content obtained and selectively processed by set-top box circuitry in accordance with an embodiment.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

II. Example Operating Environment

Figure 1:
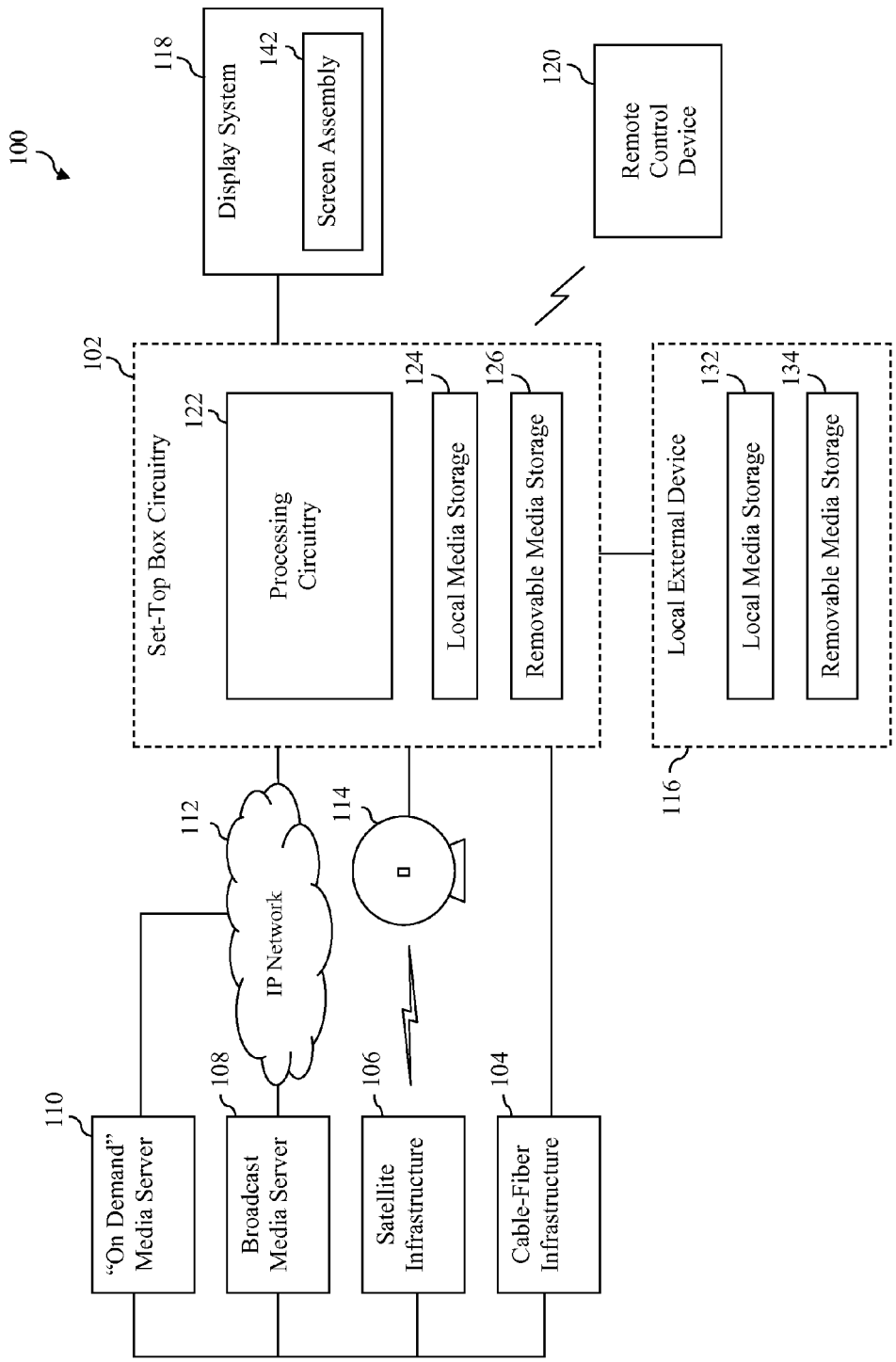
FIG. 1 is a block diagram of an example media content delivery and display system that includes set-top box circuitry in accordance with an embodiment.

FIG. 1 is a block diagram of an example media content delivery and display system 100 in which an embodiment of the present invention may operate. As shown in FIG. 1, system 100 includes set-top box circuitry 102 that is communicatively coupled to a plurality of remote media content sources, to at least one local external device 116, and to at least one display system 118.

The remote media content sources shown in FIG. 1 include a cable-fiber infrastructure 104, a satellite infrastructure 106, a broadcast media server 108 and an "on demand" media server 110. Each of these sources is capable of transferring media content, such as video, audio, images and the like, to set-top box circuitry 102. In the case of cable-fiber infrastructure 104, such media content is transmitted over a cable, fiber, or hybrid fiber-cable (HFC) network. In the case of satellite infrastructure 106, such media content is transmitted via one or more satellites to a satellite dish 114 that is connected to set top box circuitry 102.

Broadcast media server 108 is intended to broadly represent any system or device that is capable of broadcasting media content to a plurality of entities that includes set-top box circuitry 102. As shown in FIG. 1, broadcast media server 108 is capable of broadcasting such media content over an Internet Protocol (IP) network 112 for receipt by set-top box circuitry 102. IP network 112 is intended to represent one or more computer networks that utilize IP-based technologies to facilitate the transfer of data between entities in a packetized form. IP network 112 may comprise, for example, a public IP network such as the Internet, a private IP network, or a combination of public and private IP networks. IP network 112 may be implemented using wired communication mediums, wireless communication mediums, or a combination of wired and wireless communication mediums. Broadcast media server 108 may additionally or alternatively transfer media content to set-top box circuitry 102 via cable-fiber infrastructure 104 or satellite infrastructure 106.

"On demand" media server 110 is intended to broadly represent any system or device that is capable of selectively transferring media content to entities that have requested such content, wherein the requesting entity may comprise set-top box circuitry 102. Like broadcast media server 108, "on demand" media server 110 is capable of transferring such media content over IP network 112, cable-fiber infrastructure 104, and/or satellite infrastructure 106. When set-top box circuitry 102 is the requesting entity, the request for the media content may be transferred from set-top box circuitry 102 to "on demand" media server 110 via IP network 112, via satellite infrastructure 106, via cable-fiber infrastructure 104, or via some other communication path.

Remote media content sources other than those shown in FIG. 1 may also be used to transfer media content to set-top box circuitry 102. For example, a terrestrial broadcaster may broadcast media content over one or more radio frequency (RF) channels, such as the well-known VHF and UHF channels, to set-top box circuitry 102. Still other remote media content sources not shown in FIG. 1 may be used.

Local external device 116 may also transfer media content to set-top box circuitry 102 and thus may also be considered a media content source. In contrast to the remote media content sources discussed above, local external device 116 is typically located on the same premises as set top box circuitry 102. Local external device 116 may comprise, for example and without limitation, a computer (e.g., a laptop computer, a tablet computer, a desktop computer), a Digital Versatile Disc (DVD) player, a Blu-ray™ disc player, a video gaming console, a personal media player (e.g., an Ipod®), a telephone (e.g., a cellular phone, smart phone), or a personal digital assistant (PDA). Local external device 116 is connected to set-top box circuitry 102 via at least one interface suitable for transferring media content thereto. Such interface may comprise, for example, a wired or wireless interface.

Depending upon the implementation, local external device 116 may store and retrieve media content from local media storage 132. Local media storage 132 may comprise, for example and without limitation, a hard disk or solid state drive integrated with or connected to local external device 116 or a storage system comprising one or more storage devices connected to local external device 116 (e.g., network attached storage (NAS), a storage area network (SAN), or the like). Local external device 116 may also be configured to retrieve media content from removable media storage 134. Such removable media storage 134 may comprise, for example and without limitation, a DVD, a Blu-ray™ disc, a smart card, a USB flash drive, or any other portable device or recording medium capable of storing media content in a manner that allows for access thereto by local external device 116.

As further shown in FIG. 1, set top box circuitry 102 includes local media storage 124 and removable media storage 126. These elements may also act as sources of media content and may be implemented in a like manner to local media storage 132 and removable media storage 134, respectively, as described above in reference to local external device 116.

Display system 118 is intended to represent a system that can receive media content received from set-top box circuitry 102 and present such content to one or more viewers via a screen assembly 142. Display system 118 may represent, for example and without limitation, a television, a projection system, a monitor, a computing device (e.g., desktop computer, laptop computer, tablet computer) or handheld device (e.g., a cellular phone, smart phone, personal media player, personal digital assistant), wherein the computing or handheld device has at least one attached or integrated display. Display system 118 is connected to set-top box circuitry 102 via at least one interface suitable for receiving media content therefrom. Display system 118 may also be able to display content received from other sources in addition to set-top box circuitry 102.

In certain implementations, screen assembly 142 is capable of producing visual presentations in (i) full-screen 2D; (ii) full-screen 3Dx (wherein x denotes the number of perspective views that are simultaneously presented); (iii) combined regional 2D and 3D areas of the display; and (iv) combined regional 3Dx and 3Dx-n areas of the display. For example, in certain implementations, screen assembly 142 can be configured to simultaneously produce a visual display of: (a) a single sequence of frames underlying a two-dimensional video presentation within a first screen region; and (b) both a second and third sequence of frames underlying two views that together comprise a three-dimensional video presentation within a second screen region.

Various examples of screen assemblies that can support such two-dimensional and three-dimensional viewing modes are described in the following commonly-owned, co-pending U.S. patent applications: U.S. patent application Ser. No. 12/845,409, filed on Jul. 28, 2010, and entitled "Display with Adaptable Parallax Barrier"; U.S. patent application Ser. No. 12/845,440, filed on Jul. 28, 2010, and entitled "Adaptable Parallax Barrier Supporting Mixed 2D and Stereoscopic 3D Display Regions"; and U.S. patent application Ser. No. 12/845,461, filed on Jul. 28, 2010, and entitled "Display Supporting Multiple Simultaneous 3D Views." The entirety of each of these applications is incorporated by reference herein. Screen assembly 142 may be implemented in accordance with descriptions provided in the above-referenced applications. However, screen assembly 142 may be implemented using other approaches as well.

Depending upon the implementation, then, display system 118 may be capable of displaying media content of the following types: (1) media content that represents a single view of certain subject matter, which may be referred to herein as two-dimensional (2D) media content; (2) media content that represents two views of the same subject matter that when displayed provide a single three-dimensional view thereof, which may be referred to herein as 3D 2 media content; and (3) media content that represents some multiple of two views of the same subject matter that when displayed provides multiple three-dimensional views thereof, wherein the particular three-dimensional view that is perceived by a viewer is dependent at least in part on the viewer's position relative to screen assembly 142 of display system 118. The last type of media content may be referred to herein as 3D x media content, wherein x is a multiple of 2. Thus, for example, when an implementation of display system 118 is displaying 3D4 media content via screen assembly 142, it is simultaneously displaying four different views of the same subject matter that are perceivable as two different three-dimensional views. Both 3D 2 media content and 3D x media content may be generally referred to herein as "three-dimensional media content."

In addition to the foregoing capabilities, screen assembly 142 may also be capable of simultaneously displaying different types of media content in different regions of the same screen. By way of example, screen assembly 142 may be capable of simultaneously displaying 2D media content in a first region of a screen, 3D 2 media content in a second region of the screen, and 3D 8 media content in a third region of the screen. A wide variety of other combined regional two-dimensional and three-dimensional display schemes may be supported by screen assembly 142. Screen assemblies having such capabilities are described in the aforementioned, incorporated U.S. patent application Ser. No. 12/845,440, filed on Jul. 28, 2010, and entitled "Adaptable Parallax Barrier Supporting Mixed 2D and Stereoscopic 3D Display Regions."

Various example implementations of display system 118 will be described in Section IV, below.

Set-top box circuitry 102 performs a variety of functions related to obtaining media content from one or more of the media content sources shown in FIG. 1 and providing such media content, or a substitute therefor, to display system 118 in a manner and format suitable for display by screen assembly 142. These functions, which will be described in more detail herein, are generally performed by processing circuitry 122.

With respect to obtaining media content from the one or more media content sources, processing circuitry 122 is configured to receive signals from a remote control device 120 and/or one or more other user input devices operated by a viewer of display system 118, wherein such signals may indicate which media content should be obtained and from which source. Based on such signals, processing circuitry 122 may tune to a selected broadcast channel associated with a particular media content source, send a request for content to a particular "on demand" media content source or the like. Such media content is then received by set-top box circuitry 102 via an appropriate interface (not shown in FIG. 1).

With respect to providing received media content, or a substitute therefor, to display system 118 in a manner and format suitable for display by screen assembly 142, processing circuitry 122 is configured to perform a variety of functions. The functions performed by processing circuitry 122 in this regard may depend on one or more factors including a current viewing environment that is defined by one or more of the inherent capabilities of screen assembly 142, a current operating mode of screen assembly 142, the implementation of the element or elements that comprise the communication path between set-top box circuitry 102 and screen assembly 104, and the current state of such element(s).

Media content received from a media content source may have one or more display requirements associated therewith. For example, such media content may comprise three-dimensional media content that is formatted for display in a three-dimensional viewing mode only. However, the current viewing environment, as defined above, may not support the viewing of such three-dimensional media content. For example, the design and/or current operating mode of screen assembly 142 may render it incapable of displaying such three-dimensional media content. Additionally, the implementation and/or state of the element(s) that comprise the communication path between set-top box circuitry 102 and display system 118 may render the communication path incapable of carrying such three-dimensional media content to display system 142 at all or at a suitable data rate. Thus, the current viewing environment may have limitations associated therewith that will not allow the display requirements associated with the media content to be met.

As will be described in more detail herein, in situations where the current viewing environment comprises limitations that will not allow the display requirements associated with the media content to be met, processing circuitry 122 may process the media content to yield processed media content having display requirements that can be met by the current viewing environment, which is then delivered to display system 118. Thus, in further accordance with the previous example in which the viewing environment is incapable of displaying three-dimensional media content, processing circuitry 122 may process the three-dimensional media content to produce two-dimensional media content that is viewable in two dimensions and then deliver the two-dimensional media content to display system 118 for display thereby.

Additionally, in situations where the current viewing environment comprises limitations that will not allow the display requirements associated with the media content to be met, processing circuitry 122 may also obtain substitute media content which is then delivered to display system 118 instead of the original media content. Thus, in further accordance with the previous example in which the viewing environment is incapable of displaying three-dimensional media content, processing circuitry 122 may obtain a two-dimensional version of the same media content from a media content source and deliver the two-dimensional version to display system 118 instead of the three-dimensional version.

Certain constraints associated with the current viewing environment may arise from having insufficient viewing environment resources to accommodate the simultaneous display of different media content by display system 118. For example, in an embodiment in which display system 118 includes a television screen that is capable of displaying high-definition 3D content, such television screen may display first media content in the form of a high-definition 3D movie retrieved by set-top box circuitry 102 from a local media source. The high-definition 3D movie may be displayed using the full display area of the television screen and the delivery of such high-definition 3D movie may utilize the full capability of the communication link between set-top box circuitry 102 and the screen. This may prove manageable until a viewer requests a picture-in-picture window presentation of second media content, such as a broadcast television channel. In order to accommodate this request, both the first and second media content would need to be delivered to and displayed by the television screen simultaneously. However, this would exceed the limitations of the viewing environment. As the viewer adds other media content requests, the problem is exacerbated. To accommodate the requests of the viewer, set-top box circuitry 102 in accordance with an embodiment will (i) reduce a resource requirement of the first media content to accommodate the second media content, or (ii) reduce a resource requirement of the second media content to minimize its impact on the first media content. Performing one or the other of such reductions may suffice depending on the specific circumstances.

Such resource requirement reductions may take many forms including: (a) reducing media content resolution; (b) removing data from the first media content that corresponds to the area that is overlapped by the second media content; (c) combining the second media content with the first media content to yield third media content that is delivered in substitution for the first and second media content; (d) discarding, in either or both of the first and second media content, one or more perspective view frame sequences of a 3D presentation; (e) changing the frame rate of either or both of the first and second media content including discarding frames in the process; (f) retrieving or requesting a reduced version of either or both the first and second media content from the source of such media content or from an alternate source; or the like. For many of these reduction processes, set-top box circuitry 102 first performs decoding of some or all incoming media content to extract raw video frame sequences there from before performing reduction processing thereon. Thereafter, set-top box circuitry 102 may deliver to display system 118 the resulting reduction as one or more substitute raw video frame sequence(s). The substitute raw video frame sequence(s) may also be re-encoded by set-top box circuitry 102 before making such delivery.

The foregoing provides only a few examples of display requirements associated with media content, limitations associated with the viewing environment, and operations performed by processing circuitry 122 to ensure that the display requirements associated with media content delivered to display system 118 are within the limitations of the viewing environment. Additional examples and details associated therewith will be provided in subsequent sections herein.

Furthermore, processing circuitry 122 may perform functions relating to obtaining and providing media content to display system 118 that are based on information concerning characteristics of a media content source and/or a communication path over which media content is received from a media content source. For example, as will be described in more detail herein, in situations in which a media content source is overloaded or unavailable, or in which there are bandwidth or other constraints on a communication path over which media content is to be received, processing circuitry 122 may perform operations such as, but not limited to, selectively reducing a number of views that are included in media content to be delivered to display system 118.

In certain implementations of system 100, set-top box circuitry 102 is enclosed in a housing that is separate from local external device 116 and display system 118. In alternate implementations, set-top box circuitry 102 is integrated into a component of display system 118. For example, set-top box circuitry 102 may be integrated into a television that comprises all or a portion of display system 118. In still further embodiments, set-top box circuitry 102 may be integrated into local external device 116. For example, depending upon the implementation, set-top box circuitry 102 may be integrated within a DVD player, a Blu-ray™ disc player, a video gaming console, or other device. Thus, it is to be understood that although processing circuitry 122, local media storage 124 and removable media storage 126 are collectively referred to collectively as "set-top box circuitry" in FIG. 1, those components need not be housed in a set top box.

III. Example Set-Top Box Circuitry

Figure 2:
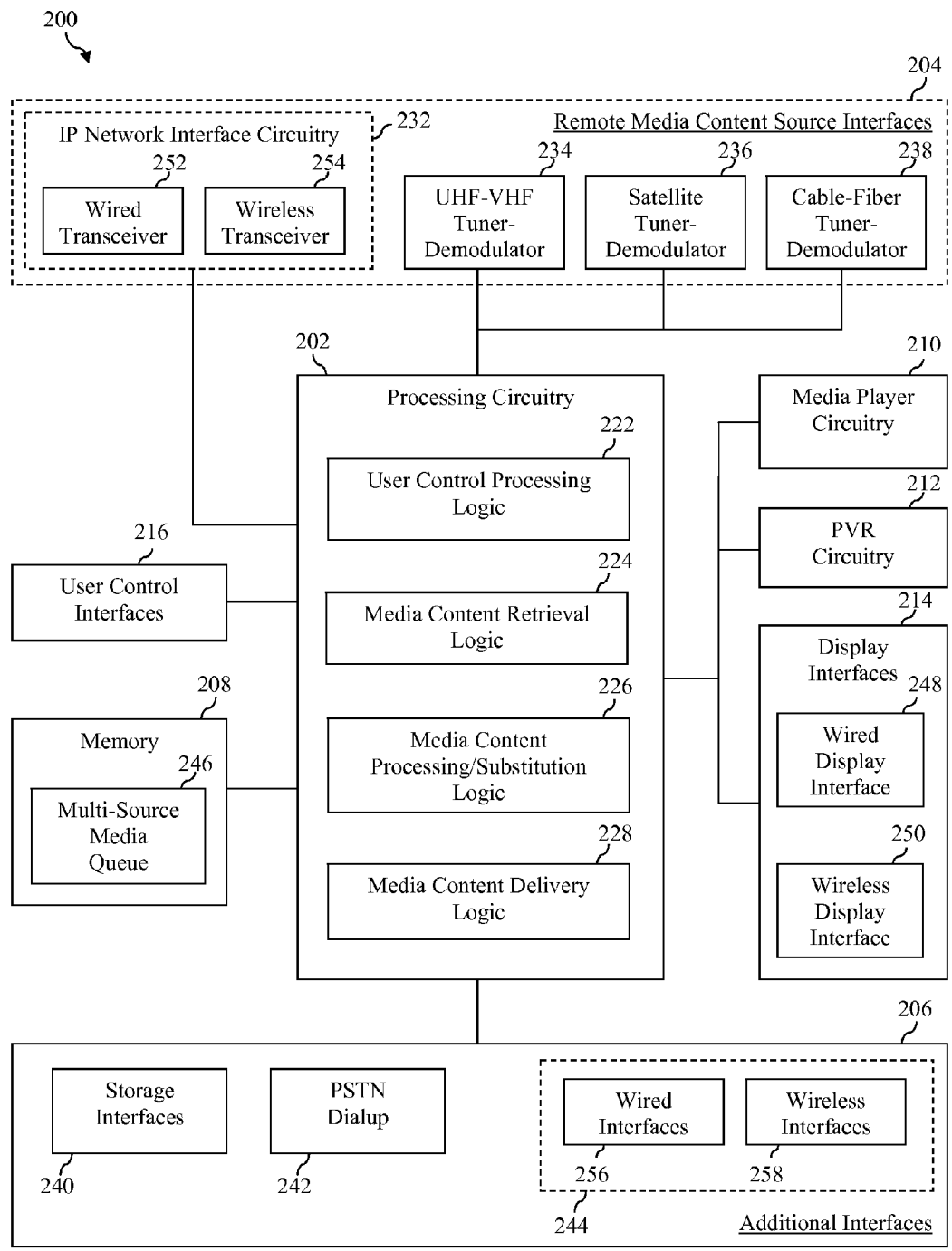
FIG. 2 is a block diagram of example set-top box circuitry in accordance with an embodiment.

FIG. 2 is a block diagram of example set-top box circuitry 200 in accordance with one embodiment. Set-top box circuitry 200 may comprise one example of an implementation of set-top box circuitry 102 as described above in reference to system 100 of FIG. 1. However, set-top box circuitry 200 may also represent other types of set-top box circuitry and may be used to implement systems other than system 100.

As shown in FIG. 2, set-top box circuitry 200 includes processing circuitry 202 that is communicatively connected to a plurality of remote media content source interfaces 204, a plurality of additional interfaces 206, a memory 208, media player circuitry 210, personal video recorder (PVR) circuitry 212, a plurality of display interfaces 214, and a plurality of user control interfaces 216.

Remote media content source interfaces 204 comprise interfaces that allow set-top box circuitry 200 to be connected to and communicate with remote media content sources. For example, set-top box circuitry 200 can be connected to and receive media content from one or more remote media content sources via any of remote media content source interfaces 204. Remote media content source interfaces 204 include IP network interface circuitry 232, a UHF-VHF tuner-demodulator 234, a satellite tuner-demodulator 236 and a cable-fiber tuner demodulator 238.

IP network interface circuitry 232 comprises circuitry that enables set-top box circuitry 200 to be connected to and communicate with remote media content sources via an IP network, such as IP network 112 described above in reference to FIG. 1. As shown in FIG. 2, IP network interface circuitry 232 may comprise a wired transceiver 252 for communicating with an IP network over a wired communication medium and a wireless transceiver 254 for communicating with an IP network over a wireless communication medium. Wired transceiver 252 may comprise, for example and without limitation, an Ethernet transceiver, an ISDN transceiver, a DSL transceiver, an ADSL transceiver or the like. Wireless transceiver 254 may comprise, for example, and without limitation, an IEEE 802.11 transceiver, a WiMax transceiver, or the like. Set-top box circuitry 200 may include still other interfaces (not shown in FIG. 2) that enable it to be connected to and communicate with remote media content sources via an IP network.

UHF-VHF tuner-demodulator 234 comprises a tuner that can be controlled to selectively receive modulated carrier signals via any of a plurality of VHF and UHF RF channels and a demodulator that operates to recover baseband signals from the modulated carrier signals. The baseband signals may represent media content broadcast by any of a variety of UHF-VHF terrestrial broadcasting sources. UHF-VHF tuner-demodulator 234 may be connected to an external UHF-VHF antenna to enable the reception of the modulated carrier signals.

Satellite tuner-demodulator 236 comprises a tuner that can be controlled to selectively receive modulated carrier signals via any of a plurality of satellite television channels and a demodulator that operates to recover baseband signals from the modulated carrier signals. The baseband signals may represent media content broadcast by a satellite service provider via equipment such as that generally represented by satellite infrastructure 106 shown in FIG. 1. Satellite tuner-demodulator 236 may be connected to an external satellite dish, such as satellite dish 114 shown in FIG. 1, to enable the reception of the modulated carrier signals.

Cable-fiber tuner-demodulator 238 comprises a tuner that can be controlled to selectively receive modulated carrier signals from any of a plurality of cable television channels and a demodulator that operates to recover baseband signals from the modulated carrier signals. The baseband signals may represent media content broadcast by a cable service provider via equipment/links such as that generally represented by cable-fiber infrastructure 104 shown in FIG. 1. Cable-fiber tuner-demodulator 238 may be connected to a coaxial or fiber-optic cable that comprises a part of such infrastructure to enable the reception of the modulated carrier signals.

Additional interfaces 206 include storage interfaces 240, a Public Switched Telephone Network (PSTN) dialup interface 242, and local device interfaces 244.

Storage interfaces 240 comprise interfaces that enable set-top box circuitry to access one or more storage devices or systems. Such storage devices and systems may be accessed, by way of example and without limitation, for the purpose of recording media content (e.g., for the purpose of recording media content received from a remote media content source) and for retrieving stored media content. Storage interfaces 240 may comprise, for example, a Serial Advanced Technology Attachment (SATA) interface for connecting to a hard disk drive, a smart card interface for accepting and interacting with a smart card, a USB interface for connecting to a USB flash drive, or the like. Storage interfaces 240 may also comprise interfaces suitable for communicating with a storage system such as NAS, SAN, or the like.

PSTN dialup interface 242 comprises an interface that allows modems and phones to interact with set-top box circuitry 200 (e.g., via a direct connection or via twisted pair home phone wiring). Such interaction may enable set-top box circuitry 200 to communicate with remote entities, such as remote media content sources, for the purposes of transmitting media requests or payment information thereto and/or for the purposes of receiving low-bandwidth media content therefrom. Such interaction may enable set-top box circuitry 200 to perform other functions as well.

Local device interfaces 244 comprise other interfaces that allow set-top box circuitry 200 to connect to and communicate with locally-situated devices. Such locally-situated devices may be capable of delivering media content to set-top box circuitry 200 and/or storing or playing media content received from set-top box circuitry 200. Local device interfaces 244 comprise wired interfaces 256 and wireless interfaces 258. Wired interfaces 256 comprise interfaces for connecting to a local device via a wired communication medium and may comprise, for example and without limitation, a USB interface, an Ethernet interface, a Firewire interface, a fiber interface, or the like. Wireless interfaces 256 comprise interfaces for connecting to a local device via a wireless communication medium and may comprise, for example and without limitation, an IEEE 802.11 (WiFi) interface, a Bluetooth® interface, a Zigbee interface, an infrared (FR) interface, or the like.

Media player circuitry 210 comprises circuitry that may either be internal or external with respect to set-top box circuitry 200 and that is configured to play media content stored on a recording medium associated therewith. For example, media player circuitry 210 may comprise an internal or external DVD player, Blu-ray™ disc player, or the like. Media content played by media player circuitry 210 may be streamed by processing circuitry 202 to a display via one of display interfaces 214.

PVR circuitry 212 comprises circuitry that performs the functions of a PVR, which include allowing users to select media content made available by a media content source, recording such content when it is broadcast or otherwise delivered to set-top box circuitry 200 by the remote media content source, and then allowing such content to be played back via a display system connected to one of display interfaces 214 at a time of the user's choosing. PVR circuitry 212 may be internal to set-top box circuitry 200 or may comprise an external PVR device that connects to and operates in conjunction with set-top box circuitry 200.

Memory 208 is intended to represent one or more internal memory devices that are configured to store data and instructions necessary to allow processing circuitry 202 to perform functions to be described herein. Memory 208 may comprise any suitable type of memory device, including but not limited to non-volatile memory devices such as read-only memory (ROM) and flash memory devices and volatile memory devices such as random-access memory (RAM) devices. As shown in FIG. 2, memory 208 includes a multi-source media queue 246 which, as will be described herein, enables processing circuitry 202 to combine media content from different media content sources for delivery to a single display.

Display interfaces 214 comprise interfaces for connecting set-top box circuitry 200 to a display system (such as display system 118 of FIG. 1). Display interfaces 214 enable set-top box circuitry to deliver media content to a display system for presentation thereon. As discussed above in reference to FIG. 1, such display systems may include for example and without limitation, a television, a projection system, a monitor, a computing device or handheld device, wherein the computing or handheld device has at least one attached or integrated display. As shown in FIG. 2, display interfaces 214 may include wired display interfaces 248 and wireless display interfaces 250.

User control interfaces 216 comprise interfaces that enable communication between set-top box circuitry 200 and one or more user control devices or mechanisms. User control devices that may connect to set-top box circuitry 200 via user control interfaces 216 may comprise, for example, a remote control device such as remote control device 120 of FIG. 1, or any other user input device that is suitable for sending commands and other information to set-top box circuitry 200. To support such devices, user control interfaces 216 may comprise wireless interfaces such as infrared (I/R) or RF interfaces as well as wired interfaces such as wired serial interfaces. User control interfaces 216 may also enable communication with buttons or other control mechanisms provided on a housing that encloses set-top box circuitry 200.

As shown in FIG. 2, processing circuitry 202 is connected to all the foregoing components of set-top box circuitry 200 and comprises at least user control processing logic 222, media content retrieval logic 224, media content processing/substitution logic 226 and media content delivery logic 228. Depending upon the implementation, each of these elements may be implemented in hardware (i.e., using suitably configured analog and/or digital circuits), software (e.g., through the execution of appropriate instructions by one or more general purpose or special-purpose processors), or as a combination of hardware and software. In certain implementations, operations performed by these elements on video and audio content may be handled by dedicated video and audio processing circuitry. Each of these elements will now be described.

A. User Control Processing Logic

User control processing logic 222 represents logic that interprets commands and other information received from one or more control devices or mechanisms via user control interfaces 216 so that processing circuitry 202 can perform operations based thereon. In one embodiment, user control processing logic 222 may utilize a control application programming interface (API) that facilitates the mapping of each of a predefined set of controller commands associated with the API to the underlying functionality necessary to execute the commands.

B. Media Content Retrieval Logic

Media content retrieval logic 224 represents logic that is capable of retrieving media content from any of the various media sources that can be connected to set-top box circuitry 200. Media content retrieval logic 224 may be invoked, for example, by user control processing logic 222 in response to the processing of commands or other information received from a control device or mechanism. Media content retrieval logic 224 may also be invoked to carry out other functionality implemented by processing circuitry 202.

For example, in response to the processing of certain commands by user control processing logic 222, media content retrieval logic 224 may cause any of UHF-VHF tuner-demodulator 234, satellite tuner-demodulator 236 or cable-fiber tuner-demodulator 238 to tune to a particular broadcast channel to obtain media content therefrom. As another example, in response to the processing of certain commands by user control processing logic 222, media content retrieval logic 224 may issue a request for media content to a remote media content source and then retrieve such media content when the request is serviced. As discussed above, such media content may be delivered via any of remote media content source interfaces 204. By way of further example, in response to the processing of certain commands by user control processing logic 222, media content retrieval logic 224 may retrieve media content from a storage device or system connected to any of storage interfaces 240, from media player circuitry 210, from PVR circuitry 212 or from a local device connected to local device interfaces 244.

In one embodiment, media content retrieval logic 224 is configured to retrieve content from multiple content sources when necessary in order to satisfy a request for media content. This functionality will now be further described in reference to flowchart 300 of FIG. 3, which represents one method by which set-top box circuitry may retrieve requested media content in accordance with an embodiment. Although the method of flowchart 300 will be described herein in reference to certain elements of set-top box circuitry 200 of FIG. 2, persons skilled in the relevant art(s) will appreciate that the method is not limited to that implementation.

Figure 3:
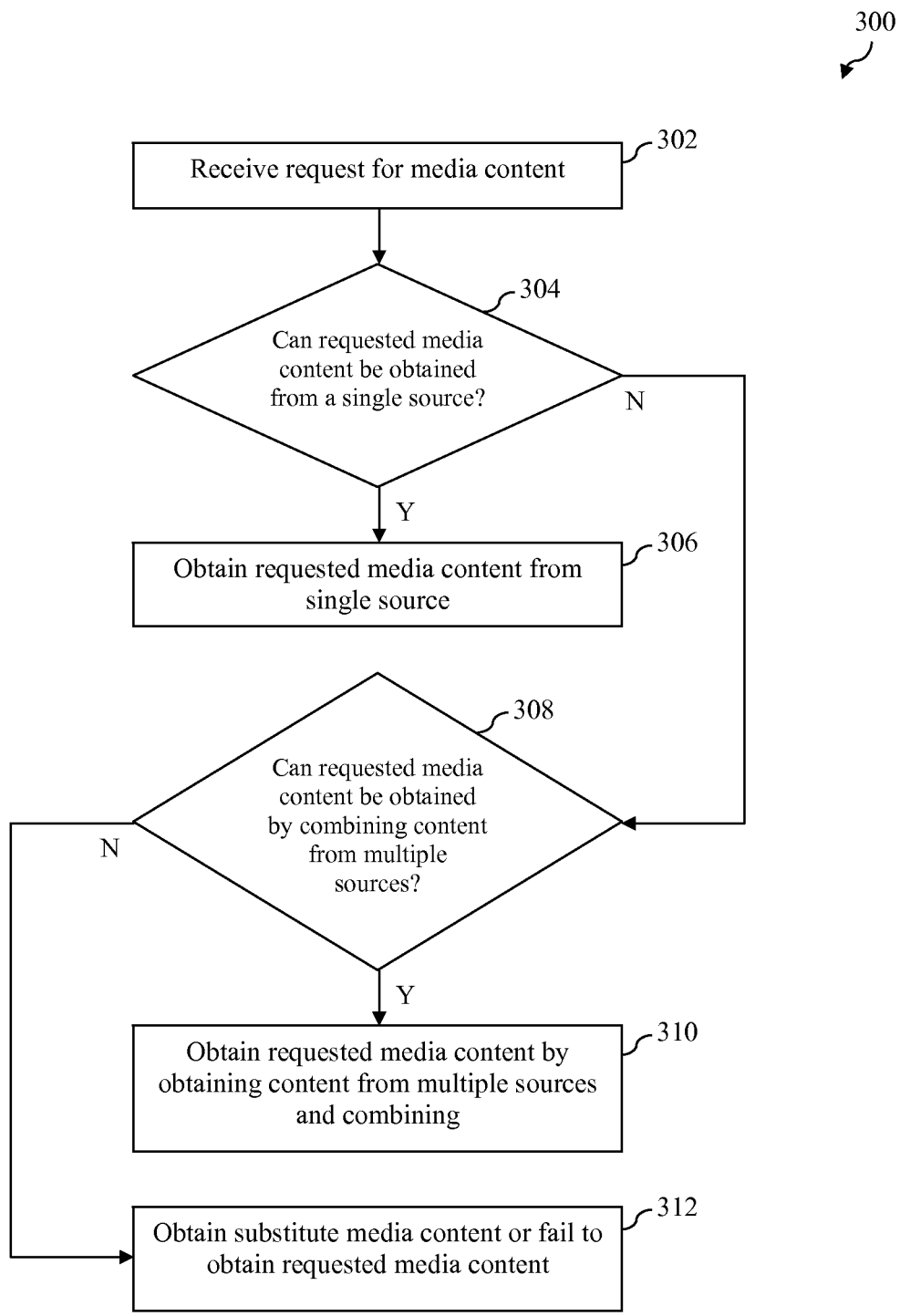
FIG. 3 depicts a flowchart of a method by which set-top box circuitry may retrieve requested media content in accordance with an embodiment.

As shown in FIG. 3, the method of flowchart 300 begins at step 302 in which set-top box circuitry 200 receives a request for media content. Such request may be received, for example, from a user-operated control device or mechanism via any one of user control interfaces 216 and interpreted by user control processing logic 222. User control processing logic 222 may then invoke media content retrieval logic 224 to service the request.

At decision step 304, media content retrieval logic 224 determines if the requested media content can be obtained from a single content source. As discussed in commonly-owned, co-pending U.S. patent application Ser. No. 12/982,053, filed on even date herewith and entitled "Hierarchical Video Compression Supporting Selective Delivery of Two-Dimensional and Three-Dimensional Video Content," the entirety of which is incorporated by reference herein, three-dimensional media content may be obtained by combining different digital video streams corresponding to different views of the same subject matter. Thus, the performance of step 304 may include determining whether or not a single media content source can deliver a single digital video stream or multiple digital video streams that when combined provide sufficient views to enable a desired three-dimensional viewing mode.

If it is determined during decision step 304 that the requested media content can be obtained from a single content source, then media content retrieval logic 224 obtains the requested media content from the single content source as shown at step 306. Thus, for example, if the request received during step 302 comprised a request for two-dimensional media content and media content retrieval logic 224 determines that the requested two-dimensional media content can be obtained from a single media content source, then media content retrieval logic 224 will obtain the requested two-dimensional media content from the single media content source. As another example, if the request received during step 302 comprised a request for 3D2 media content and media content retrieval logic 224 determines that the requested 3D2 media content can be obtained from a single media content source, then media content retrieval logic 224 will obtain the requested 3D2 media content from the single media content source. As a still further example, if the request received during step 302 comprises a request for 3D2 media content and media content retrieval logic 224 determines that the requested 3D2 media content can be obtained by combining two digital video streams that can be obtained from a single media content source, each digital video stream representing a different view of the same subject matter, then media content retrieval logic 224 will obtain the two digital video streams from the same single media content source and invoke media content processing/substitution logic 226 to combine the streams.

However, if it is determined at decision step 304 that that the requested media content cannot be obtained from a single content source, then control flows to decision step 308. During decision step 308, media content retrieval logic 224 determines whether the requested media content can be obtained by combining media content from multiple sources. For example, the performance of step 308 may include determining whether or not there are multiple content sources that can each deliver one or more digital video streams, the delivered video streams when combined providing sufficient views to enable a desired three-dimensional viewing mode.

If it is determined during decision step 308 that the requested media content can be obtained by combining media content from multiple sources, then media content is obtained from the multiple sources and provided to media content processing/substitution logic 228 for combination thereby. Thus, for example, if the requested media content comprises 3D2 media content and it is determined that media player circuitry 210 can deliver a first digital video stream representing a first view and a remote media content source connected to one of interfaces 204 can deliver a second digital video stream representing a second view, the first and second digital video streams being combinable into the requested 3D2 media content, then media content retrieval logic 224 will obtain the first and second digital video streams from media player circuitry 210 and the remote media content source, respectively, and provide the streams to media content processing/substitution logic 226 for combination thereby. This is only one example, and persons skilled in the relevant art(s) will appreciate that any number of digital video streams may be obtained from different media content sources and combined to provide a desired form of three-dimensional media content in accordance with embodiments.

However, if it is determined during decision step 308 that the requested media content also cannot be obtained by combining media content from multiple sources, then media content retrieval logic 312 may obtain substitute media content. For example, if requisite digital video streams cannot be obtained to generate requested 3D2 media content, media content retrieval logic 224 may obtain a two-dimensional version of the requested 3D2 media content instead. Alternatively, media content retrieval logic 224 may simply fail to retrieve any media content. In accordance with such an event, a message may be displayed to a viewer via a display system connected to one of display interfaces 214 that the requested media content is not available.

In accordance with a further embodiment, media content retrieval logic 224 is configured to obtain supplemental media content from a content source responsive to receiving a request for media content, the supplemental media content intended to be combined with the requested media content. This functionality will now be further described in reference to flowchart 400 of FIG. 4, which represents one method by which set-top box circuitry may retrieve requested media content and supplemental media content for combination therewith in accordance with an embodiment. Although the method of flowchart 400 will be described herein in reference to certain elements of set-top box circuitry 200 of FIG. 2, persons skilled in the relevant art(s) will appreciate that the method is not limited to that implementation.

Figure 4:
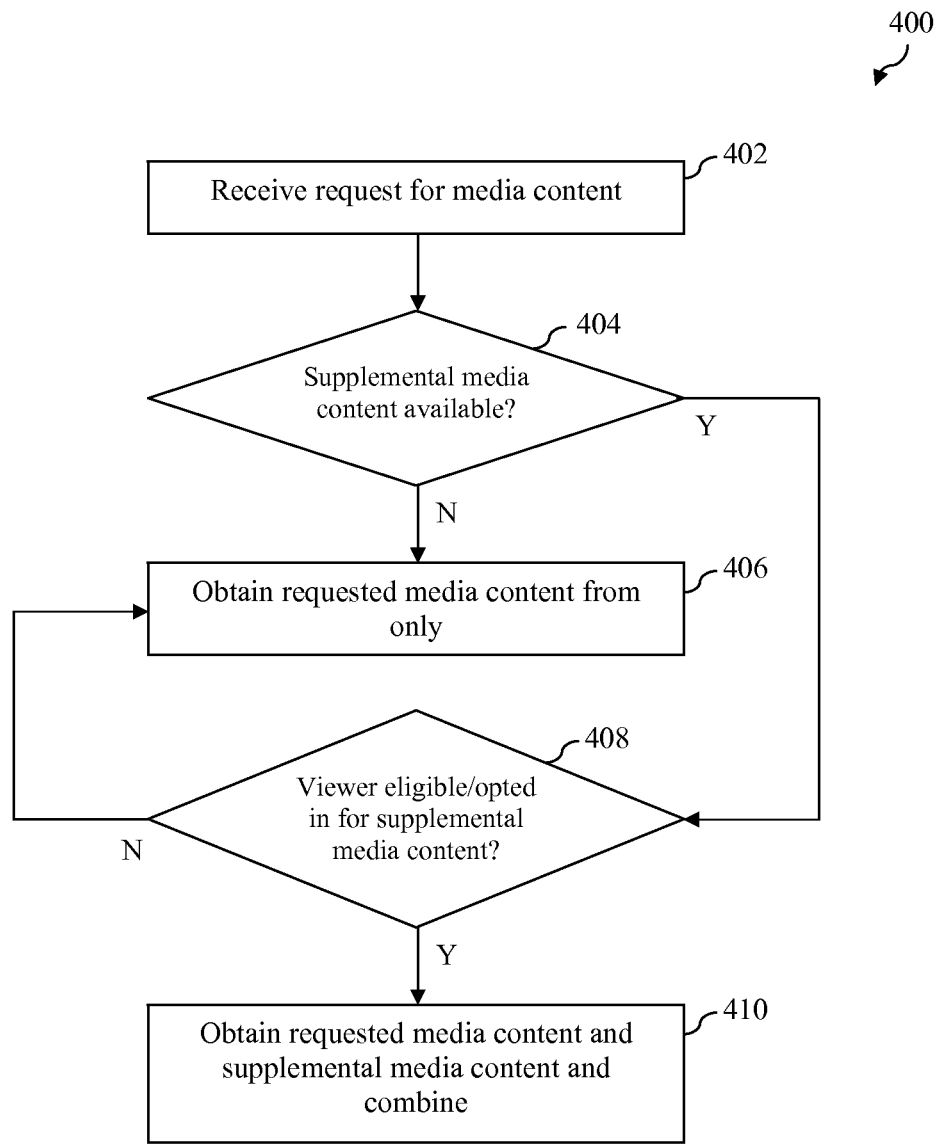
FIG. 4 depicts a flowchart of a method by which set-top box circuitry may retrieve requested media content and supplemental media content for combination therewith in accordance with an embodiment.

As shown in FIG. 4, the method of flowchart 400 begins at step 402 in which set-top box circuitry 200 receives a request for media content. Such request may be received, for example, from a user-operated control device or mechanism via any one of user control interfaces 216 and interpreted by user control processing logic 222. User control processing logic 222 may then invoke media content retrieval logic 224 to service the request.

At decision step 404, media content retrieval logic 224 determines if supplemental media content is available for combination with the requested media content. Such supplemental media content may include, but is not limited to, related supplemental media content or unrelated supplemental media content. Related supplemental media content may include, for example and without limitation, additional digital video streams that can be combined with the requested media content to provide additional views (e.g., to convert two-dimensional media content to 3D2 media content, to convert 3D2 media content to 3D4 media content, or the like) or graphics or textual content that can be combined with the requested media content to provide an enhanced or modified viewing experience (e.g., graphics or textual "overlays" that provide a viewer with supplemental information about the media content they are viewing or providing commercial offers relating to the media content they are viewing). Unrelated supplemental media content may include, for example and without limitation, graphical or textual content that provide the viewer with information (e.g., the weather, local time, news headlines, etc.), commercial offers (e.g., advertisements or the like), or other media content that bears no special relation to the subject matter of the requested media content. Such supplemental media content may be made available by the same media content source from which the media content is being requested or from a different media source.

If it is determined during decision step 404 that no supplemental media content is available, then only the requested media content is obtained as shown at step 406. However, if it is determined during decision step 404 that supplemental media content is available, then control flows to decision step 408.

During decision step 408, media content retrieval logic 224 determines if a viewer that requested the media content is eligible to receive the supplemental media content or has opted into receiving such supplemental media content. Viewer eligibility may be determined by requiring the viewer to perform steps necessary to purchase the supplemental media content. Such a purchase may be carried out, for example, by providing appropriate instructions and license information via the display system to which the media content is to be delivered and by accepting certain user inputs via a control device or mechanism connected to one of user control interfaces 216. Viewer eligibility may also be determined based on a service plan to which the viewer has subscribed, or in some other manner. In other embodiments, the determination of whether the viewer should receive supplemental content may be based on viewer preference information received and stored by set-top box circuitry 200 or by an entity to which set-top box circuitry 200 can communicate. For example, a viewer may opt in or out of receiving such supplemental media content.

If it is determined during decision step 408 that the viewer is not eligible to receive supplemental media content or has opted out of receiving supplemental media content, then only the requested media content is obtained as shown at step 406. However, if it is determined during decision step 408 that the viewer is eligible to receive supplemental media content, then media content retrieval logic 224 obtains both the requested media content and the supplemental media content and provides both to media content processing/substitution logic 226 for combination thereby. The media content and the supplemental media content may be obtained from the same media source or from different media sources. It is also noted that the media content and the supplemental media content may each be generated by combining media content from the same or different media content sources.

In accordance with a still further embodiment, media content retrieval logic 224 is configured to obtain substitute media content instead of requested media content if certain constraints are exceeded by a display or delivery requirement associated with the requested media content. This functionality will now be further described in reference to flowchart 500 of FIG. 5, which represents one method by which set-top box circuitry may selectively retrieve substitute media content instead of requested media content in accordance with an embodiment. Although the method of flowchart 500 will be described herein in reference to certain elements of set-top box circuitry 200 of FIG. 2, persons skilled in the relevant art(s) will appreciate that the method is not limited to that implementation.

Figure 5:
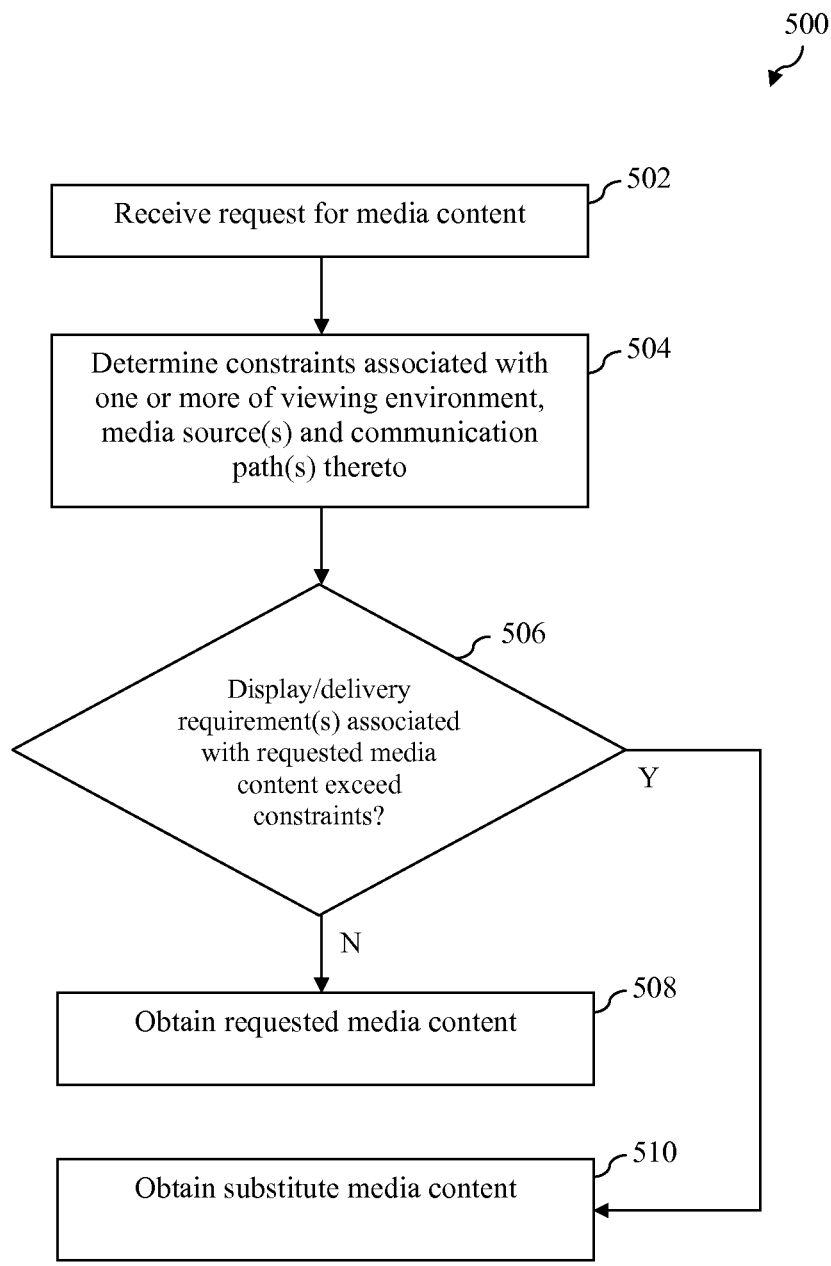
FIG. 5 depicts a flowchart of a method by which set-top box circuitry may selectively retrieve substitute media content instead of requested media content in accordance with an embodiment.

As shown in FIG. 5, the method of flowchart 500 begins at step 502 in which set-top box circuitry 200 receives a request for media content. Such request may be received, for example, from a user-operated control device or mechanism via any one of user control interfaces 216 and interpreted by user control processing logic 222. User control processing logic 222 may then invoke media content retrieval logic 224 to service the request.

At step 504, media content retrieval logic 224 determines constraints associated with one or more of the following: a media content source from which the requested media content is to be obtained, a communication path over which the requested media content is to be delivered from the media content source to set-top box circuitry 200, and/or a viewing environment associated with the display of the requested media content, the viewing environment including at least the display system that is intended to present the requested media content (including a screen assembly thereof), a communication path over which the requested media content will be delivered from set-top box circuitry 200 to the display system, and the particular display interface used to connect set-top box circuitry 200 to the display system.

Example constraints that may be associated with the media content source from which the requested media content is to be obtained may include, for example, media content items and types provided by the media content source, encoding formats used by the media content source, whether or not the media content source is available, on-line or in an operational state, a current degree of loading of the media content source, or the like. Where the constraints associated with a particular media content source are fixed, set-top box circuitry 200 may be preconfigured to include knowledge of such constraints. Where the constraints associated with a particular media content source are varying, set-top box circuitry 200 may attempt determine the constraints by, for example, communicating or attempting to communicate with the media content source or by some other means.

Example constraints that may be associated with the communication path over which the requested media content is to be delivered from the media content source to set-top box circuitry 200 may include a connection speed (as measured in kilobits per second (kbps) or using some other metric) or bandwidth associated with the communication path, a connection quality (e.g., as measured for example by a signal to noise ratio, a bit error rate or some other metric) associated with the communication path, or the like. Such constraints may be inherent in the implementation of the communication path and/or due to current operating conditions associated with the communication path. Where the constraints associated with the communication path are fixed, set-top box circuitry 200 may be preconfigured to include knowledge of such constraints. Where the constraints associated with the communication path are varying, set-top box circuitry 200 may attempt determine the constraints by, for example, testing the current capabilities of the communication path or by some other means.

Example constraints that may be associated with a screen assembly of the display system may include for example the resolutions supported by the screen assembly, whether the screen assembly can display three-dimensional media content and, if so, what types (e.g., 3D2 media content, 3D4 media content, 3D8 media content, 3D16 media content, etc.), whether the screen assembly can support the simultaneous regional display of both two-dimensional and three-dimensional content or some other screen sharing limitation, or the like. Such constraints may comprise "factory" constraints in that the constraints are inherent in the design of the screen assembly and/or "real-time" constraints in that the constraints are due to a current operating condition or mode of the screen assembly. The constraints associated with the screen assembly may be retrieved by processing circuitry 202 from the display system, by evaluating the performance of the screen assembly, or by some other means. Such communication may occur at power-up and/or periodically during simultaneous operation of both components.

Example constraints that may be associated with the communication path over which the requested media content will be delivered from set-top box circuitry 200 to the display system may include a connection speed or bandwidth associated with the communication path, a connection quality associated with the communication path, or the like. Such constraints may be inherent in the implementation of the communication path and/or due to current operating conditions associated with the communication path. Where the constraints associated with the communication path are fixed, set-top box circuitry 200 may be preconfigured to include knowledge of such constraints. Where the constraints associated with the communication path are varying, set-top box circuitry 200 may attempt determine the constraints by, for example, testing the current capabilities of the communication path or by some other means.

Example constraints that may be associated with the particular display interface used to connect set-top box circuitry 200 to the display system may include the particular data formats supported by the display interface, the bandwidth supported by the display interface, or the like. Since such constraints are typically fixed, set-top box circuitry 200 may be preconfigured to include knowledge thereof At decision step 506, media content retrieval logic 224 determines if certain display and/or delivery requirements associated with the requested media content exceeds any of the constraints determined during step 504. If it is determined during decision step 506 that the display and/or delivery requirements do not exceed the constraints, then media content retrieval logic 224 will obtain the requested media content as shown at step 508. However, if it is determined during decision step 506 that at least one of the display and/or delivery requirements exceeds at least one of the constraints, then media content retrieval logic 224 will obtain substitute media content as shown at step 510. The substitute media content may be obtained from the same media content source that was to provide the requested media content or from a different media content source entirely.

For example, assume that the requested media content comprises 3D2 media content that is to be streamed to set-top box circuitry at a 1080p resolution. If it is determined during decision step 506 that a media content source that is going to provide the 3D2 media content is too overloaded or that the connection to such media content source is currently not fast enough to support the streaming of such content at some minimum bit rate, media content retrieval logic 224 may obtain substitute media content instead. Such substitute media content may comprise, for example, a 2D version of the media content, or a lower-resolution version of the 3D2 media content. This substitute media content will instead be processed by set-top box circuitry 200 and delivered to the requesting display system. The substitute media content may be obtained by media content retrieval logic from the same media content source that was to provide the 3D2 media content or from an entirely different media content source.

In further accordance with the foregoing example, media content retrieval logic 224 may determine during decision step 506 that the requesting display system is not capable of displaying the 3D2 media content, that the display interface cannot support the video format used to represent such 3D2 media content, or that the communication path between set-top box circuitry 200 and the requesting display system is not fast enough to support the streaming of the requested 3D2 media content. For any of these reasons as well, media content retrieval logic 224 may obtain substitute media content instead.

As seen from the foregoing, substitute media content may differ from requested media content in a variety of ways, including the number of different views encompassed by the media content (e.g., 2D, 3D2, or 3Dx where x is a multiple of 2) and/or the resolution of the media content. As will be appreciated by persons skilled in the relevant art(s), the substitute media content may also differ in other ways, including but not limited to video format, encoding type, and the like.

Example constraints that may be associated with a viewing environment may arise from having insufficient viewing environment resources to accommodate the simultaneous display of different media content by a display system. For example, in an embodiment in which the display system includes a screen assembly that is capable of displaying high-definition 3D content, such screen assembly may display first media content in the form of a high-definition 3D movie retrieved by set-top box circuitry 200 from a local media source. The high-definition 3D movie may be displayed using the full display area of the screen assembly and the delivery of such high-definition 3D movie may utilize the full capability of the communication link between set-top box circuitry 200 and the screen assembly. This may prove manageable until a viewer requests a picture-in-picture window presentation of second media content, such as a broadcast television channel. In order to accommodate this request, both the first and second media content would need to be delivered to and displayed by the screen assembly simultaneously. However, this would exceed the limitations of the viewing environment. As the viewer adds other media content requests, the problem is exacerbated. To accommodate the requests of the viewer, during step 510, set-top box circuitry 200 may obtain substitute media content by (i) reducing a resource requirement of the first media content to accommodate the second media content, or (ii) reducing a resource requirement of the second media content to minimize its impact on the first media content. Performing one or the other of such reductions may suffice depending on the specific circumstances.

Such resource requirement reductions may take many forms including: (a) reducing media content resolution; (b) removing data from the first media content that corresponds to the area that is overlapped by the second media content; (c) combining the second media content with the first media content to yield third media content that is delivered in substitution for the first and second media content; (d) discarding, in either or both of the first and second media content, one or more perspective view frame sequences of a 3D presentation; (e) changing the frame rate of either or both of the first and second media content including discarding frames in the process; (f) retrieving or requesting a reduced version of either or both the first and second media content from the source of such media content or from an alternate source; or the like. For many of these reduction processes, set-top box circuitry 200 first performs decoding of some or all incoming media content to extract raw video frame sequences there from before performing reduction processing thereon. Thereafter, set-top box circuitry 200 may deliver to the display system the resulting reduction as one or more substitute raw video frame sequence(s). The substitute raw video frame sequence(s) may also be re-encoded by set-top box circuitry 200 before making such delivery.

The foregoing provides merely a few examples of display/delivery requirements that may be associated with media content and constraints that may be associated with a viewing environment, media content source, and/or a communication path between a set-top box and a media content source. Still other display/delivery requirements and other constraints may be considered by media content retrieval logic 224 in determining whether or not to obtain substitute media content instead of requested media content in accordance with further embodiments.

C. Media Content Processing/Substitution Logic

Figure 6:
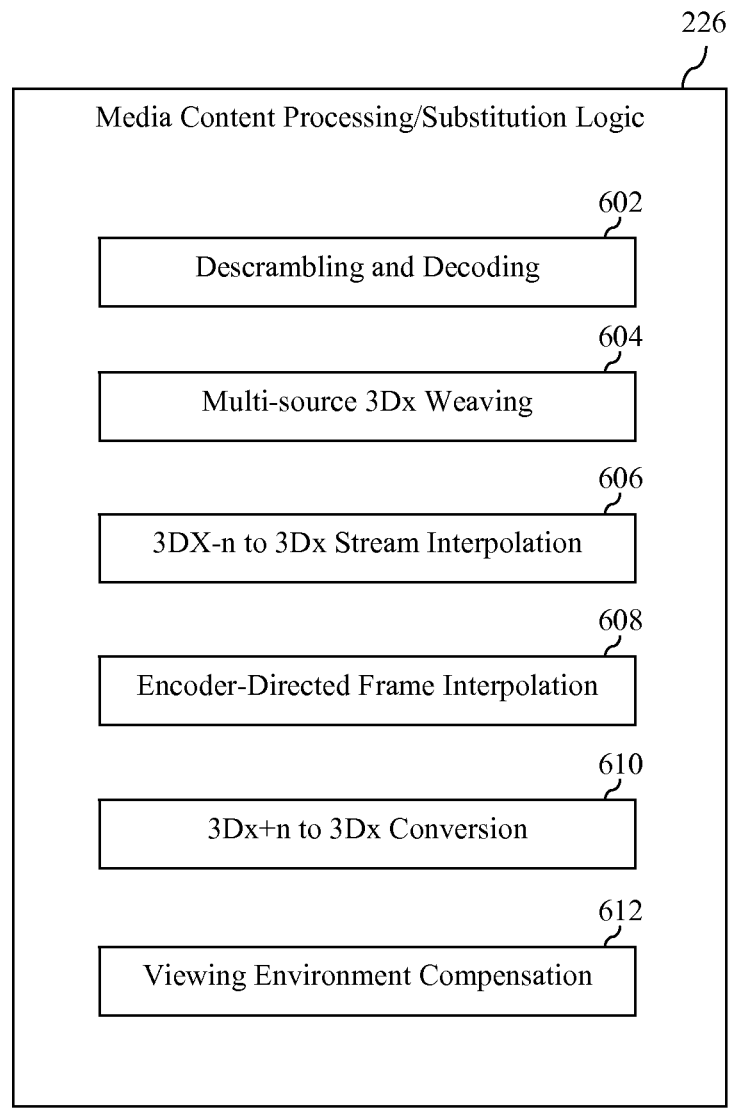
FIG. 6 is a block diagram that shows various elements of media content processing/substitution logic included within set-top box circuitry in accordance with one embodiment.

Media content processing/substitution logic 226 represents logic that processes media content obtained by media content retrieval logic 224 to ensure that it is in a form that is suitable for delivery and display to a display system connected to one of display interfaces 214. FIG. 6 is a block diagram that shows various elements of media content processing/substitution logic 226 in accordance with one embodiment. As shown in FIG. 6, media content processing/substitution logic 226 may include descrambling and decoding logic 602, multi-source 3Dx weaving logic 604, 3Dx–n to 3Dx stream interpolation logic 606, encoder-directed frame interpolation logic 608, 3Dx+n to 3Dx conversion logic 610 and viewing environment compensation logic 612. Each of these elements will now be described.

Descrambling and decoding logic 602 comprises logic that is configured to apply descrambling and/or decoding operations to media content received from any of the media content sources communicatively connected to set-top box circuitry 200 when necessary to facilitate delivery and display of such media content. As will be appreciated by persons skilled in the relevant art(s), some media content sources provide media content in the form of scrambled, or encrypted, signals that must be processed by appropriate descrambling logic in order to place them into a form that is suitable for viewing. As will also be appreciated by persons skilled in the relevant art(s), much of the media content that is distributed today is encoded in accordance with one or more encoding standards (e.g., video and image encoding standards) to achieve a compressed representation that facilitates more efficient transmission and storage thereof Descrambling and decoding logic 602 may be configured to perform descrambling and/or decoding operations responsive to receiving media content that is in a particular scrambled and/or encoded state so as to provide it to a display system in a descrambled and/or decoded state. In accordance with certain implementations, descrambling and decoding logic 602 may be configured to perform descrambling and/or decoding operations only if a display system to which the media content is to be delivered is not capable of performing the necessary descrambling and/or decoding operations.

Multi-source 3Dx weaving logic 604 comprises logic that is configured to receive media content in the form of multiple digital video streams, each digital video stream representing one or more different perspective view of the same subject matter, and to combine the multiple digital video streams to generate a new digital video stream that includes all of the different perspective views of the original digital video streams. Thus, for example, multi-source 3Dx weaving logic 604 may receive two different two-dimensional digital video streams, each representing a different perspective view of the same subject matter, and combine them to generate a 3D2 digital video stream that includes both perspective views of the subject matter. As another example, multi-source 3Dx weaving logic 604 may receive a 3D2 digital video stream that provides two perspective views of certain subject matter and a 3D4 digital video stream that provides four additional perspective views of the same subject matter, and combine them to generate a single 3D6 digital video stream that includes 6 perspective views of the subject matter. To perform the combining operations, multi-source 3Dx weaving logic 604 may store the different digital video streams in a synchronized manner in a multi-source media queue, such as multi-source media queue 246 shown in FIG. 2.

Multi-source 3Dx weaving logic 602 advantageously enables set-top box circuitry 200 to satisfy requests for certain types of three-dimensional media content by combining two-dimensional and/or three-dimensional media content obtained from the same or different sources. Such 3Dx weaving logic 602 also advantageously enables set-top box circuitry 200 to provide three-dimensional media content to advanced display systems in a manner that leverages the availability of legacy media content (e.g., to serve three-dimensional media content by combining two-dimensional media content with other media content). Techniques that facilitate the assembling of three-dimensional media content from a series of separate encoded digital video streams are further described in the aforementioned, incorporated U.S. patent application Ser. No. 12/982,053, filed on even date herewith and entitled "Hierarchical Video Compression Supporting Selective Delivery of Two-Dimensional and Three-Dimensional Video Content."

3Dx−n to 3Dx stream interpolation logic 606 comprises logic that is configured to process two or more digital video streams representing different perspective views of the same subject matter to generate one or more new digital video streams that represent additional perspective views of the same subject matter. The streams may then be combined (e.g., by multi-source 3Dx weaving logic 604) to produce a single three-dimensional video stream having additional views. For example, 3Dx−n to 3Dx stream interpolation logic 606 may receive two digital video streams representing two different perspective views of the same subject matter which together comprise 3D2 media content and process those streams to generate two new interpolated digital video streams representing two additional perspective views of the same subject matter. The two original digital video streams may then be combined with the two new interpolated digital video streams to produce 3D4 media content.

3Dx−n to 3Dx stream interpolation logic 606 advantageously enables set-top box circuitry 200 to satisfy requests for three-dimensional media content that includes a certain number of views by processing existing or available media content that provides only a lesser number of views. Additional details concerning such interpolation operations are provided in commonly-owned, co-pending U.S. patent application Ser. No. 12/982,248 filed on even date herewith and entitled "Interpolation of Three-Dimensional Video Content," the entirety of which is incorporated by reference herein.

Encoder-directed frame interpolation logic 608 comprises logic that is configured to generate a frame of a particular digital video stream based on the content of frames from one or more other digital video streams, wherein the digital video streams each represent different perspective views of the same subject matter and are combinable to form a single three-dimensional video stream. Such interpolation operation may be performed by logic 608 in response to receiving an appropriate indicator included the encoded representation of one of the digital video stream(s) or in response to some other event. This functionality enables an encoder of such digital video streams to selectively opt not to include representations of frames of a digital video stream in the encoded data when such frames can be adequately generated via interpolation on the decoder side. This functionality thus enables bandwidth to be conserved when the encoded representation is transmitted over a communication path or storage space to be conserved when the encoded representation is stored on a recording medium. Additional details regarding encoder-directed frame interpolation may be found in the aforementioned, incorporated U.S. patent application Ser. No. 12/982,248, filed on even date herewith and entitled "Interpolation of Three-Dimensional Video Content."

3Dx+n to 3Dx conversion logic 610 comprises logic that is configured to process three-dimensional media content that includes a first number of different perspective views of the same subject matter to produce two-dimensional or three-dimensional media content that includes a lesser number of views of the same subject matter. Such operation may be necessary, for example, when a screen assembly of a display system attached to set-top box circuitry 200 is incapable of displaying the requisite number of views. In one embodiment, 3Dx+n to 3Dx conversion logic 610 operates by decoding the three-dimensional media content and extracting digital video streams therefrom that represent the first number of different perspective views, removing some number of the digital video streams, and then combining the remaining digital video streams to produce processed media content for delivery to a display system. This is in essence a transcoding operation. In another embodiment in which certain methods described in the aforementioned, incorporated U.S. patent application Ser. No. 12/982,248, filed on even date herewith and entitled "Hierarchical Video Compression Supporting Selective Delivery of Two-Dimensional and Three-Dimensional Video Content" are used to encode the three-dimensional media content, this operation may simply involve selectively discarding certain encoded digital video streams.

Viewing environment compensation logic 612 comprises logic that is configured to determine limitations or constraints associated with a viewing environment via which media content will be delivered and displayed and that selectively causes certain operations to be performed on such media content if display requirements associated therewith exceed the limitations or constraints. The manner in which viewing environment compensation logic 612 operates will now be further described in reference to flowchart 700 of FIG. 7. Although the method of flowchart 700 will be described herein in reference to elements of example set-top box circuitry 200, persons skilled in the art will readily appreciate that the method may be performed by other embodiments.

Figure 7:
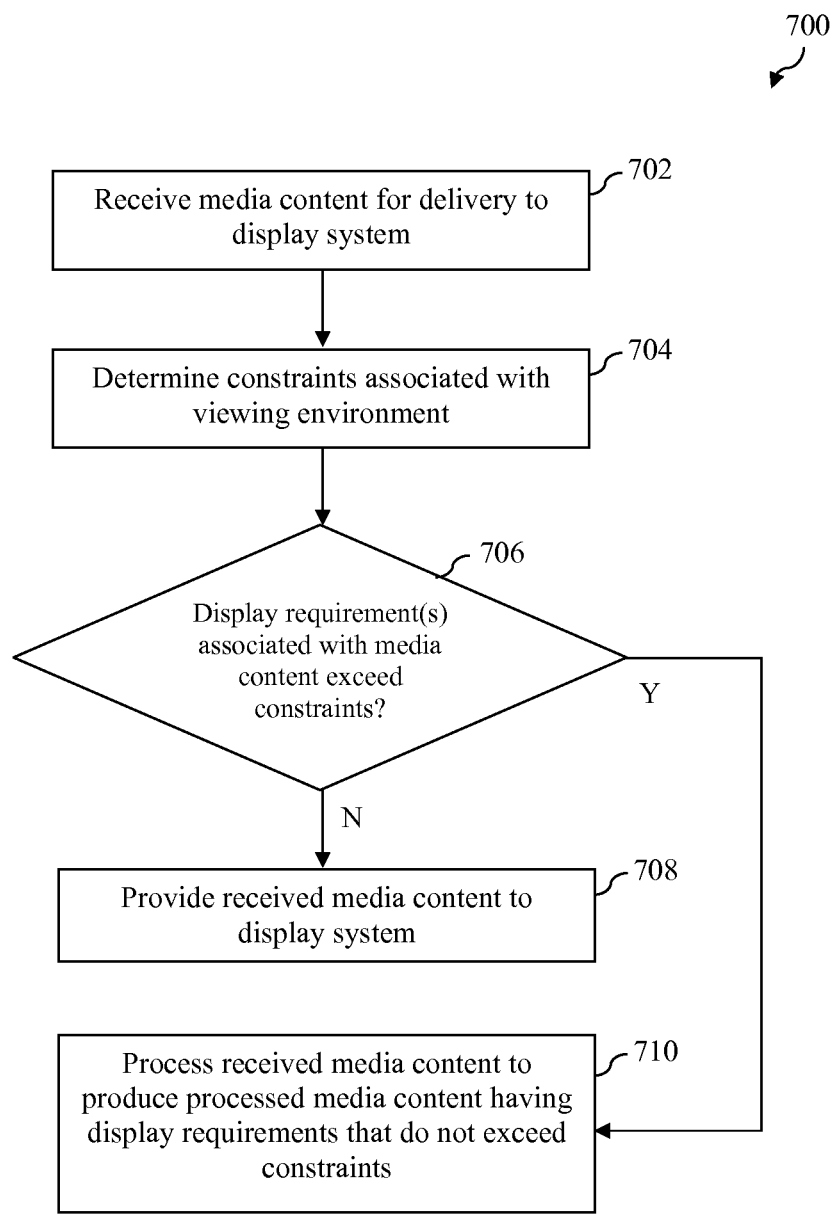
FIG. 7 depicts a flowchart of a method for selectively processing media content by set-top box circuitry to ensure that display requirements associated with such media content do not exceed constraints of a viewing environment in accordance with an embodiment.

As shown in FIG. 7, the method of flowchart 700 begins at step 702, in which media content processing/substitution logic 226 receives media content for delivery to a display system connected to any one of display interfaces 214. Such media content may be obtained, for example, by media content retrieval logic 224 in accordance with any of the methods or techniques described above. In certain implementations or operating modes, the media content received during step 702 may already been descrambled and/or decoded by descrambling and decoding logic 602.

At step 704, viewing environment compensation logic 612 determines constraints associated with a viewing environment that may include at least the display system that is intended to present the media content (including a screen assembly thereof), a communication path over which the requested media content will be delivered from set-top box circuitry 200 to the display system, and the particular display interface used to connect set-top box circuitry 200 to the display system.

Example constraints that may be associated with a screen assembly of the display system may include for example the resolutions supported by the screen assembly, whether the screen assembly can display three-dimensional media content and, if so, what types (e.g., 3D2 media content, 3D4 media content, 3D8 media content, 3D16 media content, etc.), whether the screen assembly can support the simultaneous regional display of both two-dimensional and three-dimensional content or some other screen sharing limitation, or the like. Such constraints may comprise "factory" constraints in that the constraints are inherent in the design of the screen assembly and/or "real-time" constraints in that the constraints are due to a current operating condition or mode of the screen assembly. The constraints associated with the screen assembly may be retrieved by processing circuitry 202 from the display system, by evaluating the performance of the screen assembly, or by some other means. Such communication may occur at power-up and/or periodically during simultaneous operation of both components.

Example constraints that may be associated with the communication path over which the requested media content will be delivered from set-top box circuitry 200 to the display system may include a connection speed or bandwidth associated with the communication path, a connection quality associated with the communication path, or the like. Such constraints may be inherent in the implementation of the communication path and/or due to current operating conditions associated with the communication path. Where the constraints associated with the communication path are fixed, set-top box circuitry 200 may be preconfigured to include knowledge of such constraints. Where the constraints associated with the communication path are varying, set-top box circuitry 200 may attempt determine the constraints by, for example, testing the current capabilities of the communication path or by some other means.

Example constraints that may be associated with the particular display interface used to connect set-top box circuitry 200 to the display system may include the particular data formats supported by the display interface, the bandwidth supported by the display interface, or the like. Since such constraints are typically fixed, set-top box circuitry 200 may be preconfigured to include knowledge thereof.

At decision step 706, viewing environment compensation logic 612 determines if certain display requirements associated with the media content exceed any of the constraints determined during step 704. If it is determined during decision step 706 that the display requirements do not exceed the constraints, then media content processing/substitution logic 226 will provide the media content to the display system via the appropriate display interface 214 as shown at step 708. However, if it is determined during decision step 706 that at least one of the display requirements exceeds at least one of the constraints, then viewing environment compensation logic 612 will cause the media content to be processed in a manner that produces processed media content having display requirements that do not exceed the constraints as shown at step 710.

For example, assume that the media content comprises three-dimensional media content. If it is determined during decision step 706 that the screen assembly is not capable of displaying three-dimensional media content at all, then viewing environment compensation logic 612 may cause the three-dimensional media content to be processed to produce a two-dimensional version thereof. As another example, assume that the media content comprises 3D8 media content and it is determined during step 706 that the screen assembly is only capable of displaying 2D, 3D2 and 3D4 media content. In this case, viewing environment compensation logic 612 may cause the 3D8 media content to be processed to produce a 3D4 version thereof. Such processing may be performed, for example, by 3Dx+n to 3Dx conversion logic 610 as described above.

Other processing that may be performed during step 710 to ensure that constraints of the viewing environment are not exceeded may include, but are not limited to: reducing a resolution of two-dimensional and three-dimensional media content, modifying media content configured for full screen display on a screen assembly to produce processed media content configured for display within a region of the screen assembly, modifying a video format associated with media content, modifying a bit rate associated with media content, and the like.

In still further embodiments, viewing environment compensation logic 612 may send control signals to the display system to proactively change a configuration of a screen assembly associated therewith to ensure that the processed media content can be displayed. For example, viewing environment compensation logic 612 may alter an operating mode of the screen assembly so that the operating mode can accommodate the presentation of a certain type of media content. Altering the operating mode may comprise, for example, changing the operating mode from a two-dimensional mode to a three-dimensional mode, changing the operating mode from a first three-dimensional mode (e.g., 3D2) to a second three-dimensional mode (e.g., 3D4), reconfiguring a region of the screen assembly, or the like.

The foregoing provides merely a few examples of display requirements that may be associated with media content and constraints that may be associated with a viewing environment. Still other display requirements and other constraints may be considered by viewing environment compensation logic 612 in determining whether or not to process media content prior to delivery to a display system in accordance with further embodiments.

Although the foregoing describes cases in which display requirements associated with certain media content exceed constraints or limitations associated with a viewing environment, there may be cases where the capabilities of the viewing environment exceed the display requirements associated with the media content. For example, a display system may include a screen assembly that is capable of presenting 3D8 media content at 720p resolution while the media content obtained by set-top box circuitry 200 is 3D4 media content at 480i. In such cases, processing circuitry 202 may process the media content to produce processed media content that more fully utilizes the capabilities of the screen assembly. For example, processing circuitry 202 may process the media content to produce 3D8 media content at 720p resolution.

D. Media Content Delivery Logic

Media content delivery logic comprises logic that is configured to deliver media content from set-top box circuitry 200 to a display system via any of display interfaces 214. The media content that is delivered may comprise media content obtained by set-top box circuitry 200 from one or more media content sources and that is processed to some degree by processing circuitry 202. As discussed above, such processing may include descrambling, decoding, and/or modifying the media content to accord with constraints or capabilities of a particular viewing environment. As also discussed above, the media content delivered to the display may comprise substitute media content obtained by media content retrieval logic 224.

IV. Example Display System Implementations

Example implementations of display system 118 will now be described. Such example implementations may include display elements that enable multiple two-dimensional and three-dimensional viewing configurations. For example, as will be discussed below, such example implementations may include an adaptable light manipulator and pixel array, or an adaptable light manipulator, pixel array and non-uniform light generator.

A. Example Display Systems Using Adaptable Parallax Barriers

Figure 8:
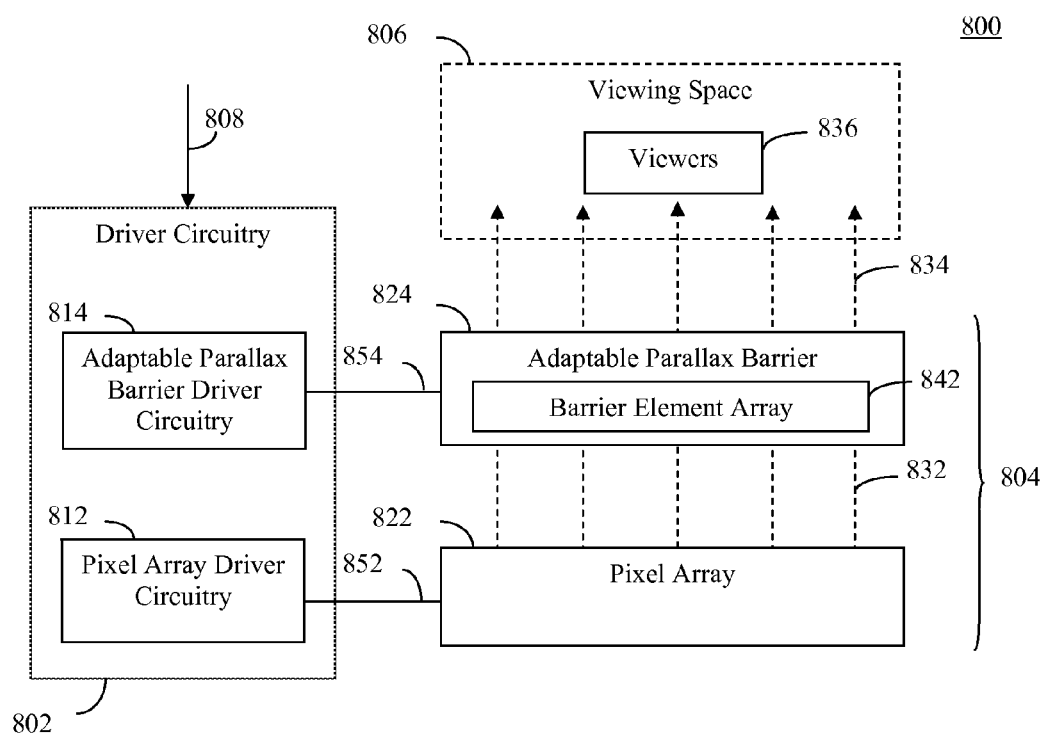
FIG. 8 is a block diagram of a display system in accordance with an embodiment that utilizes an adaptable parallax barrier to support multiple viewing configurations.

FIG. 8 is a block diagram of a display system 800 that utilizes an adaptable parallax barrier to support multiple viewing configurations in accordance with an embodiment. As shown in FIG. 8, display system 800 includes driver circuitry 802 and a screen 804, wherein screen 804 include a pixel array 822 and an adaptable parallax barrier 824. As further shown in FIG. 8, driver circuitry 804 includes pixel array driver circuitry 812 and adaptable parallax barrier driver circuitry 814.

Pixel array 822 comprises a two-dimensional array of pixels (e.g., arranged as a grid or other distribution). Pixel array 822 is a self-illuminating or light-generating pixel array such that the pixels of pixel array 822 each emit light included in light 832. Each pixel may be a separately addressable light source (e.g., a pixel of a plasma display, an LCD display, an LED display such as an OLED display, or of other type of display). Each pixel of pixel array 822 may be individually controllable to vary color and intensity. In an embodiment, each pixel of pixel array 822 may include a plurality of sub-pixels that correspond to separate color channels, such as a trio of red, green, and blue sub-pixels included in each pixel.

Adaptable parallax barrier 824 is positioned proximate to a surface of pixel array 822. Barrier element array 842 is a layer of adaptable parallax barrier 824 that includes a plurality of barrier elements or blocking regions arranged in an array. Each barrier element of the array is configured to be selectively opaque or transparent. Combinations of barrier elements may be configured to be selectively opaque or transparent to enable various effects. For example, the states of the barrier elements of barrier element array 842 may be configured such that light 832 emanating from pixel array 822 is filtered to produce filtered light 834, wherein filtered light 834 includes one or more two-dimensional and/or three-dimensional images that may be viewed by viewers 836 in a viewing space 806.

Depending upon the implementation, each barrier element may have a round, square, or rectangular shape, and barrier element array 842 may have any number of rows of barrier elements that extend a vertical length of barrier element array 842. In another embodiment, each barrier element may have a "band" shape that extends a vertical length of barrier element array 842, such that barrier element array 842 includes a single horizontal row of barrier elements. Each barrier element may include one or more of such bands, and different regions of barrier element array 842 may include barrier elements that include different numbers of such bands.

It is noted that in some embodiments, barrier elements may be capable of being completely transparent or opaque, and in other embodiments, barrier elements may not be capable of being fully transparent or opaque. For instance, such barrier elements may be capable of being 95% transparent when considered to be "transparent" and may be capable of being 5% transparent when considered to be "opaque." "Transparent" and "opaque" as used herein are intended to encompass barrier elements being substantially transparent (e.g., greater than 75% transparent, including completely transparent) and substantially opaque (e.g., less than 25% transparent, including completely opaque), respectively.

Driver circuitry 802 receives control signals 808 from control circuitry (not shown in FIG. 8). The control signals 808 cause driver circuitry 802 to place screen 804 in a selected one of a plurality of different viewing configurations. In particular, based on control signals 808, adaptable parallax barrier driver circuitry 814 transmits drive signals 854 that cause barrier element array 842 to be placed in a state that supports the selected viewing configuration. The selected viewing configuration may be a particular two-dimensional viewing configuration, a particular three-dimensional viewing configuration, or a viewing configuration that supports the display of different types of two-dimensional and/or three-dimensional content in corresponding display regions.

Figure 9:
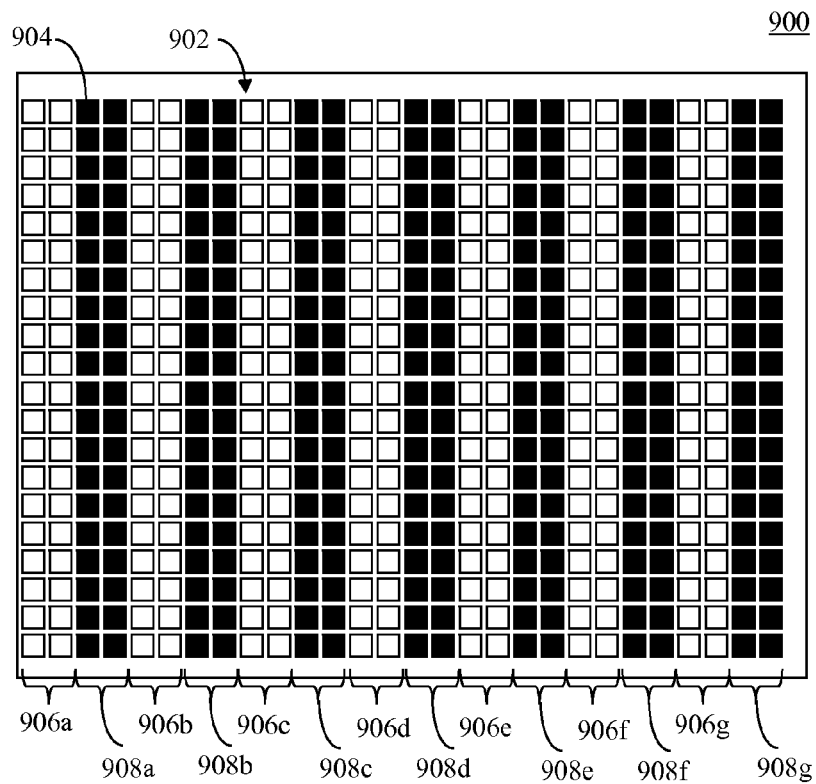
FIG. 9 illustrates an arrangement of an adaptable parallax barrier in accordance with an embodiment that supports a particular three-dimensional viewing configuration.

For example, FIG. 9 shows an arrangement of an adaptable parallax barrier 900 that supports a particular three-dimensional viewing configuration. Adaptable parallax barrier 900 is an example of adaptable parallax barrier 824 of FIG. 8. As shown in FIG. 9, adaptable parallax barrier 900 includes a barrier element array 902, which includes a plurality of barrier elements 904 arranged in a two-dimensional array. Furthermore, as shown in FIG. 9, barrier element array 902 includes a plurality of parallel strips of barrier elements 904 that are selected to be non-blocking to form a plurality of parallel non-blocking strips (or "slits") 906a-906g. As shown in FIG. 9, parallel non-blocking strips 906a-906g (non-blocking slits) are alternated with parallel blocking strips 908a-908g of barrier elements 904 that are selected to be blocking. In the example of FIG. 9, non-blocking strips 906a-906g and blocking strips 908a-908g each have a width (along the x-dimension) of two barrier elements 904, and have lengths that extend along the entire y-dimension (twenty barrier elements 904) of barrier element array 902, although in other embodiments, may have alternative dimensions. Non-blocking strips 906a-906g and blocking strips 908a-908g form a parallax barrier configuration for adaptable parallax barrier 900. The spacing (and number) of parallel non-blocking strips 906 in barrier element array 902 may be selectable by choosing any number and combination of particular strips of barrier elements 904 in barrier element array 902 to be non-blocking, to be alternated with blocking strips 908, as desired. For example, hundreds, thousands, or even larger numbers of non-blocking strips 906 and blocking strips 908 may be present in adaptable parallax barrier 900.

Figure 10:
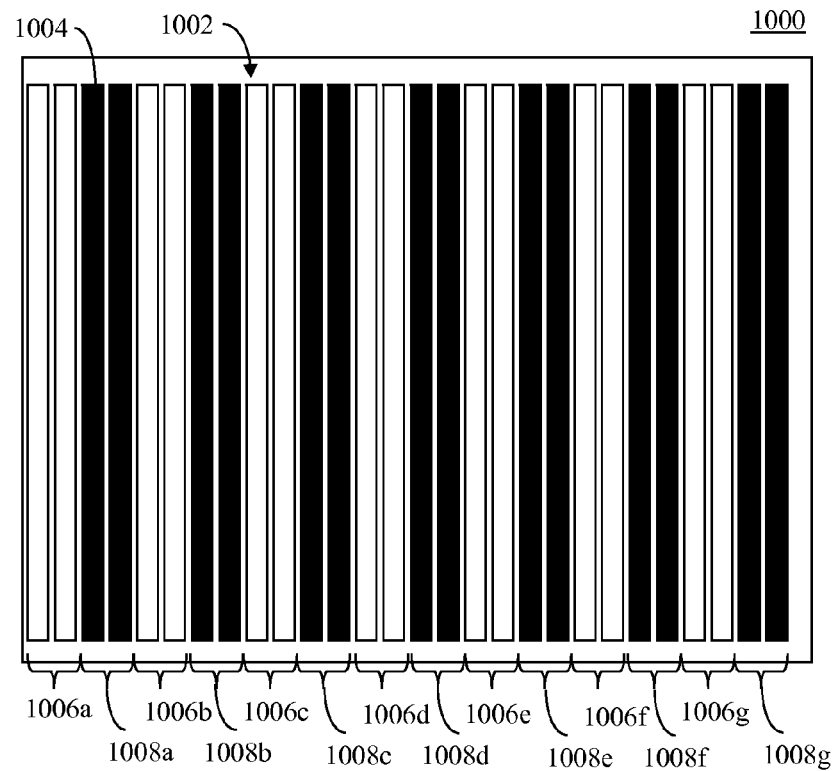
FIG. 10 illustrates an arrangement of an adaptable parallax barrier in accordance with an alternate embodiment that supports a particular three-dimensional viewing configuration.

FIG. 10 shows an alternative example of an adaptable parallax barrier 1000 that has also been configured to support a particular three-dimensional viewing configuration. Similarly to adaptable parallax barrier 900 of FIG. 9, adaptable parallax barrier 1000 includes a barrier element array 1002, which includes a plurality of barrier elements 1004 arranged in a two-dimensional array (28×1 array). Barrier elements 1004 have widths (along the x-dimension) similar to the widths of barrier elements 904 in FIG. 9, but have lengths that extend along the entire vertical length (y-dimension) of barrier element array 1002. As shown in FIG. 10, barrier element array 1002 includes parallel non-blocking strips 1006a-1006g alternated with parallel blocking strips 1008a-1008g. In the example of FIG. 10, parallel non-blocking strips 1006a-1006g and parallel blocking strips 1008a-1008g each have a width (along the x-dimension) of two barrier elements 1004, and have lengths that extend along the entire y-dimension (one barrier element 1004) of barrier element array 1002.

Each of adaptable parallax barriers 900 and 1000, configured in the manner shown in FIGS. 9 and 10 respectively, filter light produced by a pixel array to form one or more three-dimensional views in a viewing space, thus supporting a three-dimensional viewing configuration. To achieve a two-dimensional viewing configuration, all of the barrier elements of either adaptable parallax barrier 900 or 1000 can simply be placed in a non-blocking state. Additional details concerning how the adaptable parallax barriers operate to support such three-dimensional viewing may be found, for example, in the aforementioned, incorporated U.S. patent application Ser. No. 12/845,440, filed on Jul. 28, 2010, and entitled "Adaptable Parallax Barrier Supporting Mixed 2D and Stereoscopic 3D Display Regions."

In the adaptable parallax barrier configurations shown in FIGS. 9 and 10, the entirety of the barrier element array is filled with parallel non-blocking strips to support three-dimensional viewing. In further embodiments, one or more regions of an adaptable parallax barrier may be filled with parallel non-blocking strips to deliver three-dimensional images, and one or more other regions of the adaptable parallax barrier may be rendered transparent to deliver two-dimensional images. Thus, a viewing configuration that mixes two-dimensional and three-dimensional viewing regions may be supported.

Figure 11:
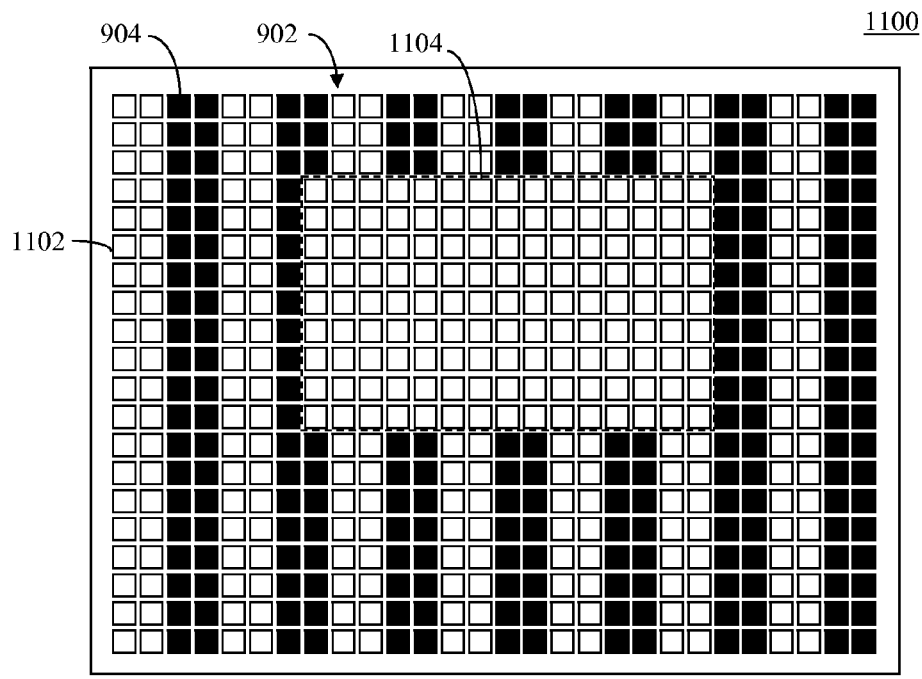
FIG. 11 illustrates an arrangement of an adaptable parallax barrier in accordance with an embodiment that supports a viewing configuration that mixes two-dimensional and three-dimensional viewing regions.

For instance, FIG. 11 shows an arrangement of an adaptable parallax barrier 1100 that supports a viewing configuration that mixes two-dimensional and three-dimensional viewing regions according to example embodiments. Adaptable parallax barrier 1100 is similar to adaptable parallax barrier 900 of FIG. 9, having barrier element array 902 including a plurality of barrier elements 904 arranged in a two-dimensional array. In FIG. 11, a first region 1102 of barrier element array 1102 includes a plurality of parallel non-blocking strips alternated with parallel blocking strips that together fill first region 1102. A second region 1104 of barrier element array 1102 is surrounded by first region 1102. Second region 1104 is a rectangular shaped region of barrier element array 902 that includes a two-dimensional array of barrier elements 904 that are non-blocking. Thus, in FIG. 11, barrier element array 902 is configured to enable a three-dimensional image to be generated by pixels of a pixel array that are adjacent to barrier elements of first region 1102, and to enable a two-dimensional image to be generated by pixels of the pixel array that are adjacent to barrier elements inside of second region 1104. Note that alternatively, first region 1102 may include all non-blocking barrier elements 902 to pass a two-dimensional image, and second region 1104 may include parallel non-blocking strips alternated with parallel blocking strips to pass a three-dimensional image. In further embodiments, adaptable parallax barrier 1100 may have additional numbers, sizes, and arrangements of regions configured to pass different combinations of two-dimensional images and three-dimensional images.

In still further embodiments, different regions of an adaptable parallax barrier that have parallel non-blocking strips may have the parallel non-blocking strips oriented at different angles to deliver three-dimensional images to viewers that are oriented differently. Thus, a viewing configuration that mixes three-dimensional viewing regions having different viewing orientations may be supported.

Figure 12:
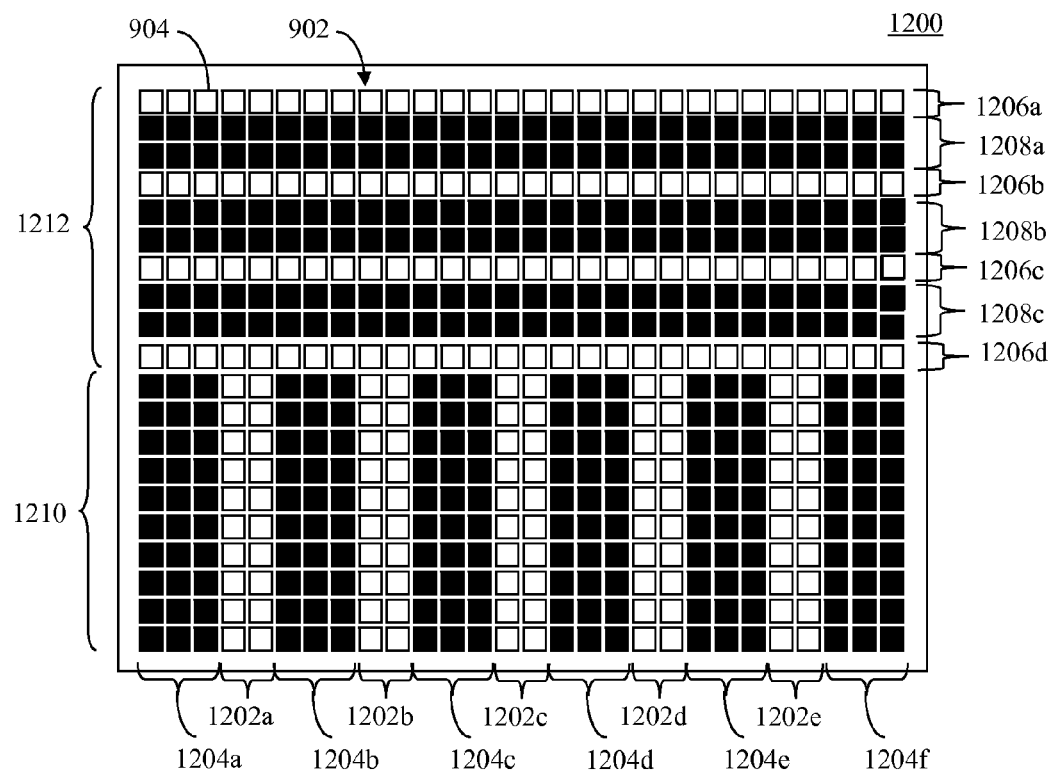
FIG. 12 illustrates an arrangement of an adaptable parallax barrier in accordance with an embodiment in which different orientations of transparent and opaque slits are used to simultaneously support different viewer orientations.

For example, FIG. 12 shows an arrangement of an adaptable parallax barrier 1200 in which transparent slits have different orientations, according to an example embodiment. Adaptable parallax barrier 1200 is similar to adaptable parallax barrier 900 of FIG. 9, having barrier element array 902 including a plurality of barrier elements 904 arranged in a two-dimensional array. A first region 1210 (e.g., a bottom half) of barrier element array 902 includes a first plurality of parallel strips of barrier elements 904 that are selected to be non-blocking to form a first plurality of parallel non-blocking strips 1202a-1202e (each having a width of two barrier elements 904). As shown in FIG. 12, parallel non-blocking strips 1202a-1202e are alternated with parallel blocking strips 1204a-1204f of barrier elements 904 (each having a width of three barrier elements 904). Parallel non-blocking strips 1202a-1202e are oriented in a first direction (e.g., along a vertical axis).

Furthermore, as shown in FIG. 12, a second region 1212 (e.g., a top half) of barrier element array 902 includes a second plurality of parallel strips of barrier elements 904 that are selected to be non-blocking to form a second plurality of parallel non-blocking strips 1206a-1206d (each having a width of one barrier element 904). As shown in FIG. 12, parallel non-blocking strips 1206a-1206d are alternated with parallel blocking strips 1208a-1208c of barrier elements 904 (each having a width of two barrier elements 204). Parallel non-blocking strips 1206a-1206d are oriented in a second direction (e.g., along a horizontal axis).

As such, in FIG. 12, first and second pluralities of parallel non-blocking strips 1202a-1202e and 1206a-1206d are present in barrier element array 902 that are oriented perpendicularly to each other. The region of barrier element array 902 that includes first plurality of parallel non-blocking strips 1202a-1202e may be configured to deliver a three-dimensional image in a viewing space to be viewable by a user whose body is oriented vertically (e.g., sitting upright or standing up). The region of barrier element array 902 that includes second plurality of parallel non-blocking strips 1206a-1206d may be configured to deliver a three-dimensional image in a viewing space to be viewable by a user whose body is oriented horizontally (e.g., laying down). In this manner, users who are oriented differently relative to each other can still each be provided with a corresponding three-dimensional image that accommodates their position.

The foregoing adaptable parallax barriers and arrangements thereof have been described herein by way of example only. Additional adaptable parallax barriers and arrangements thereof may be used to support additional viewing configurations. For example, additional adaptable parallax barrier implementations and arrangements thereof are described in the aforementioned, incorporated U.S. patent application Ser. No. 12/845,440 filed on Jul. 28, 2010, and entitled "Adaptable Parallax Barrier Supporting Mixed 2D and Stereoscopic 3D Display Regions," and in the aforementioned, incorporated U.S. patent application Ser. No. 12/845,461, filed on Jul. 28, 2010, and entitled "Display Supporting Multiple Simultaneous 3D Views," the entirety of which is incorporated by reference herein.

Returning now to the description of display system 800 of FIG. 8, since a configuration of adaptable parallax barrier 824 can be dynamically modified to support a particular viewing configuration, pixel array 822 must also be controlled to support the same viewing configuration. In particular, the rendering of pixels of an image (also referred to herein as "image pixels") among the pixels of pixel array 822 (also referred to herein as "display pixels") must be handled in a manner that is consistent with a current configuration of adaptable parallax barrier 824. This may entail, for example, changing a number of display pixels that represents each image pixel (i.e., changing the resolution of a displayed image) and/or changing which display pixels or groups thereof correspond to the respective image pixels (i.e., changing the locations at which the image pixels are displayed), in response to modification of a configuration of adaptable parallax barrier 824. Such changes may be implemented by a controller (not shown in FIG. 8) via delivery of appropriate control signals 808 to pixel array driver circuitry 812.

For example, in one embodiment, when a configuration of adaptable parallax barrier 824 supports a first viewing configuration responsive to control signals 808, pixel array driver circuitry 812 sends drive signals 852 in conformance with control signals 808 such that the rendering of images to pixel array 822 occurs in a manner that also supports the first viewing configuration. Furthermore, when the configuration of adaptable parallax barrier 824 is modified to support a second viewing configuration responsive to control signals 808, pixel array driver circuitry 812 sends drive signals 852 in conformance with the control signals 808 such that the rendering of images to pixel array 822 occurs in a manner that also supports the second viewing configuration.

Figure 13:
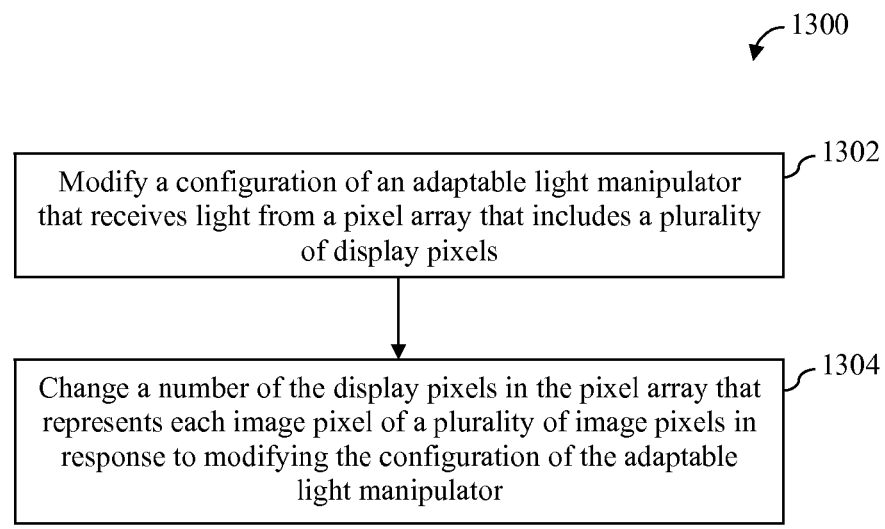
FIG. 13 depicts a flowchart of a method for controlling a pixel array to support a same viewing configuration as an adaptable light manipulator in accordance with an embodiment.

FIG. 13 depicts a flowchart 1300 of an example method for controlling a pixel array to support the same viewing configuration as an adaptable light manipulator (such as adaptable parallax barrier 824) in accordance with an embodiment. As shown in FIG. 13, the method of flowchart 1300 begins at step 1302. During step 1302, a configuration of an adaptable light manipulator, such as adaptable parallax barrier 824, is modified. At step 1304, a number of display pixels in a pixel array, such as pixel array 822, that represents each image pixel of a plurality of image pixels is changed in response to modifying the configuration of the adaptable light manipulator.

Figure 15:
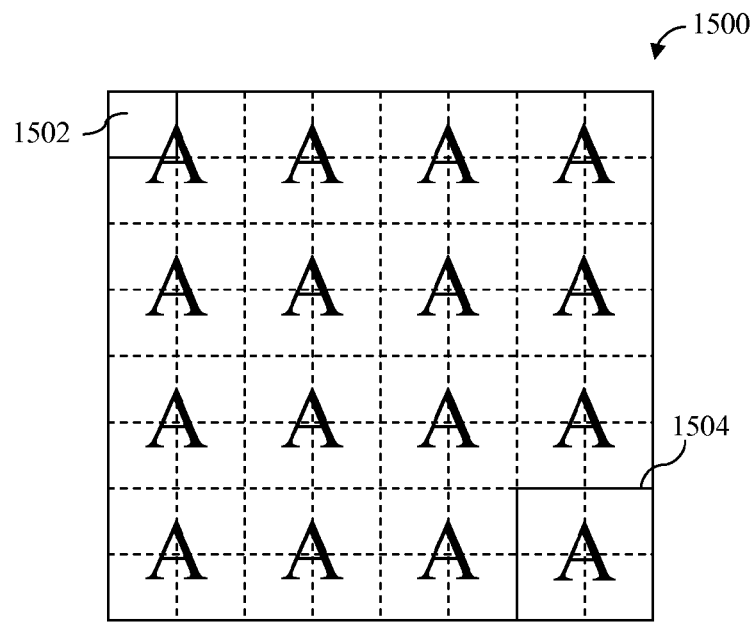
FIG. 15 illustrates a portion of a pixel array to which image pixels have been mapped to support a two-dimensional viewing configuration of an adaptable light manipulator in accordance with an embodiment.
Figure 16:
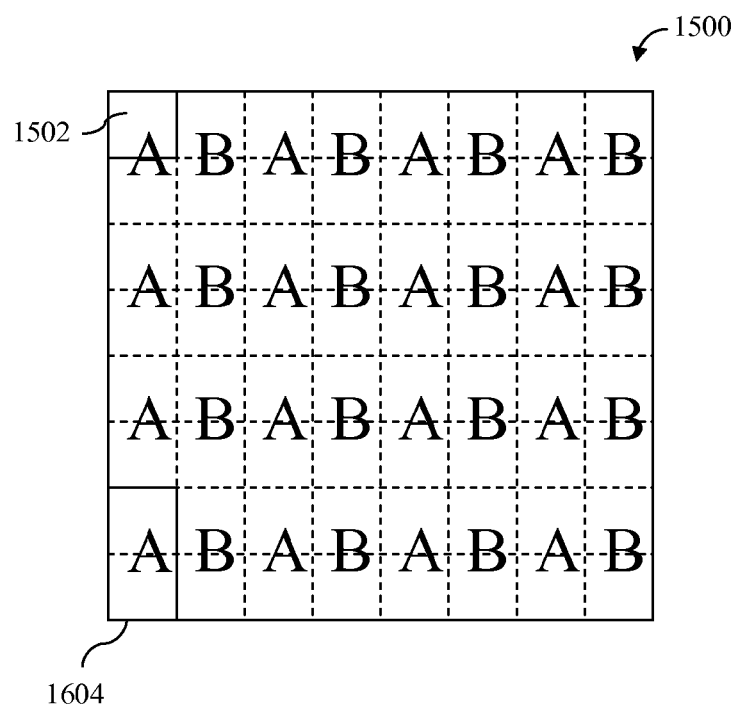
FIG. 16 illustrates how image pixels are mapped to the portion of the pixel array shown in FIG. 15 to support a first three-dimensional viewing configuration of an adaptable light manipulator in accordance with an embodiment.

FIGS. 15 and 16 provide a simple illustration of an application of the method of flowchart 1300. As shown in FIG. 15, a portion of a pixel array 1500 includes a 16×16 array of display pixels. An example display pixel is shown as display pixel 1502. In one embodiment, each display pixel comprises a trio of red, green, and blue sub-pixels as discussed above. A first image comprising a 4×4 array of image pixels (each shown depicting the letter "A" to indicate that each is included in the same image) is mapped to the display pixels such that 4 display pixels are used to present each image pixel. An example of an image pixel is shown as image pixel 1504. In FIG. 15, the first image is intended to represent an image that is viewed when an adaptable light manipulator disposed proximate to the pixel array is configured to support a two-dimensional viewing configuration.

FIG. 16 is intended to represent the same portion of pixel array 1500 after the configuration of the adaptable light manipulator has been changed to support a three-dimensional viewing configuration. The three-dimensional viewing configuration requires the combined display of a first image and a second image across the same portion of pixel array 1500. This means that the first image must be represented with only half the display pixels. To achieve this, the pixel array is controlled such that 2 rather than 4 display pixels are used to present each image pixel of the first image (each still shown depicting the letter "A"). This corresponds to a decreased viewing resolution of the first image. The other half of the display pixels are now used to present each image pixel of a second image (each shown depicting the letter "B"). The image pixels associated with the different images are aligned with the adaptable light manipulator to achieve a desired three-dimensional viewing effect.

Figure 14:
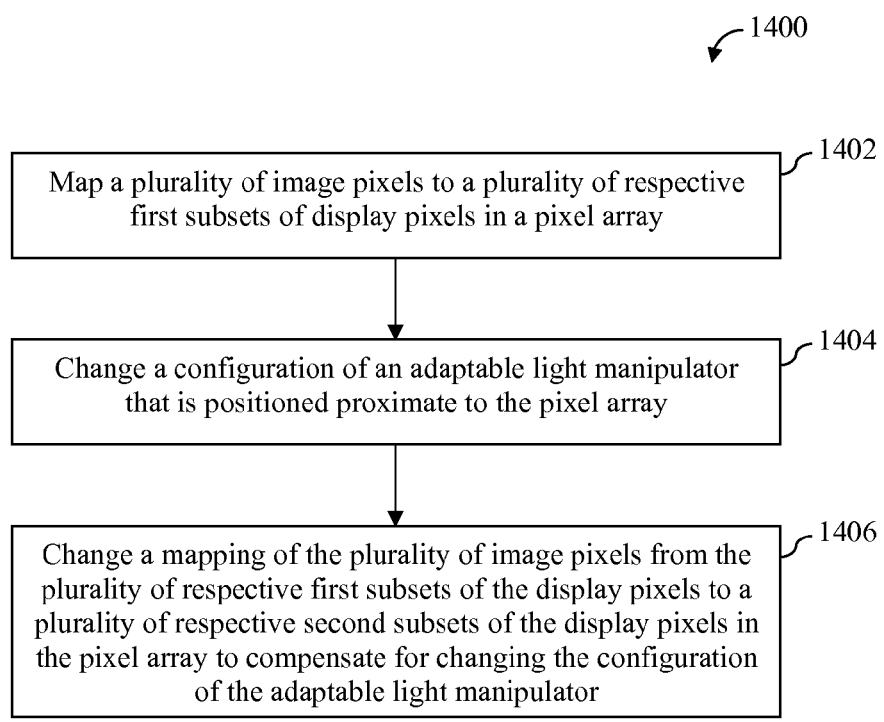
FIG. 14 depicts a flowchart of an alternate example method for controlling a pixel array to support a same viewing configuration as an adaptable light manipulator in accordance with an embodiment.

FIG. 14 depicts a flowchart 1400 of another example method for controlling a pixel array to support the same viewing configuration as an adaptable light manipulator (such as adaptable parallax barrier 824) in accordance with an embodiment. As shown in FIG. 14, the method of flowchart 1400 begins at step 1402. During step 1402, a plurality of image pixels is mapped to a plurality of respective first subsets of display pixels in a pixel array, such as pixel array 822. At step 1404, a configuration of an adaptable light manipulator that is positioned proximate to the pixel array is changed. For example, in an embodiment in which the adaptable light manipulator includes adaptable parallax barrier 824, a slit pattern, orientation, or the like, of adaptable parallax barrier 824 may be changed. At step 1406, a mapping of the plurality of image pixels is changed from the plurality of respective first subsets of the display pixels to a plurality of respective second subsets of the display pixels in the pixel array to compensate for changing the configuration of the adaptable light manipulator.

Figure 17:
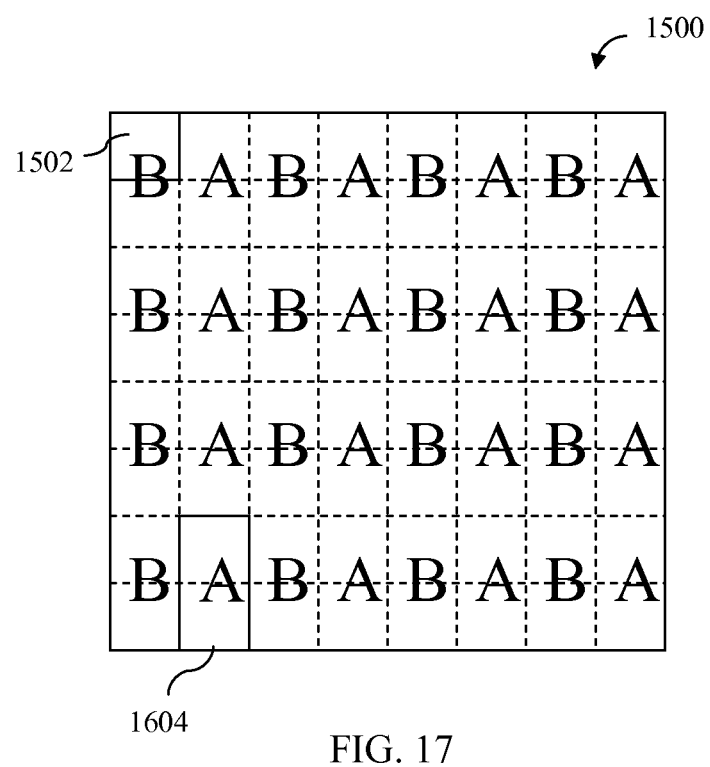
FIG. 17 illustrates how image pixels are mapped to the portion of the pixel array shown in FIGS. 15 and 16 to support a second three-dimensional viewing configuration of an adaptable light manipulator in accordance with an embodiment.

FIGS. 16 and 17 provide a simple illustration of an application of the method of flowchart 1400. As shown in FIG. 16, a portion of a pixel array 1500 is used to simultaneously display a first image comprising image pixels shown depicting the letter "A" and a second image comprising image pixels shown depicting the letter "B." As noted above, this display format is utilized to support a three-dimensional viewing configuration corresponding to a particular arrangement of an adaptable light manipulator disposed proximate to the pixel array. FIG. 17 is intended to represent the same portion of pixel array 1500 after the configuration of the adaptable light manipulator has been changed to support a modified three-dimensional viewing configuration (e.g., in response to a changed location of a viewer or some other factor). The modified three-dimensional viewing configuration requires the display location of the first image and the second image to be shifted, as shown in FIG. 17. Thus, for example, rather than rendering image pixel 1604 to the bottom-most two display pixels in the far-left column of array portion 1500, the same image pixel 1604 is now rendered to the bottom-most two display pixels in the second column from the left of array portion 1500.

Numerous other methods may be used to control the rendering of image pixels to display pixels in support of a desired two-dimensional and/or three-dimensional viewing configuration implemented by an adaptable parallax barrier or other adaptable light manipulator. Additional details concerning such control of a pixel array may be found in commonly-owned, co-pending U.S. patent application Ser. No. 12/774,225, filed on May 5, 2010, and entitled "Controlling a Pixel Array to Support an Adaptable Light Manipulator," the entirety of which is incorporated by reference herein.

Figure 18:
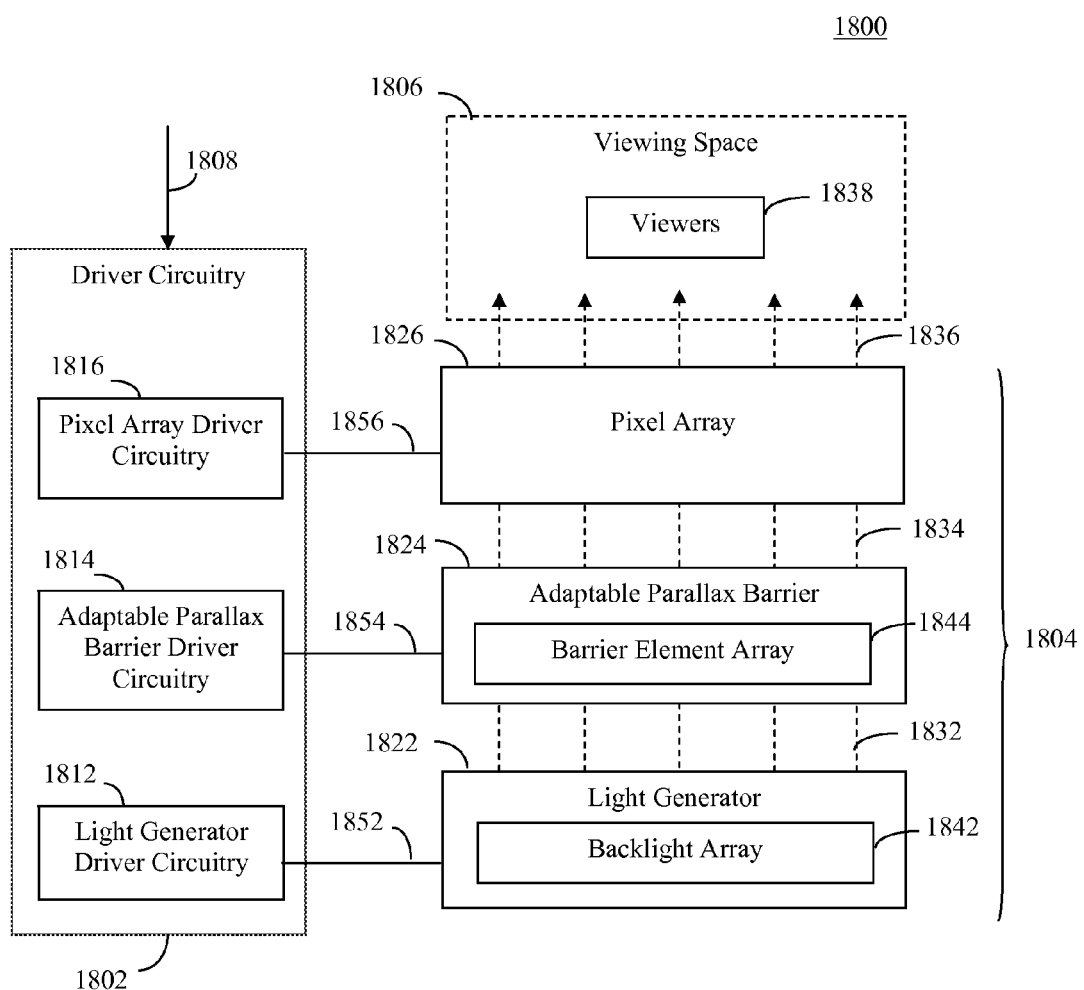
FIG. 18 is a block diagram of an example display system that utilizes an adaptable parallax barrier and a light generator to support multiple viewing configurations in accordance with an embodiment.

FIG. 18 shows a block diagram of an example display system 1800, which is another example of a display system that utilizes an adaptable parallax barrier to support multiple viewing configurations. As shown in FIG. 18, display system 1800 includes driver circuitry 1802 and a screen 1804, wherein screen 1804 include a light generator 1822, an adaptable parallax barrier 1824 and a pixel array 1826. As further shown in FIG. 18, driver circuitry 1802 includes light generator driver circuitry 1812, adaptable parallax barrier driver circuitry 1814 and pixel array driver circuitry 1816.

Light generator 1822 emits light 1832. Adaptable parallax barrier 1824 is positioned proximate to light generator 1822. Barrier element array 1844 is a layer of adaptable parallax barrier 1824 that includes a plurality of barrier elements or blocking regions arranged in an array. Each barrier element of the array is configured to be selectively opaque or transparent. Barrier element array 1844 filters light 1832 received from light generator 1822 to generate filtered light 1834. Filtered light 1834 is configured to enable a two-dimensional image or a three-dimensional image (e.g., formed by a pair of two-dimensional images in filtered light 1834) to be formed based on images subsequently imposed on filtered light 1834 by pixel array 1826.

Pixel array 1826 includes a two-dimensional array of pixels (e.g., arranged in a grid or other distribution) like pixel array 822 of FIG. 8. However, pixel array 1826 is not self-illuminating, and instead is a light filter that imposes images (e.g., in the form of color, grayscale, etc.) on filtered light 1834 from adaptable parallax barrier 1824 to generate filtered light 1836 to include one or more images. Each pixel of pixel array 1826 may be a separately addressable filter (e.g., a pixel of a plasma display, an LCD display, an LED display, or of other type of display). Each pixel of pixel array 1826 may be individually controllable to vary the color imposed on the corresponding light passing through, and/or to vary the intensity of the passed light in filtered light 1836. In an embodiment, each pixel of pixel array 1826 may include a plurality of sub-pixels that correspond to separate color channels, such as a trio of red, green, and blue sub-pixels included in each pixel.

Driver circuitry 1802 receives control signals 1808 from control circuitry (not shown in FIG. 18). The control signals 1808 cause driver circuitry 1102 to place screen 1804 in a selected one of a plurality of different viewing configurations.

In particular, based on control signals 1808, adaptable parallax barrier driver circuitry 1814 transmits drive signals 1854 that cause barrier element array 1844 to be placed in a state that supports the selected viewing configuration. Likewise, based on control signals 1808, pixel array driver circuitry 1816 transmits drive signals 1856 to cause pixels of one or more images (also referred to herein as "image pixels") to be rendered among the pixels of pixel array 1826 (also referred to herein as "display pixels") in a manner that is consistent with a current configuration of adaptable parallax barrier 1824. The selected viewing configuration may be a particular two-dimensional viewing configuration, a particular three-dimensional viewing configuration, or a viewing configuration that supports the display of different types of two-dimensional and/or three-dimensional content in different display regions.

As discussed in commonly-owned, co-pending U.S. patent application Ser. No. 12/982,020, filed on even date herewith and entitled "Backlighting Array Supporting Adaptable Parallax Barrier," the entirety of which is incorporated by reference herein, conventional LCD displays typically include a backlight and a display panel that includes an array of LCD pixels. The backlight is designed to produce a sheet of light of uniform luminosity for illuminating the LCD pixels. When simultaneously displaying two-dimensional, three-dimensional and multi-view three-dimensional regions using an adaptable parallax barrier such as that described in the aforementioned, incorporated U.S. patent application Ser. No. 12/845,440, filed on Jul. 28, 2010, and entitled "Adaptable Parallax Barrier Supporting Mixed 2D and Stereoscopic 3D Display Regions," the use of a conventional backlight will result in a disparity in perceived brightness between the different simultaneously-displayed regions. This is because the number of visible pixels per unit area associated with a two-dimensional dimensional region will generally exceed the number of visible pixels per unit area associated with a particular three-dimensional or multi-view three-dimensional region (in which the pixels must be partitioned among different eyes/views).

To address this issue, light generator 1822 includes a backlight array 1842 which is a two-dimensional array of light sources. Such light sources may be arranged, for example, in a rectangular grid. Each light source in backlight array 1842 is individually addressable and controllable to select an amount of light emitted thereby. A single light source may comprise one or more light-emitting elements depending upon the implementation. In one embodiment, each light source in backlight array 1842 comprises a single light-emitting diode (LED) although this example is not intended to be limiting.

The amount of light emitted by the individual light sources that make up backlight array 1842 can selectively controlled by drive signals 1852 generated by light generator driver circuitry 1812 so that the brightness associated with each of a plurality of display regions of screen 1804 can also be controlled. This enables display system 1800 to provide a desired brightness level for each display region automatically and/or in response to user input. For example, backlight array 1842 can be controlled such that a uniform level of brightness is achieved across different simultaneously-displayed display regions, even though the number of perceptible pixels per unit area varies from display region to display region. As another example, backlight array 1842 can be controlled such that the level of brightness associated with a particular display region is increased or reduced without impacting (or without substantially impacting) the brightness of other simultaneously-displayed display regions.

To help illustrate this, FIG. 19 provides an exploded view of a display system 1900 that implements a controllable backlight array as described immediately above. Display system 1900 comprises one implementation of display system 1800. As shown in FIG. 19, display system 1900 includes a light generator 1902 that includes a backlight array 1912, an adaptable parallax barrier 1904 that includes a barrier element array 1922 and a display panel 1906 that includes a pixel array 1932. These elements may be aligned with and positioned proximate to each other to create an integrated display screen.

In accordance with the example configuration shown in FIG. 19, a first portion 1934 of pixel array 1932 and a first portion 1924 of barrier element array 1922 have been manipulated to create a first display region that displays multi-view three-dimensional content, a second portion 1936 of pixel array 1932 and a second portion 1926 of barrier element array 1922 have been manipulated to create a second display region that displays a three-dimensional image, and a third portion of 1938 of pixel array 1932 and a third portion 1928 of barrier element array 1922 have been manipulated to create a third display region that displays a two-dimensional image. To independently control the brightness of each of the first, second and third display regions, the amount of light emitted by light sources included within a first portion 1914, a second portion 1916 and a third portion 1918 of backlight array 1912 can respectively be controlled. For example, the light sources within first portion 1914 may be controlled to provide greater luminosity than the light sources within second portion 1916 and third portion 1918 as the number of perceivable pixels per unit area will be smallest in the first display region with which first portion 1914 is aligned. In further accordance with this example, the light sources within second portion 1916 may be controlled to provide greater luminosity than the light sources within third portion 1918 since the number of perceivable pixels per unit area will be smaller in the second display region with which second portion 1916 is aligned than the third display region with which third portion 1918 is aligned. Of course, if uniform luminosity is not desired across the various display regions then other control schemes may be used.

Of course, the arrangement shown in FIG. 19 provides only a single teaching example. It should be noted that a display system in accordance with an embodiment can dynamically manipulate pixel array 1932 and barrier element array 1922 in a coordinated fashion to dynamically and simultaneously create any number of display regions of different sizes and in different locations, wherein each of the created display regions can display one of two-dimensional, three-dimensional or multi-view three-dimensional content. To accommodate this, backlight array 1912 can also be dynamically manipulated in a coordinated fashion with pixel array 1932 and barrier element array 1922 to ensure that each display region is perceived at a desired level of brightness.

In the arrangement shown in FIG. 19, there is a one-to-one correspondence between each light source in backlight array 1912 and every display pixel in pixel array 1932. However, this need not be the case to achieve regional brightness control. For example, in certain embodiments, the number of light sources provided in backlight array 1912 is less than the number of pixels provided in pixel array 1932. For instance, in one embodiment, a single light source may be provided in backlight array 1912 for every N pixels provided in pixel array 1932, wherein N is an integer greater than 1. In an embodiment in which the number of light sources in backlight array 1912 is less than the number of pixels in pixel array 1932, each light source may be arranged so that it provides backlighting for a particular group of pixels in pixel array 1932, although this is only an example. In alternate embodiments, the number of light sources provided in backlight array 1912 is greater than the number of pixels provided in pixel array 1932.

Also, in the examples described above, light sources in backlight array 1912 are described as being individually controllable. However, in alternate embodiments, light sources in backlight array 1912 may only be controllable in groups. This may facilitate a reduction in the complexity of the control infrastructure associated with backlight array 1912. In still further embodiments, light sources in backlight array 1912 may be controllable both individually and in groups.

It is also noted that although FIGS. 18 and 19 show display system configurations in which a barrier element array of an adaptable parallax barrier is disposed between a backlight array of individually addressable and controllable light sources and a pixel array, in alternate implementations the pixel array may be disposed between the backlight array and the barrier element array. Such an alternate implementation is shown in FIG. 20. In particular, FIG. 20 is a block diagram of a display system 2000 that includes a pixel array 2024 disposed between a light generator 2022 that includes a backlight array 2042 and an adaptable parallax barrier 2026 that includes a barrier element array 2044 to support the generation of two-dimensional and/or three-dimensional images perceivable in a viewing space 2006. In such alternate implementations, selective control of the luminosity of groups or individual ones of the light sources in backlight array 2042 may also be used to vary the backlighting luminosity associated with different display regions created by the interaction of backlight array 2042, pixel array 2024 and barrier element array 2044.

Other example display system implementations that utilize a backlight array of independently-controllable light sources are described in the aforementioned, incorporated U.S. patent application Ser. No. 12/982,020, filed on even date herewith and entitled "Backlighting Array Supporting Adaptable Parallax Barrier." That application also describes other approaches for controlling the brightness of different simultaneously-displayed display regions of a display system. Some of these approaches will be described below.

For example, to achieve independent region-by-region brightness control in a display system that includes a conventional backlight panel designed to produce a sheet of light of uniform luminosity, the amount of light passed by the individual pixels that make up a pixel array can be selectively controlled so that the brightness associated with each of a plurality of display regions can also be controlled. To help illustrate this, FIG. 21 provides an exploded view of a display system 2100 that implements a regional brightness control scheme based on pixel intensity as described immediately above. As shown in FIG. 21, display system 2100 includes a display panel 2102 and an adaptable parallax barrier 2104. Display system 2100 also includes a backlight panel, although this element is not shown in FIG. 21. These elements may be aligned with and positioned proximate to each other to create an integrated display screen.

As further shown in FIG. 21, display panel 2102 includes a pixel array 2112. Each of the pixels in a first portion 2114 of pixel array 2112 is individually controlled by pixel array driver circuitry to pass a selected amount of light produced by a backlight panel (not shown in FIG. 21), thereby producing display-generated light representative of a single two-dimensional image. Each of the pixels in a second portion 2116 of pixel array 2112 is individually controlled by the pixel array driver circuitry to pass a selected amount of light produced by the backlight panel, thereby producing display-generated light representative of two two-dimensional images that, when combined by the brain of a viewer positioned in an appropriate location relative to display system 2100, will be perceived as a single three-dimensional image.

Adaptable parallax barrier 2104 includes barrier element array 2122 that includes a first portion 2124 and a second portion 2126. Barrier element array 2122 is aligned with pixel array 2114 such that first portion 2124 of blocking region array 2122 overlays first portion 2114 of pixel array 2112 and second portion 2126 of blocking region array 2122 overlays second portion 2116 of pixel array 2112. Adaptable parallax barrier driver circuitry causes all the barrier elements within first portion 2124 of barrier element array 2122 to be transparent. Thus, the two-dimensional image generated by the pixels of first portion 2114 of pixel array 2112 will simply be passed through to a viewer in a viewing space in front of display system 2100. Furthermore, the adaptable parallax barrier driver circuitry manipulates the barrier elements within second portion 2126 of blocking region array 2122 to form a plurality of parallel transparent strips alternated with parallel opaque strips, thereby creating a parallax effect that enables the two two-dimensional images generated by the pixels of second portion 2116 of pixel array 2112 to be perceived as a three-dimensional image by a viewer in the viewing space in front of display system 2100.

Assume that a viewer is positioned such that he/she can perceive both the two-dimensional image passed by first portion 2124 of barrier element array 2122 and the three-dimensional image formed through parallax by second portion 2126 of barrier element 2122. As discussed above, the pixels per unit area perceived by this viewer with respect to the two-dimensional image will be greater than the pixels per unit area perceived by this viewer with respect to the three-dimensional image. Thus, the two-dimensional image will appear brighter to the viewer than the three dimensional image when backlighting of constant luminosity is provided behind pixel array 2112.

To address this issue, drive signals may be transmitted to display panel 2102 that selectively cause the pixels included in first portion 2114 of pixel array 2112 to pass less light from the backlight panel (i.e., become less intense), thereby reducing the brightness of the two-dimensional image produced from the pixels in first portion 2114 of pixel array 2112. Alternatively or additionally, drive signals may be transmitted to display panel 2102 that selectively cause the pixels included in second portion 2116 of pixel array 2112 to pass more light from the backlight panel (i.e., become more intense), thereby increasing the brightness of the three-dimensional image produced from the pixels in second portion 2116 of pixel array 2112. By controlling the intensity of the pixels in portions 2114 and 2116 of pixel array 2112 in this manner, the brightness of the two-dimensional image produced from the pixels in first portion 2114 of pixel array 2112 and the brightness of the three-dimensional image produced from the pixels in second portion 2116 of pixel array 2112 can be kept consistent. Additionally, by providing independent control over the intensity of the pixels in portions 2114 and 2116 of pixel array 2112, independent control over the brightness of the two-dimensional and three-dimensional images generated therefrom can also be achieved.

Of course, the arrangement shown in FIG. 21 provides only a single teaching example. It should be noted that a display system in accordance with an embodiment can dynamically manipulate pixel array 2112 and blocking element array 2122 in a coordinated fashion to dynamically and simultaneously create any number of display regions of different sizes and in different locations, wherein each of the created display regions can display one of two-dimensional, three-dimensional or multi-view three-dimensional content. To accommodate this, the intensity of the pixels in pixel array 2112 can also be dynamically manipulated in a coordinated fashion to ensure that each display region is perceived at a desired level of brightness.

In one embodiment, a regional brightness control scheme combines the use of a backlight array of independently-controllable light sources as previously described with regional pixel intensity control. The advantages of such a control scheme will now be described with reference to FIG. 22. FIG. 22 illustrates a front perspective view of a display panel 2200. Display panel 2200 includes a pixel array 2202 that includes a first portion 2204 and a second portion 2206, wherein each of first portion 2204 and second portion 2206 includes a different subset of the pixels in pixel array 2202. It is to be assumed that first portion 2204 of pixel array 2202 is illuminated by backlighting provided by an aligned first portion of a backlight array (not shown in FIG. 22), wherein the backlight array is similar to backlight array 1842 described above in reference to FIG. 18. Second portion 2206 of pixel array 2202 is illuminated by backlighting provided by an aligned second portion of the backlight array. In one example the amount of light emitted by each light source in the second portion of the backlight array to illuminate second portion 2206 of pixel array 2202 is controlled such that it is greater than the amount of light emitted by each light source in the first portion of the backlight array to illuminate first portion 2204 of pixel array 2202. This control scheme may be applied, for example, to cause a three-dimensional image formed by interaction between the pixels in second portion 2206 of pixel array 2202 and an adaptable parallax barrier to appear to have a uniform brightness level with respect to a two-dimensional image formed by interaction between the pixels in first portion 2204 of pixel array 2204 and the adaptable parallax barrier.

However, the difference in the amount of light emitted by each light source in the first and second portions of the backlight array to illuminate corresponding first and second portions 2204 and 2206 of pixel array 2202 may also give rise to undesired visual artifacts. In particular, the difference may cause pixels in boundary areas immediately outside of second portion 2206 of pixel array 2202 to appear brighter than desired in relation to other pixels in first portion 2204 of pixel array 2202. For example, as shown in FIG. 22, the pixels in boundary area 2212 immediately outside of second portion 2206 of pixel array 2202 may appear brighter than desired in relation to other pixels in first portion 2204 of pixel array 2202. This may be due to the fact that the increased luminosity provided by the light sources in the second portion of the backlight array has "spilled over" to impact the pixels in boundary area 2212, causing those pixels to be brighter than desired. Conversely, the difference may cause pixels in boundary areas immediately inside of second portion 2206 of pixel array 2202 to appear dimmer than desired in relation to other pixels in second portion 2206 of pixel array 2202. For example, as shown in FIG. 22, the pixels in boundary area 2214 immediately inside of second portion 2206 of pixel array 2202 may appear dimmer than desired in relation to other pixels in second portion 2206 of pixel array 2202. This may be due to the fact that the reduced luminosity of the light sources in the first portion of the backlight array has "spilled over" to impact the pixels in boundary area 2214, causing those pixels to be dimmer than desired.

To address this issue, an embodiment may selectively control the amount of light passed by the pixels located in boundary region 2212 or boundary region 2214 to compensate for the undesired visual effects. For example, driver circuitry associated with pixel array 2202 may selectively cause the pixels included in boundary area 2212 of pixel array 2202 to pass less light from the backlight panel (i.e., become less intense), thereby reducing the brightness of the pixels in boundary area 2212, thus compensating for an undesired increase in brightness due to "spill over" from light sources in the second portion of the backlight array. Alternatively or additionally, driver circuitry associated with pixel array 2202 may selectively cause the pixels included in boundary area 2214 of pixel array 2202 to pass more light from the backlight panel (i.e., become more intense), thereby increasing the brightness of the pixels in boundary area 2214, thus compensating for an undesired reduction in brightness due to "spill over" from light sources in the first portion of the backlight array. By controlling the intensity of the pixels in boundary areas 2212 and 2214 in this manner, the undesired visual effects described above that can arise from the use of a backlight array to provide regional brightness control can be mitigated or avoided entirely.

The illustration provided in FIG. 22 provides only one example of undesired visual effects that can arise from the use of a backlight array to provide regional brightness control. Persons skilled in the relevant art(s) will appreciate that many different display regions having many different brightness characteristics can be simultaneously generated by a display system in accordance with embodiments, thereby giving rise to different undesired visual effects relating to the brightness of boundary areas inside and outside of the different display regions. In each case, the intensity of pixels located in such boundaries areas can be selectively increased or reduced to mitigate or avoid such undesired visual effects.

In additional embodiments, a regional brightness control scheme is implemented in a display system that does not include a backlight panel at all, but instead utilizes a display panel comprising an array of organic light emitting diodes (OLEDs) or polymer light emitting diodes (PLEDs) which function as display pixels and also provide their own illumination. Display system 800 described above in reference to FIG. 8 may be representative of such a system, provided that pixel array 822 comprises an array of OLEDs or PLEDs. In accordance with such an implementation, the amount of light emitted by the individual OLED/PLED pixels that make up the OLED/PLED pixel array can be selectively controlled so that the brightness associated with each of a plurality of display regions of display system 800 can also be controlled. This enables display system 800 to provide a desired brightness level for each display region automatically and/or in response to user input. For example, the OLED/PLED pixel array can be controlled such that a uniform level of brightness is achieved across different simultaneously-displayed display regions, even though the number of perceptible pixels per unit area varies from display region to display region. As another example, the OLED/PLED pixel array can be controlled such that the level of brightness associated with a particular display region is increased or reduced without impacting (or without substantially impacting) the brightness of other simultaneously-displayed display regions.

Where OLED/PLED pixel regions such as those described above are adjacent to each other, it is possible that the brightness characteristics of one pixel region can impact the perceived brightness of an adjacent pixel region having different brightness characteristics, creating an undesired visual effect. For example, a first OLED/PLED pixel region having a relatively high level of brightness to support the viewing of multi-view three-dimensional content may be adjacent to a second OLED/PLED pixel region having a relatively low level of brightness to support the viewing of two-dimensional content. In this scenario, light from pixels in a perimeter area of the first OLED/PLED pixel region that are close to the boundary between the two pixel regions may "spill over" into a perimeter area of the second OLED/PLED pixel region. This may cause pixels in the perimeter area of the second OLED/PLED pixel region to appear brighter than desired in relation to other pixels in the second OLED/PLED pixel region. Conversely, pixels in the perimeter area of the first OLED/PLED pixel array may appear dimmer than desired in relation to other pixels in the first OLED/PLED pixel region because of the adjacency to the second OLED/PLED pixel region. To address this issue, it is possible to selectively increase or reduce the brightness of one or more OLED/PLED pixels in either perimeter area to reduce the "spill over" effect arising from the different brightness characteristics between the regions.

In still further embodiments, a regional brightness control scheme is implemented in a display system that includes an adaptable parallax barrier that also supports brightness regulation via an "overlay" approach. Such an approach involves the use of a brightness regulation overlay that is either independent of or integrated with an adaptable parallax barrier. The brightness regulation overlay is used to help achieve the aforementioned goals of maintaining standard brightness across various regional screen configurations and compensating for or minimizing backlighting dispersion.

The brightness regulation overlay comprises an element that allows regional dimming through various tones of "grey" pixels. In one example embodiment, an adaptable parallax barrier and the brightness regulation overlay are implemented as a non-color (i.e., black, white and grayscale) LCD sandwich, although other implementations may be used. The combined adaptable parallax barrier and brightness regulation overlay provide full transparent or opaque states for each pixel, as well as a grayscale alternative that can be used to "balance out" brightness variations caused by the parallax barrier itself.

Control over the individual barrier elements of the parallax barrier and the individual grayscale pixels of the brightness regulation overlay may be provided by using coordinated driver circuitry signaling. Such coordinate signaling may cause the pixels of the adaptable parallax barrier and the brightness regulation overlay (collectively referred to below as the manipulator pixels) to create opaque and transparent barrier elements associated with a particular parallax barrier configuration and a grayscale support there between to allow creation of overlays.

FIG. 23 illustrates two exemplary configurations of an adaptable light manipulator 2300 that includes an adaptable parallax barrier and a brightness regulation overlay implemented as a light manipulating LCD sandwich with manipulator grayscale pixels. In FIG. 23, the grayscale pixels map to the display pixels on a one-to-one basis, but that need not be the case.

A first exemplary configuration of adaptable light manipulator 2300 is shown above the section line denoted with reference numeral 2302. In accordance with the first exemplary configuration, a three-dimensional region 2304 is created with fully transparent or fully opaque manipulator pixels that provide parallax barrier functionality and a two-dimensional region 2306 is created having continuous medium gray manipulator pixels. The medium gray manipulator pixels operate to reduce the perceived brightness of two-dimensional region 2306 to better match that of three-dimensional region 2304. It is noted that in other example configurations, two-dimensional region 2306 could instead comprise a three-dimensional region having a number of views that is different than three-dimensional region 2304, thus also requiring brightness regulation.

In the first exemplary configuration, no boundary region compensation is performed. In the second exemplary configuration, which is shown below section line 2302, boundary region compensation is performed. For example, a boundary region 2310 within two-dimensional region 2306 may be "lightened" to a light gray to compensate for any diminution of light that might occur near the boundary with three-dimensional region 2304. In contrast, the grayscale level of an inner portion 2308 of two-dimensional region 2306 is maintained at the same medium gray level as in the portion of two-dimensional region 2306 above section line 2302. As a further example, a first boundary region 2312 and a second boundary region 2314 within three-dimensional region 2304 comprise darker and lighter gray transitional areas, respectively, to account for light dispersion from two-dimensional region 2306. In contrast, an inner portion 2316 of three-dimensional region 2304 includes only fully transparent or fully opaque manipulator pixels consistent with a parallax barrier configuration and no brightness regulation.

In one embodiment, the configuration of adaptable light manipulator 2300 is achieved by first creating a white through various grayscale areas that correspond to the regions and boundary areas to be formed. Once established, the manipulator pixels in these areas that comprise the opaque portions of the parallax barrier are overwritten to turn them black. Of course this two-stage approach is conceptual only and no "overwriting" need be performed.

In certain embodiments, adaptable light manipulator 2300 comprises the only component used in a display system for performing brightness regulation and/or boundary region compensation. In alternate embodiments, the display system further utilizes any one or more of the following aforementioned techniques for performing brightness regulation and/or boundary region compensation: a backlight array with independently-controllable light sources, and/or a pixel array and associated control logic for selectively increasing or decreasing the intensity of display pixels (e.g., either LCD pixels or OLED/PLED pixels). Note that in certain embodiments (such as the one described above in reference to FIG. 23), adaptable light manipulator 2300 is implemented as an integrated adaptable parallax barrier and brightness regulation overlay. However, in alternate embodiments, adaptable light manipulator 2300 is implemented using an adaptable parallax barrier panel and an independent brightness regulation overlay panel.

B. Example Display Systems Using Adaptable Lenticular Lenses

In display systems in accordance with further embodiments, rather than using an adaptable parallax barrier to perform light manipulation in support of multiple viewing configurations, an adaptable lenticular lens may be used. For example, with respect to example display system 800 of FIG. 8, adaptable parallax barrier 824 may be replaced with an adaptable lenticular lens. Likewise, with respect to example display system 2000 of FIG. 20, adaptable parallax barrier 2026 may be replaced with an adaptable lenticular lens.

FIG. 24 shows a perspective view of an adaptable lenticular lens 2400 in accordance with an embodiment. As shown in FIG. 24, adaptable lenticular lens 2400 includes a sub-lens array 2402. Sub-lens array 2402 includes a plurality of sub-lenses 2404 arranged in a two-dimensional array (e.g., arranged side-by-side in a row). Each sub-lens 2404 is shown in FIG. 24 as generally cylindrical in shape and having a substantially semi-circular cross-section, but in other embodiments may have other shapes. In FIG. 24, sub-lens array 2402 is shown to include eight sub-lenses for illustrative purposes and is not intended to be limiting. For instance, sub-lens array 2402 may include any number (e.g., hundreds, thousands, etc.) of sub-lenses 2404. FIG. 25 shows a side view of adaptable lenticular lens 2400. In FIG. 25, light may be passed through adaptable lenticular lens 2400 in the direction of dotted arrow 2502 to be diverted. Adaptable lenticular lens 2400 is adaptable in that it can be modified to manipulate light in different ways in order to accommodate different viewing configurations. For example, in one embodiment, adaptable lenticular lens is made from an elastic material and can be stretched or shrunk in one or more directions in response to generated drive signals.

Further description regarding the use of an adaptable lenticular lens to deliver three-dimensional views is provided in commonly-owned, co-pending U.S. patent application Ser. No. 12/774,307, filed on May 5, 2010, and entitled "Display with Elastic Light Manipulator," the entirety of which is incorporated by reference herein.

C. Example Display Systems Using Multiple Light Manipulators

Display systems in accordance with further embodiments may include multiple layers of light manipulators. Such display systems may enable multiple three-dimensional images to be displayed in a viewing space. The multiple light manipulating layers may enable spatial separation of the images. For instance, in accordance with one embodiment, a display device that includes multiple light manipulator layers may be configured to display a first three-dimensional image in a first region of a viewing space (e.g., a left-side area), a second three-dimensional image in a second region of the viewing space (e.g., a central area), a third three-dimensional image in a third region of the viewing space (e.g., a right-side area), etc. In fact, a display device that includes multiple light manipulator layers may be configured to display any number of spatially separated three-dimensional images as desired for a particular application (e.g., according to a number and spacing of viewers in the viewing space, etc.).

FIG. 26 is a block diagram of a display system 2600 that includes multiple light manipulator layers in accordance with an embodiment. As shown in FIG. 26, display system 2600 includes driver circuitry 2602 and a screen 2604, wherein screen 2604 includes a pixel array 2622, a first light manipulator 2624 and a second light manipulator 2626. As shown in FIG. 26, first light manipulator 2624 includes first light manipulator elements 2642 and second light manipulator 2626 includes second light manipulator elements 2644. Furthermore, as shown in FIG. 26, driver circuitry 2602 includes pixel array driver circuitry 2612 and light manipulator driver circuitry 2614.

Light 2632 is received at first light manipulator 2624 from pixel array 2622. Pixel array driver circuitry 2612 may generate drive signals 2652 based on a control signal 2608 received from control circuitry (not shown in FIG. 26) and drive signals 2652 may be received by pixel array 2622 to generate light 2632. Each pixel of pixel array 2622 may generate light that is received at first light manipulator 2624. In an embodiment, pixel array driver circuitry 2612 may generate drive signals 2652 to cause pixel array 2622 to emit light 2632 containing a plurality of images corresponding to the sets of pixels.

First light manipulator 2624 may be configured to manipulate light 2632 received from pixel array 2622. As shown in FIG. 26, first light manipulator 2624 includes light manipulator elements 2642 configured to perform manipulating (e.g., filtering, diverting, etc.) of light 2632 to generate manipulated light 2634. Light manipulator elements 2642 may optionally be configurable to adjust the manipulating performed by first light manipulator 2624. First light manipulator 2624 may perform filtering in a similar manner as an adaptable parallax barrier described above or in other manner. In another embodiment, first light manipulator 2624 may include a lenticular lens that diverts light 2632 to perform light manipulating, generating manipulated light 2634. In an embodiment, light manipulator driver circuitry 2614 may generate drive signals 2654 based on control signal 2608 received by driver circuitry 2602 to cause light manipulator elements 2642 to manipulate light 2632 as desired.

Manipulated light 2634 is received by second light manipulator 2626 to generate manipulated light 2636 that includes a plurality of three-dimensional images $2662_1$-$2662_n$ formed in a viewing space 2606. As shown in FIG. 26, second light manipulator 2626 includes light manipulator elements 2644 configured to perform manipulating of manipulated light 2634 to generate manipulated light 2636. Light manipulator elements 2644 may optionally be configurable to adjust the manipulating performed by second light manipulator 2626. In an embodiment, light manipulator driver circuitry 2614 may generate drive signals 2656 based on control signal 2608 to cause light manipulator elements 2644 to manipulate manipulated light 2634 to generate manipulated light 2636 including three-dimensional images $2662_1$-$2662_n$ as desired. In embodiments, second light manipulator 2626 may include an adaptable parallax barrier or lenticular lens configured to manipulate manipulated light 2634 to generate manipulated light 2636.

As such, screen 2604 of display system 2600 supports multiple viewers with media content in the form of three-dimensional images or views. Screen 2604 may provide a first three-dimensional view based on first three-dimensional media content to a first viewer, a second three-dimensional view based on second three-dimensional media content to a second viewer, and optionally further three-dimensional views based on further three-dimensional media content to further viewers. First and second light manipulators 2624 and 2626 each cause three-dimensional media content to be presented to a corresponding viewer via a corresponding area of screen 2604, with each viewer being enabled to view corresponding media content without viewing media content directed to other viewers. Furthermore, the areas of screen 2604 that provide the various three-dimensional views of media content overlap each other at least in part. In the embodiment of FIG. 26, the areas may be the same area. As such, multiple three-dimensional views that are each viewable by a corresponding viewer may be delivered by a single screen. Embodiments of display system 2600 may also be configured to generate two-dimensional views, as well as any combination of one or more two-dimensional views simultaneously with one or more three-dimensional views.

FIG. 27 shows a block diagram of a display system 2700, which is a further example of a display system that includes multiple light manipulator layers. Like display system 2600 of FIG. 26, display system 2700 is configured to display multiple three-dimensional images $2762_1$-$2762_n$ in a viewing space 2706 in a spatially separated manner. As shown in FIG. 27, display system 2700 includes driver circuitry 2702 and a screen 2704, wherein screen 2704 includes a light generator 2722, a first light manipulator 2724, a second light manipulator 2726 and a pixel array 2728. As shown in FIG. 27, light generator 2722 optionally includes a backlight array 2742, first light manipulator 2724 includes first light manipulator elements 2744, and second light manipulator 2726 includes second light manipulator elements 2746. Furthermore, as shown in FIG. 27, driver circuitry 2702 receives control signals 2708 and includes light generator driver circuitry 2712, light manipulator driver circuitry 2714, and pixel array driver circuitry 2716. Light generator driver circuitry 2712, light manipulator driver circuitry 2714, and pixel array driver circuitry 2716 may generate drive signals to perform their respective functions based on control signals 2708. As shown in FIG. 27, first and second light manipulators 2724 and 2026 are positioned between light generator 2022 and pixel array 2728. In another embodiment, pixel array 2728 may instead be located between first and second light manipulators 2724 and 2726.

D. Example Display System Implementation with Control Circuitry

FIG. 28 is a block diagram of an example implementation of a display system 2800 that includes control circuitry 2802, driver circuitry 2804 and a screen assembly 2806.

As shown in FIG. 28, control circuitry 2802 includes a processing unit 2814, which may comprise one or more general-purpose or special-purpose processors or one or more processing cores. Processing unit 2814 is connected to a communication infrastructure 2812, such as a communication bus. Control circuitry 2802 may also include a primary or main memory (not shown in FIG. 28), such as random access memory (RAM), that is connected to communication infrastructure 2812. The main memory may have control logic stored thereon for execution by processing unit 2814 as well as data stored thereon that may be input to or output by processing unit 2814 during execution of such control logic.

Control circuitry 2802 may also include one or more secondary storage devices (not shown in FIG. 28) that are connected to communication infrastructure 2812, including but not limited to a hard disk drive, a removable storage drive (such as an optical disk drive, a floppy disk drive, a magnetic tape drive, or the like), or an interface for communicating with a removable storage unit such as an interface for communicating with a memory card, memory stick or the like. Each of these secondary storage devices provide an additional means for storing control logic for execution by processing unit 2814 as well as data that may be input to or output by processing unit 2814 during execution of such control logic.

Control circuitry 2802 further includes a set-top box circuitry interface 2816, a user input interface 2818, and a viewer tracking unit 2820. Set-top box circuitry interface 2816 comprises an interface by which control circuitry 2802 can communicate with set-top box circuitry, such as set-top box circuitry 102 described above in reference to FIG. 1 or set-top box circuitry 200 described above in reference to FIG. 2. Control circuitry 2802 may receive media content from a set-top box via set-top box circuitry interface 2816, provide constraint or capability information to set-top box circuitry via set-top box circuitry interface 2816 and also receive signals for controlling a configuration of screen assembly 2806 via set-top box circuitry interface 2816.

User input interface 2818 is intended to generally represent any type of interface that may be used to receive user input, including but not limited to a remote control device, a traditional computer input device such as a keyboard or mouse, a touch screen, a gamepad or other type of gaming console input device, or one or more sensors including but not limited to video cameras, microphones and motion sensors.

Viewer tracking unit 2820 is intended to generally represent any type of functionality for determining or estimating a location of one or more viewers of display system 2800 and/or a head orientation of one or more viewers of display system 2800. Viewer tracking unit may perform such functions using different types of sensors (e.g., cameras, motion sensors, microphones or the like) or by using tracking systems such as those that wirelessly track an object (e.g., headset, remote control, or the like) currently being held or worn by a viewer.

Control circuitry 2802 further includes a communication interface 2822. Communication interface 2822 enables control circuitry 2802 to send control signals via a communication medium 2852 to another communication interface 2830 within driver circuitry 2804, thereby enabling control circuitry 2802 to control the operation of driver circuitry 2804. Communication medium 2852 may comprise any kind of wired or wireless communication medium suitable for transmitting such control signals.

As shown in FIG. 28, driver circuitry 2804 includes the aforementioned communication interface 2830 as well as pixel array driver circuitry 2832 and adaptable light manipulator driver circuitry 2834. Driver circuitry also optionally includes light generator driver circuitry 2836. Each of these driver circuitry elements is configured to receive control signals from control circuitry 2802 (via the link between communication interface 2822 and communication interface 2830) and, responsive thereto, to send selected drive signals to a corresponding hardware element within screen assembly 2806, the drive signals causing the corresponding hardware element to operate in a particular manner. In particular, pixel array driver circuitry 2832 is configured to send selected drive signals to a pixel array 2842 within screen assembly 2806, adaptable light manipulator driver circuitry 2834 is configured to send selected drive signals to an adaptable light manipulator 2844 within screen assembly 2806, and optional light generator driver circuitry 2836 is configured to send selected drive signals to an optional light generator 2846 within screen assembly 2806.

In one example mode of operation, processing unit 2814 operates pursuant to control logic to receive media content via set-top box circuitry interface 2816 and to generate control signals necessary to cause driver circuitry 2804 to render such video content to screen assembly 2806 in accordance with a selected viewing configuration. The control logic that is executed by processing unit 2814 may be retrieved, for example, from a primary memory or a secondary storage device connected to processing unit 2814 via communication infrastructure 2812 as discussed above. The control logic may also be retrieved from some other local or remote source.

Among other features, driver circuitry 2804 may be controlled in a manner described in commonly-owned, co-pending U.S. patent application Ser. No. 12/982,031, filed on even date herewith and entitled "Coordinated Driving of Adaptable Light Manipulator, Backlighting and Pixel Array in Support of Adaptable 2D and 3D Displays" (the entirety of which is incorporated by reference herein) to send coordinated drive signals necessary for displaying two-dimensional media content, 3D2 media content and 3Dx media content (wherein x is a multiple of 2) via the screen. In certain operating modes, such content may be simultaneously displayed via different display regions of the screen. The manner in which pixel array 2842, adaptable light manipulator 2844 (e.g., an adaptable parallax barrier), and light generator 2846 may be manipulated in a coordinated fashion to perform this function was described in the patent application referenced immediately above. Note that in accordance with certain implementations (e.g., implementations in which pixel array 2842 comprises a OLED/PLED pixel array), screen assembly 2806 need not include light generator 2846.

In one embodiment, at least part of the function of generating control signals necessary to cause pixel array 2842, adaptable light manipulator 2844 and light generator 2846 to render media content to screen assembly 2806 in accordance with a selected viewing configuration is performed by drive signal processing circuitry 2838 which is integrated within driver circuitry 2804. Such circuitry may operate, for example, in conjunction with and/or under the control of processing unit 2814 to generate the necessary control signals.

In certain implementations, control circuitry 2802, driver circuitry 2804 and screen elements 2806 are all included within a single housing. For example and without limitation, all these elements may exist within a television, a laptop computer, a tablet computer, or a telephone. In accordance with such an implementation, link 2852 formed between communication interfaces 2822 and 2830 may be replaced by a direct connection between driver circuitry 2804 and communication infrastructure 2812. In accordance with further implementations, the single housing may also include the set-top box circuitry that is connected to set-top box circuitry interface 2816.

In an alternate implementation, control circuitry 2802 is disposed within a first housing and driver circuitry 2804 and screen 2806 are disposed within a second housing. In accordance with further implementations, the first housing may also include the set-top box circuitry that is connected to set-top box circuitry interface 2816.

V. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. Set top box circuitry supporting media delivery between one or more media content sources and a screen assembly, the screen assembly being part of a viewing environment having a viewing limitation, the set top box circuitry comprising:
one or more media interfaces, each of the one or more media interfaces suitable for connection to at least one of the one or more media content sources;
a display device interface suitable for connection to the screen assembly;
a first of the one or more media interfaces being operable to receive first media content from a first of the one or more media content sources, the first media content having at least a first display requirement, the first media content being first three-dimensional media content; and
processing circuitry operable to process the first media content in a manner that is based at least in part upon information related to the viewing limitation to yield second media content having at least a second display requirement, the second display requirement being within the viewing limitation, the information related to the viewing limitation comprising one or more of:
a current viewing mode of the screen assembly,
a current location and/or head orientation of a viewer of the screen assembly,
a characteristic of a media content source from which the first media content is received, the media content source being an entity configured to transfer media content to the set top box circuitry,
a characteristic of a channel over which the first media content is received from the media content source, and
a characteristic of a channel over which the first media content is delivered to the screen assembly.

2. The set top box circuitry of claim 1, wherein the second media content comprises two-dimensional media content.

3. The set top box circuitry of claim 1, wherein the second media content comprises second three-dimensional media content, the second three-dimensional media content being different than the first three-dimensional media content.

4. The set top box circuitry of claim 3, wherein the second three-dimensional media content differs by having a lesser number of perspective views than that of the first three-dimensional media content.

5. The set top box circuitry of claim 3, wherein the second three-dimensional media content differs by having a lesser resolution than that of the first three-dimensional media content.

6. The set top box circuitry of claim 3, wherein the second three-dimensional media content differs by being configured for display within a region of the screen assembly while the first three-dimensional media content is configured for full screen display on the screen assembly.

7. The set top box circuitry of claim 1, wherein the processing circuitry causes a reconfiguration of a region of the screen assembly, and the processing circuitry delivers via the display interface the second three-dimensional media content for display within the region.

8. The set top box circuitry of claim 1, wherein the viewing limitation comprises at least in part a factory limitation.

9. The set top box circuitry of claim 1, wherein the viewing limitation comprises at least in part a current screen sharing limitation.

10. The set top box circuitry of claim 1, wherein the viewing limitation is retrieved by the processing circuitry.

11. Set top box circuitry supporting media delivery between one or more media content sources and a screen assembly, the screen assembly being part of a viewing environment, the set top box circuitry comprising:
a media interface that communicatively couples with at least one of the one or more media content sources to receive first media content therefrom, the first media content having at least a first display requirement;
a screen interface suitable for connection to the screen assembly, the screen interface being part of the viewing environment, and the viewing environment having a first constraint; and
processing circuitry that, based at least in part on information related to the first constraint, determines whether to deliver the first media content or to deliver a substitute version of the first media content, the delivery being via the screen interface to the screen assembly, the information related to the first constraint comprising one or more of:
a viewing mode of the screen assembly,
a current location and/or head orientation of a viewer of the screen assembly,
a characteristic of a media content source from which the first media content or the substitute version of the first media content is received, the media content source being an entity configured to transfer the first media content or the substitute version of the first media content to the set top box circuitry, a characteristic of a channel over which the first media content or the substitute version of the first media content is received from the media content source, and a characteristic of a channel over which the first media content or the substitute version of the first media content is delivered to the screen assembly.

12. The set top box circuitry of claim 11, wherein the first constraint comprises a bandwidth constraint associated with the screen interface.

13. The set top box circuitry of claim 11, wherein the processing circuitry produces the substitute version of the first media content.

14. The set top box circuitry of claim 11, wherein the processing circuitry retrieves the substitute version of the first media content via the media interface.

15. The set top box circuitry of claim 11, wherein the determination by the processing circuitry is based on a comparison of the first constraint with the first display requirement.

16. The set top box circuitry of claim 11, wherein the first constraint is a real-time constraint.

17. The set top box circuitry of claim 15, wherein the first constraint is a predefined constraint.

18. The set top box circuitry of claim 11, wherein both the display assembly and at least a portion of the processing circuitry are placed within a housing.

19. The set top box circuitry of claim 16, wherein the first constraint is identified by evaluating performance.

20. The set top box circuitry of claim 11, wherein the first media content comprises three-dimensional media content.

21. A method of operation of set top box circuitry, comprising:

receiving first media content via a media interface that is communicatively coupled to at least one media content source, the first media content comprising first three-dimensional media content and having at least a first display requirement;

determining whether to deliver the first media content or a substitute version of the first media content to a screen assembly via a screen interface, the screen assembly and the screen interface being part of a viewing environment having a first constraint, where the determination is based at least in part on information related to the first constraint that comprises one or more of:

a current viewing mode of the screen assembly, a current location and/or head orientation of a viewer of the screen assembly, a characteristic of a media content source from which the first media content or the substitute version of the first media content is received, the media content source being an entity configured to transfer the first media content or the substitute version of the first media content to the set top box circuitry, a characteristic of a channel over which the first media content or the substitute version of the first media content is received from the media content source, and a characteristic of a channel over which the first media content or the substitute version of the first media content is delivered to the screen assembly; and delivering either the first media content or the substitute version of the first media content to the screen assembly via the screen interface in accordance with the results of the determining step.

22. The method of claim 21, wherein the substitute version of the first media content comprises two-dimensional media content.

23. The method of claim 21, wherein the substitute version of the first media content comprises second three-dimensional media content, the second three-dimensional media content being different than the first three-dimensional media content.

24. The method of claim 21, wherein the first constraint comprises a bandwidth constraint associated with the screen interface.

25. The set top box circuitry of claim 1, wherein the first display requirement is not within the viewing limitation.

26. The method of claim 21, wherein the first display requirement is not within the first constraint of the viewing environment.

* * * * *